US009781208B2

(12) United States Patent
Leggette et al.

(10) Patent No.: US 9,781,208 B2
(45) Date of Patent: Oct. 3, 2017

(54) OBTAINING DISPERSED STORAGE NETWORK SYSTEM REGISTRY INFORMATION

(71) Applicant: CLEVERSAFE, INC., Chicago, IL (US)

(72) Inventors: Wesley Leggette, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 14/468,731

(22) Filed: Aug. 26, 2014

(65) Prior Publication Data
US 2015/0127699 A1    May 7, 2015

Related U.S. Application Data

(60) Provisional application No. 61/898,934, filed on Nov. 1, 2013.

(51) Int. Cl.
| | |
|---|---|
| G06F 15/16 | (2006.01) |
| H04L 29/08 | (2006.01) |
| H04N 7/173 | (2011.01) |
| G06F 21/62 | (2013.01) |
| H04L 29/06 | (2006.01) |

(52) U.S. Cl.
CPC ..... *H04L 67/1097* (2013.01); *H04N 7/17336* (2013.01); *G06F 21/6218* (2013.01); *H04L 63/0823* (2013.01); *H04L 63/101* (2013.01)

(58) Field of Classification Search
CPC . H04L 67/1097; H04L 63/06; H04L 63/0823; H04L 61/2076; H04N 7/17336; G06F 11/1076

USPC ................. 709/203, 201; 707/697
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Krista Zele
*Assistant Examiner* — Michael A Chambers
(74) *Attorney, Agent, or Firm* — Garlick & Markison; Timothy W. Markison; Shayne X. Short

(57) ABSTRACT

A method begins by a processing module of a dispersed storage network (DSN) obtaining an identifier (ID) piece of multiple ID pieces regarding a registry fragment of a distributed DSN registry. The method continues with the processing module performing a function on the ID piece to obtain a registry fragment alias, wherein performance of the function on the multiple ID pieces would produce multiple registry fragment aliases. The method continues with the processing module determining DSN addressing information for the registry fragment based on the registry fragment alias, wherein the DSN addressing information is determinable from any one of the multiple registry fragment aliases. The method continues with the processing module receiving a response regarding the registry fragment when a local copy of the registry fragment is not up-to-date.

21 Claims, 55 Drawing Sheets

(56) References Cited

U.S. PATENT DOCUMENTS

| | | | |
|---|---|---|---|
| 5,485,474 A * | 1/1996 | Rabin | G06F 11/004 714/762 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A * | 11/1999 | Garay | H04L 9/302 380/30 |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,509,322 B2 * | 3/2009 | Miloushev | G06F 17/30067 |
| 7,636,724 B2 | 12/2009 | de la Torre et al. | |
| 8,630,987 B2 * | 1/2014 | Dhuse | H04N 7/17336 707/697 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 * | 5/2003 | Shu | G06F 11/1076 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0064562 A1 * | 3/2006 | Mohideen | G06F 12/109 711/170 |
| 2006/0136448 A1 | 6/2006 | Cialini et al. | |
| 2006/0156059 A1 | 7/2006 | Kitamura | |
| 2006/0218435 A1 * | 9/2006 | van Ingen | G06F 11/1451 714/6.12 |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0287200 A1 * | 11/2010 | Dhuse | H04N 7/17336 707/770 |
| 2010/0332751 A1 * | 12/2010 | Quigley | H04L 69/08 711/114 |
| 2011/0029524 A1 * | 2/2011 | Baptist | G06F 11/1076 707/737 |
| 2011/0055661 A1 * | 3/2011 | Grube | G06F 11/1092 714/763 |
| 2011/0071988 A1 * | 3/2011 | Resch | G06F 11/1076 707/691 |
| 2011/0311051 A1 * | 12/2011 | Resch | H04L 63/06 380/270 |
| 2011/0314355 A1 * | 12/2011 | Grube | G06F 11/1076 714/763 |
| 2013/0132702 A1 * | 5/2013 | Patel | G06F 12/08 711/202 |
| 2014/0250281 A1 * | 9/2014 | Rao | G06F 12/0223 711/156 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

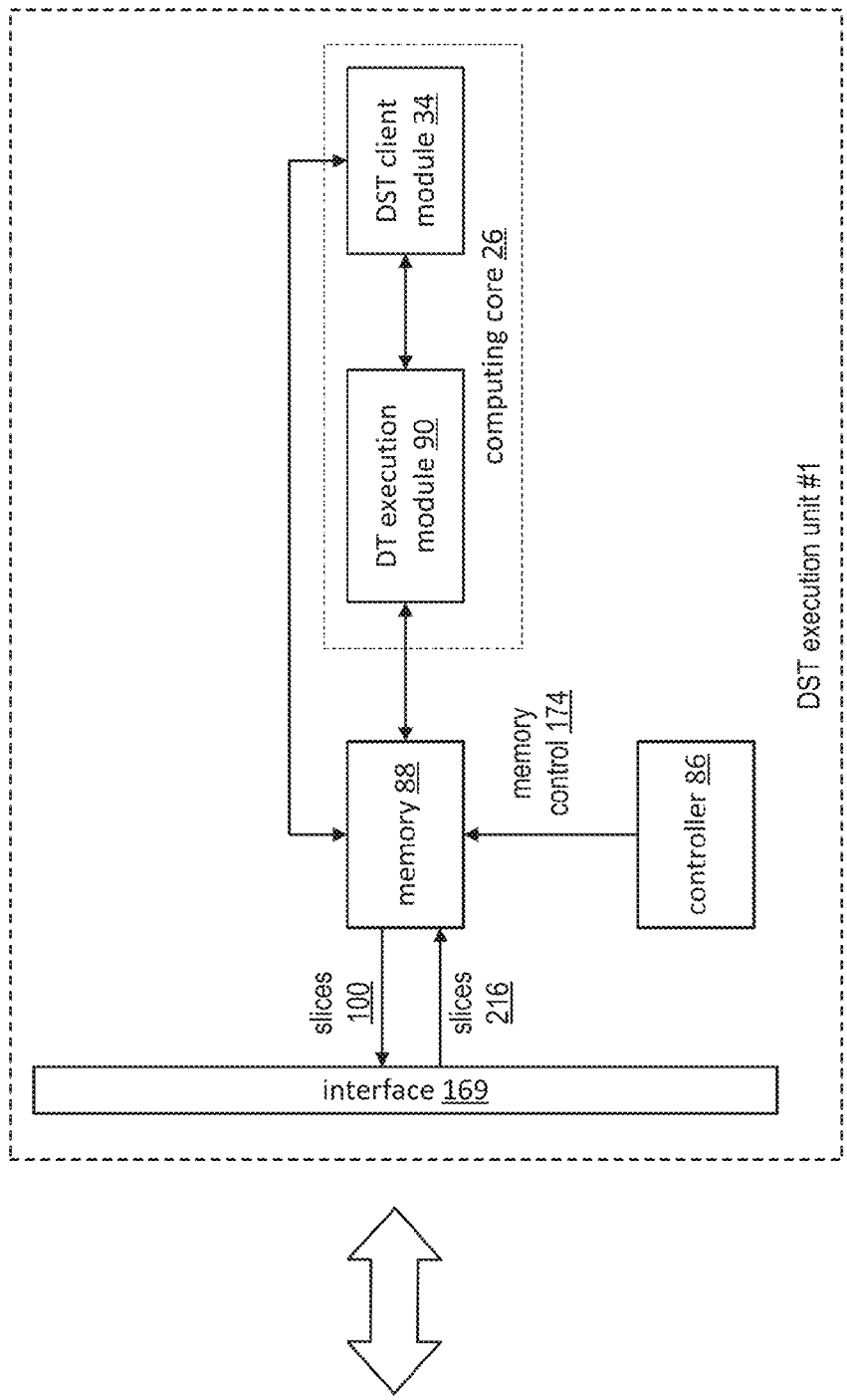
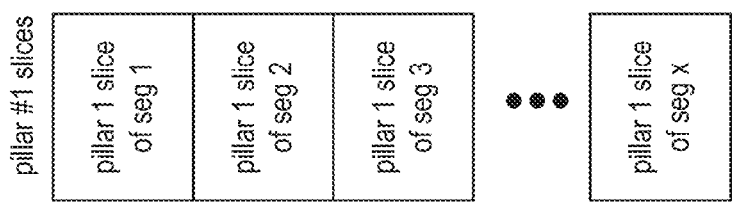
FIG. 24

DST allocation info 242 | data partition info 320: data ID; No. of partitions; Addr. info for each partition; format conversion indication

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 | task execution info 322 intermediate result info 324

FIG. 32

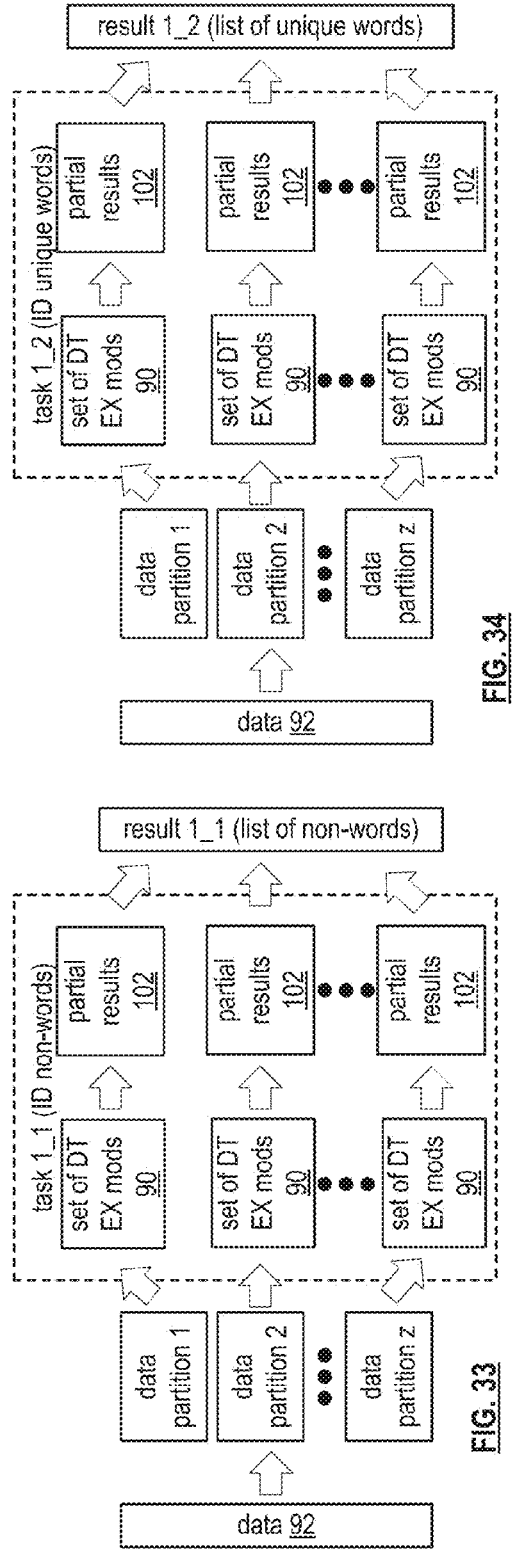
FIG. 33
FIG. 34
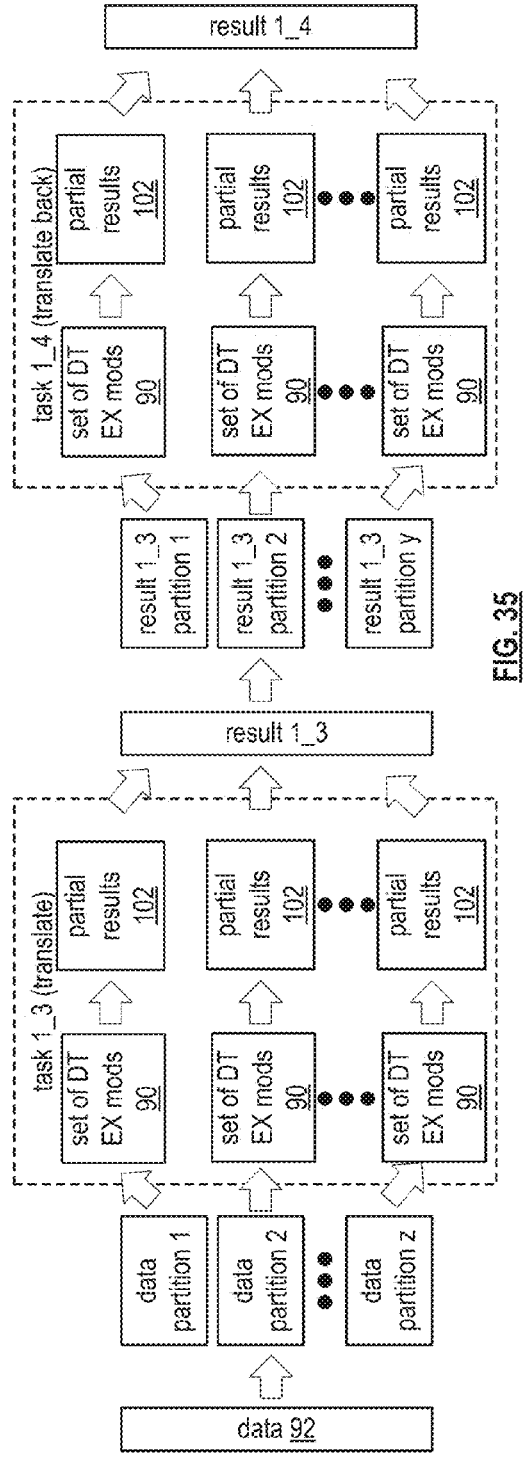
FIG. 35

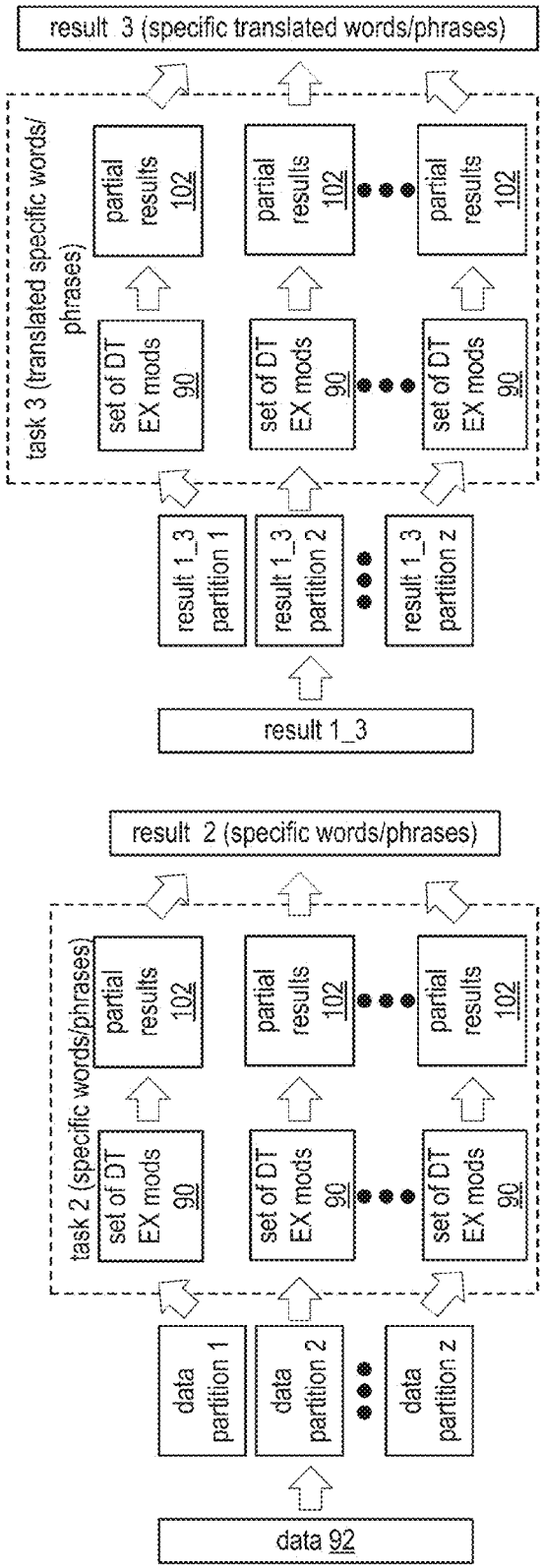
FIG. 38
FIG. 37
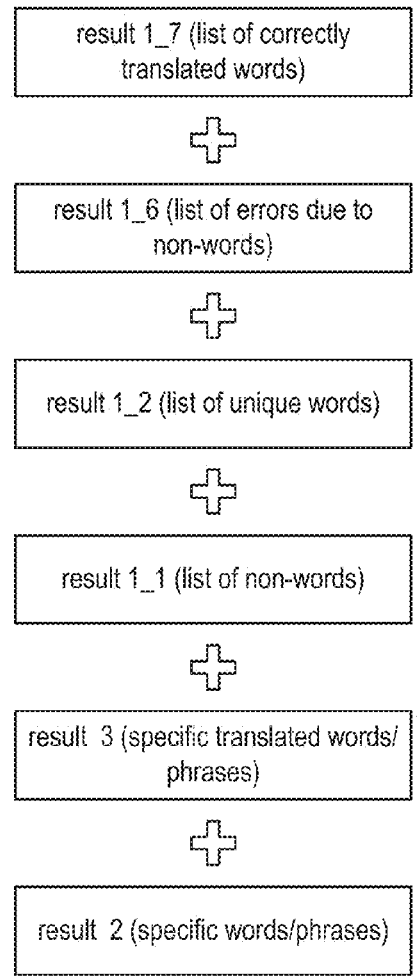
FIG. 39

OBTAINING DISPERSED STORAGE NETWORK SYSTEM REGISTRY INFORMATION

CROSS REFERENCE TO RELATED PATENTS

The present U.S. Utility patent application claims priority pursuant to 35 U.S.C. §119(e) to U.S. Provisional Application No. 61/898,934, entitled "UPDATING REGISTRY INFORMATION OF A DISPERSED STORAGE NETWORK", filed Nov. 1, 2013, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 42A:
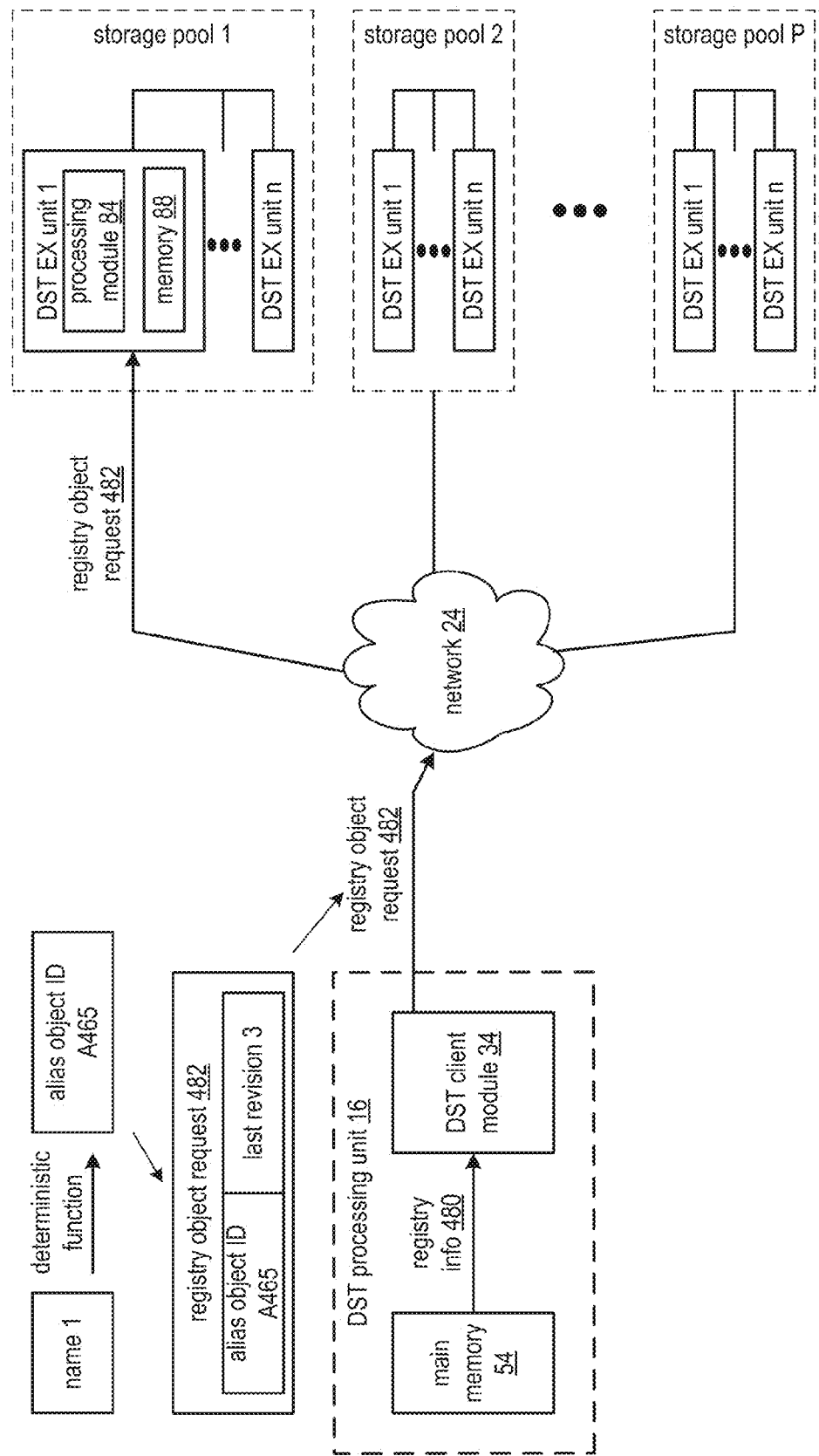
Figure 42B:
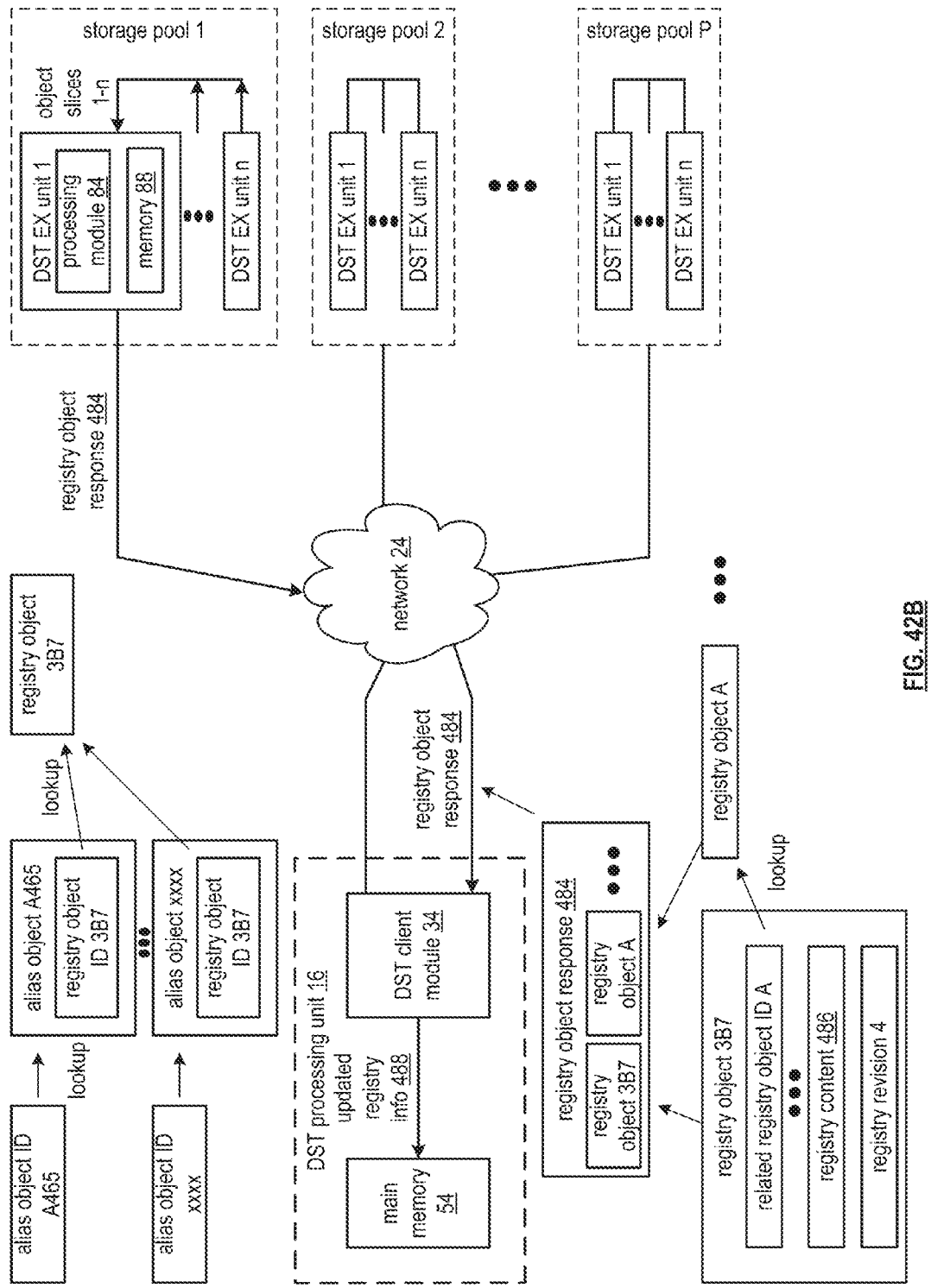
Figure 42C:
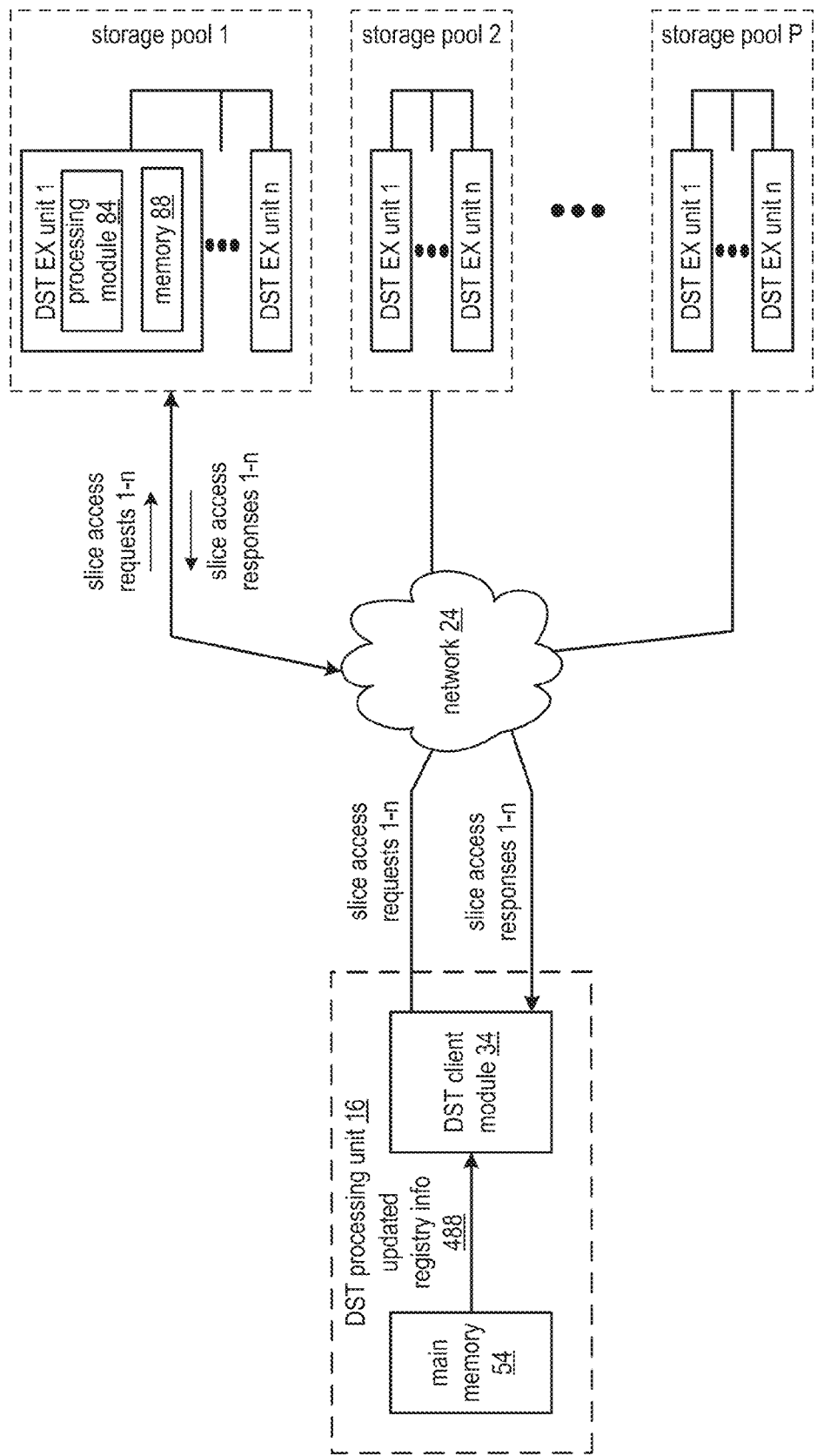
Figure 42D:
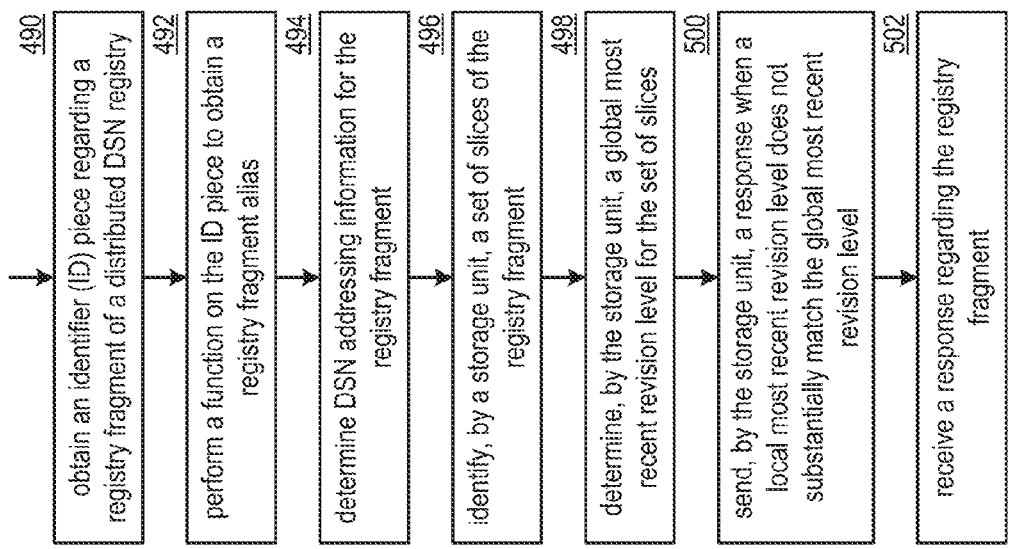
Figure 43A:
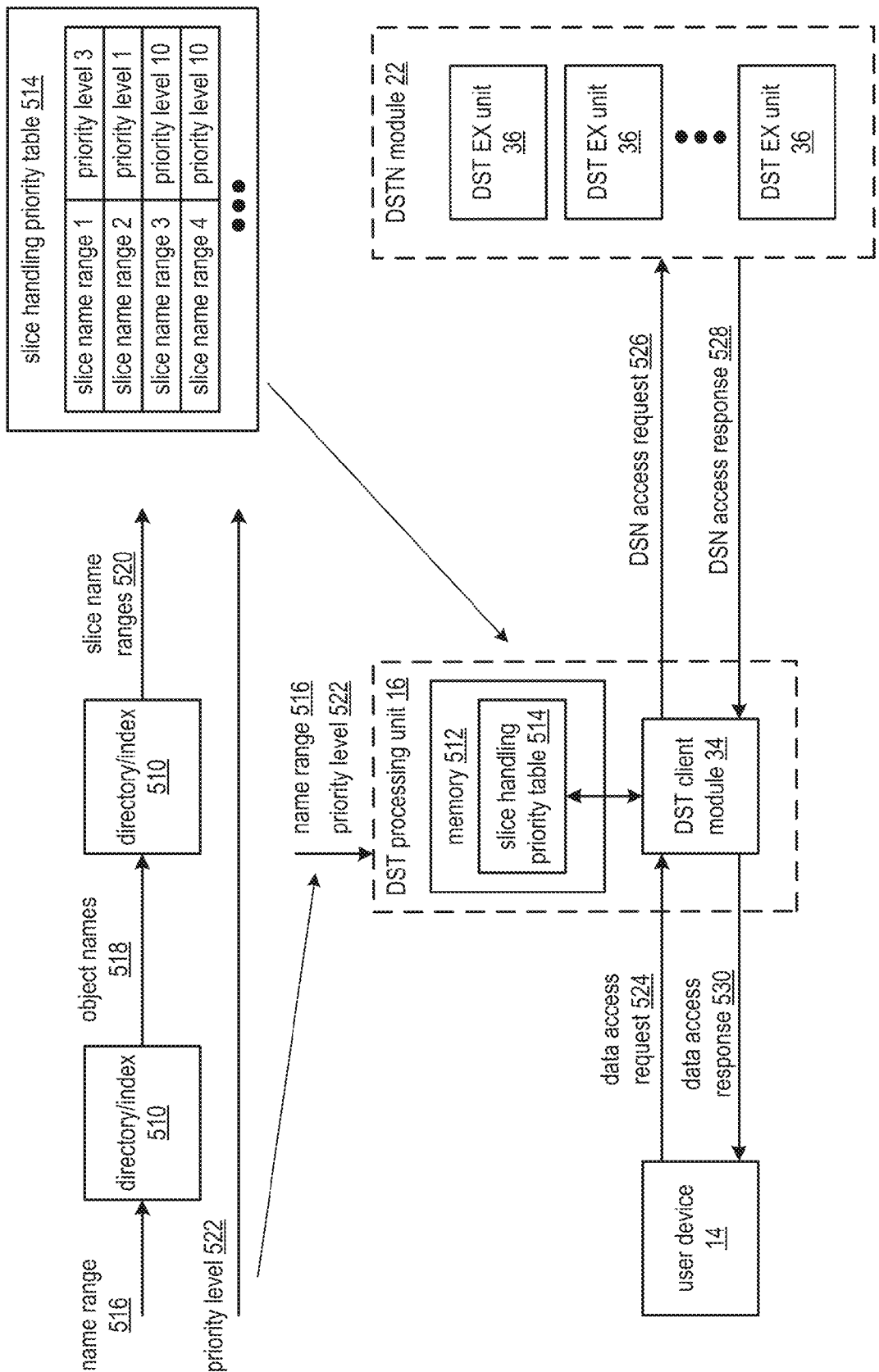
Figure 43B:
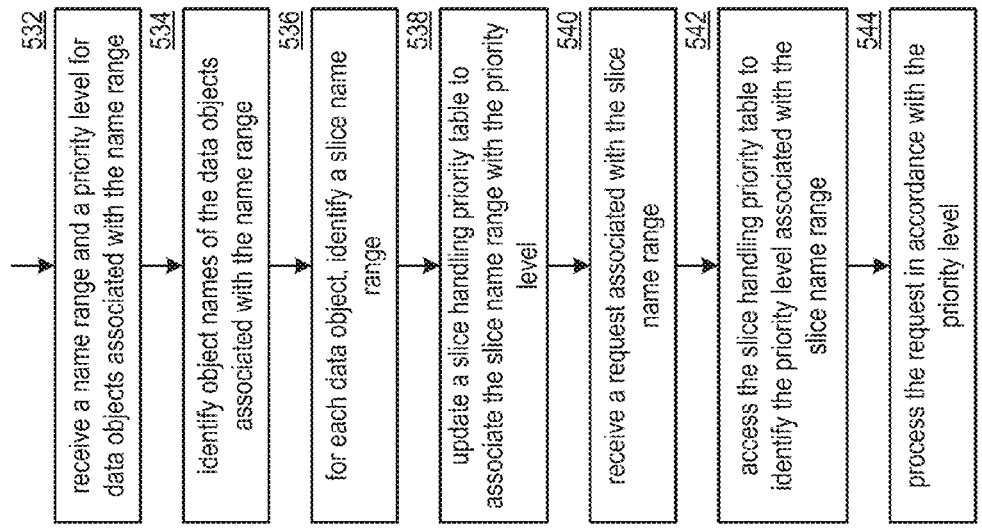
Figure 44A:
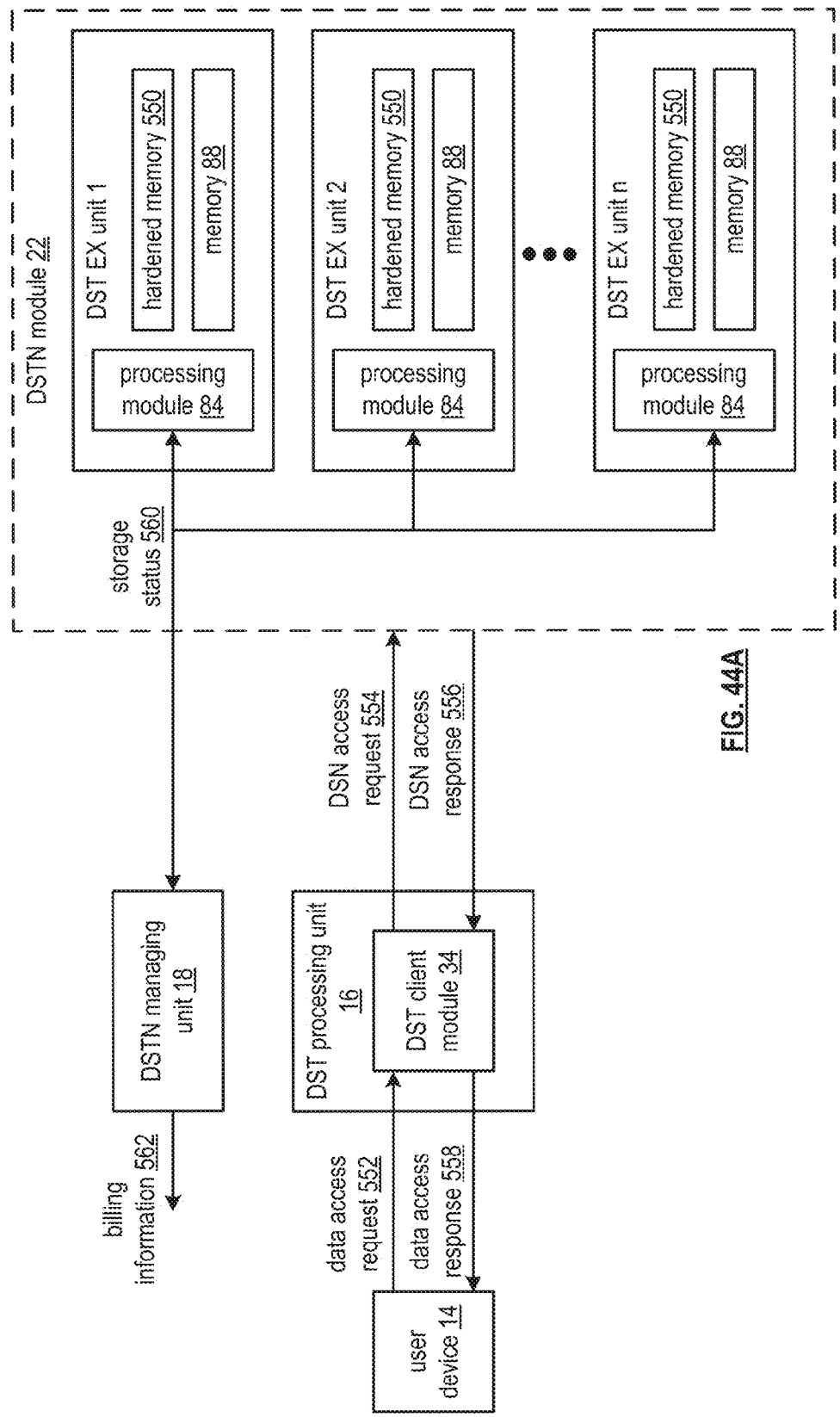
Figure 44B:
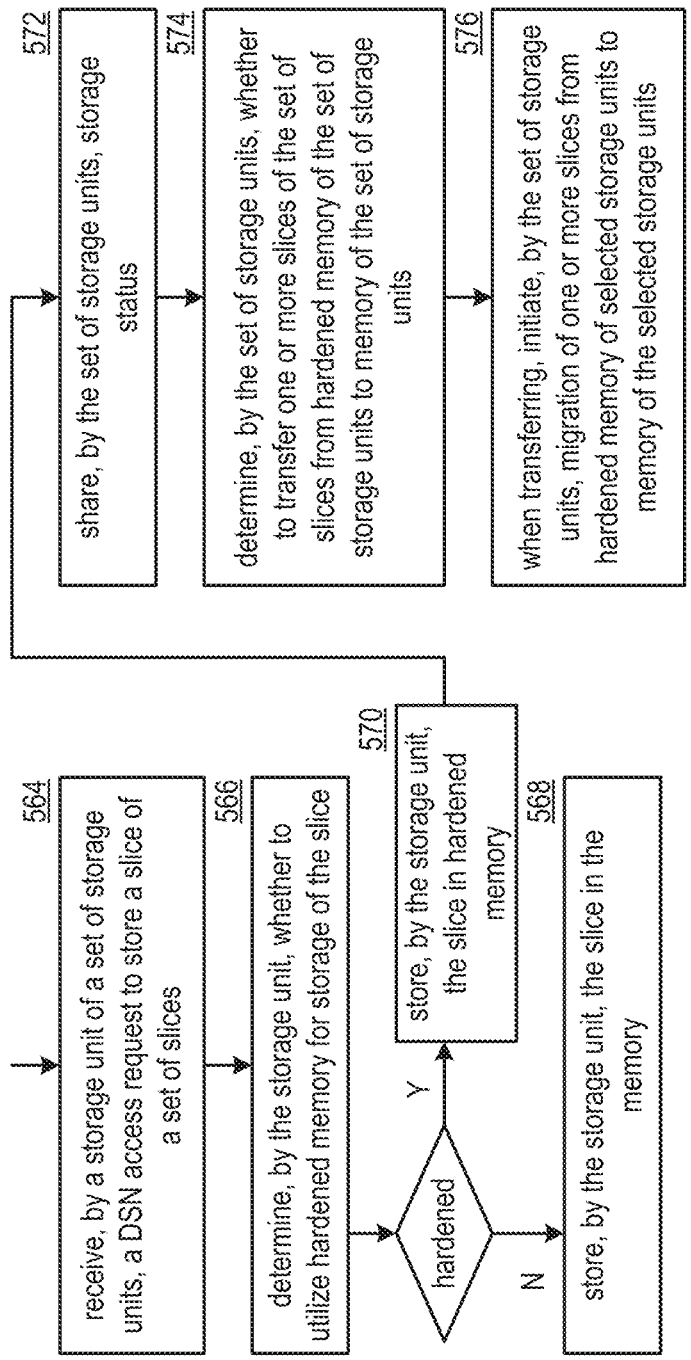
Figure 45:
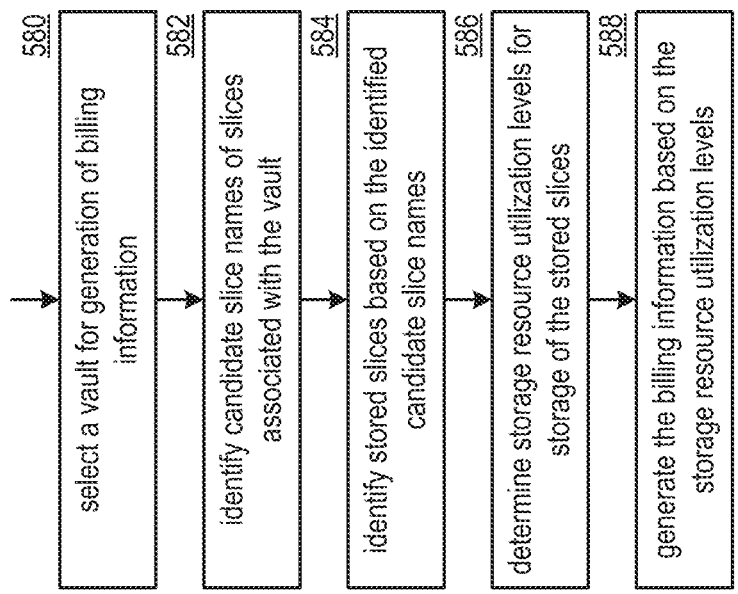
Figure 46A:
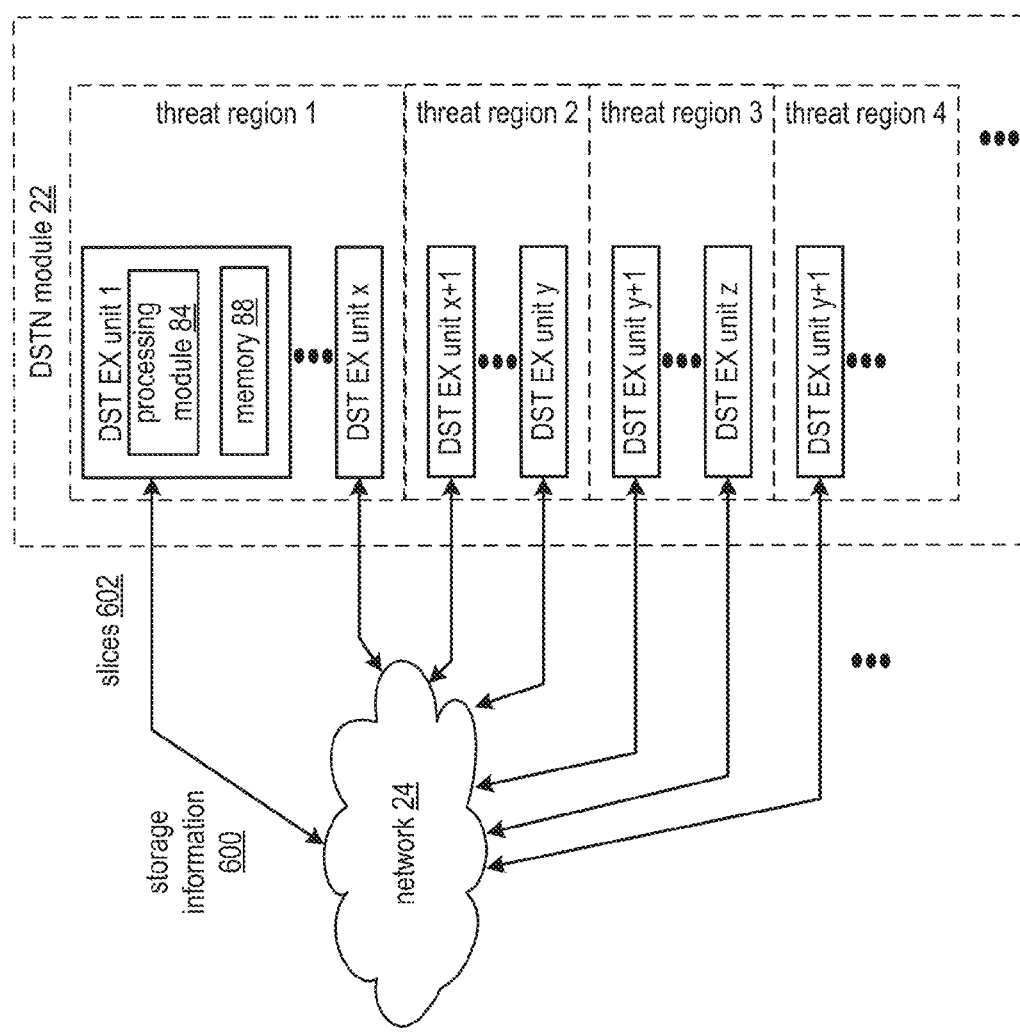
Figure 46B:
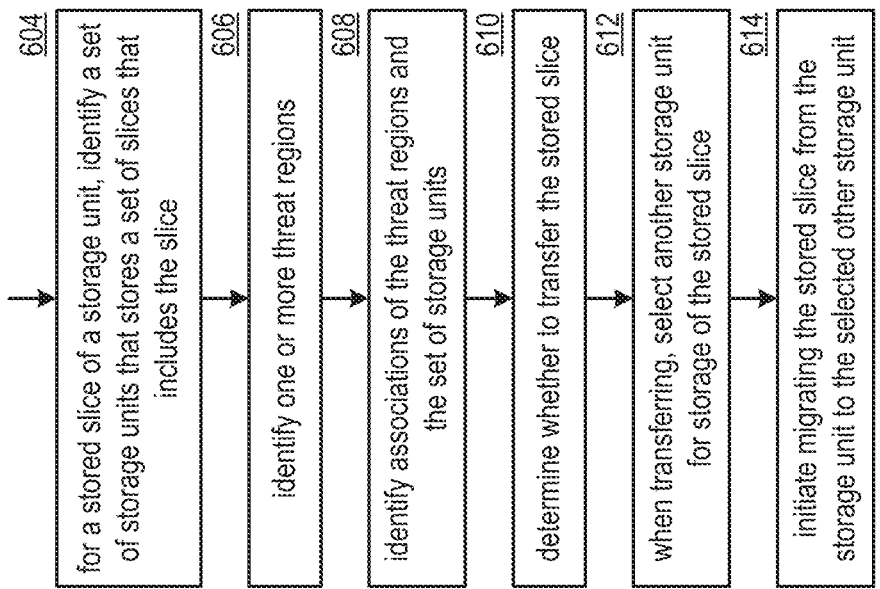
Figure 47A:
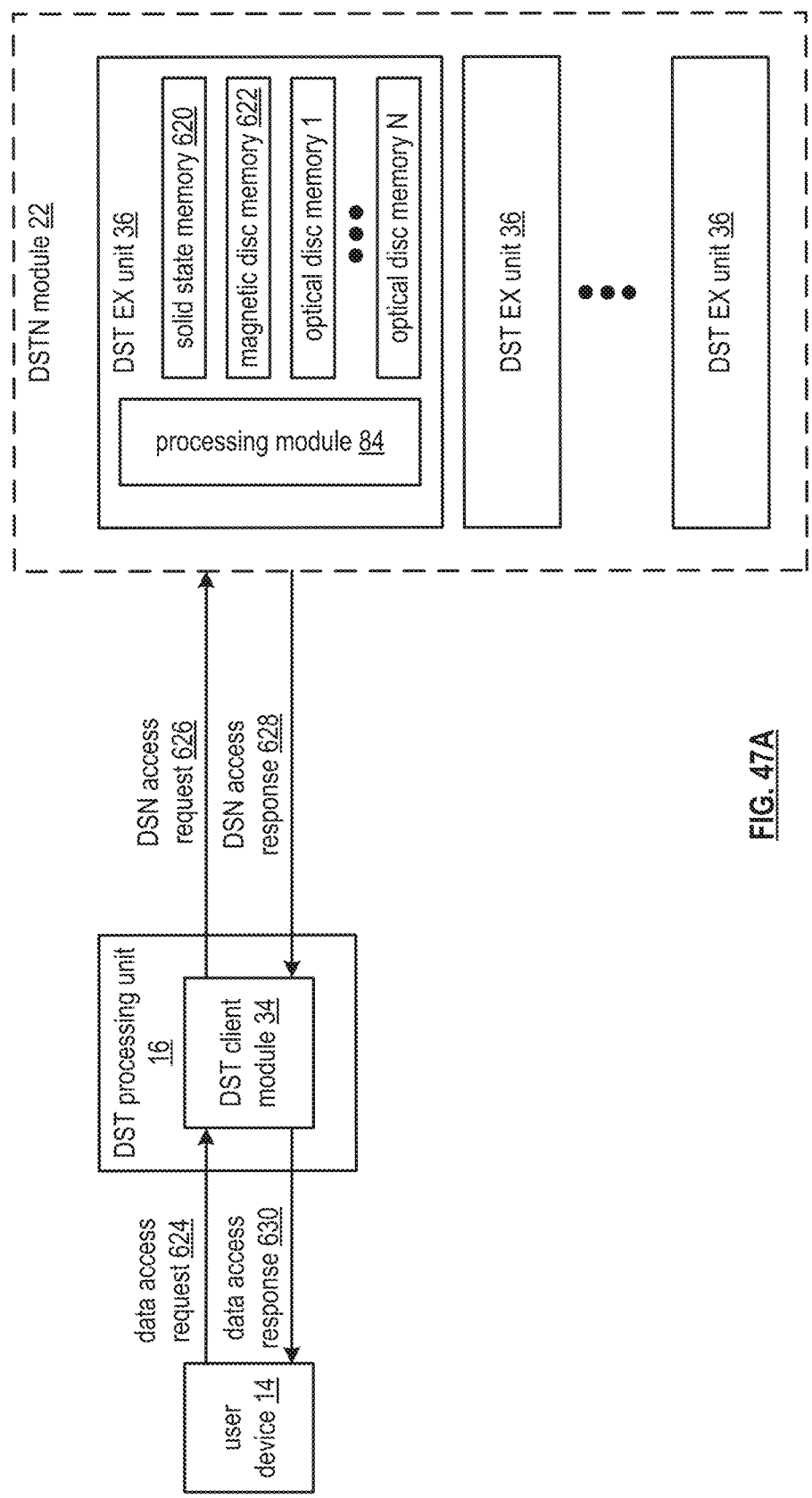
Figure 47B:
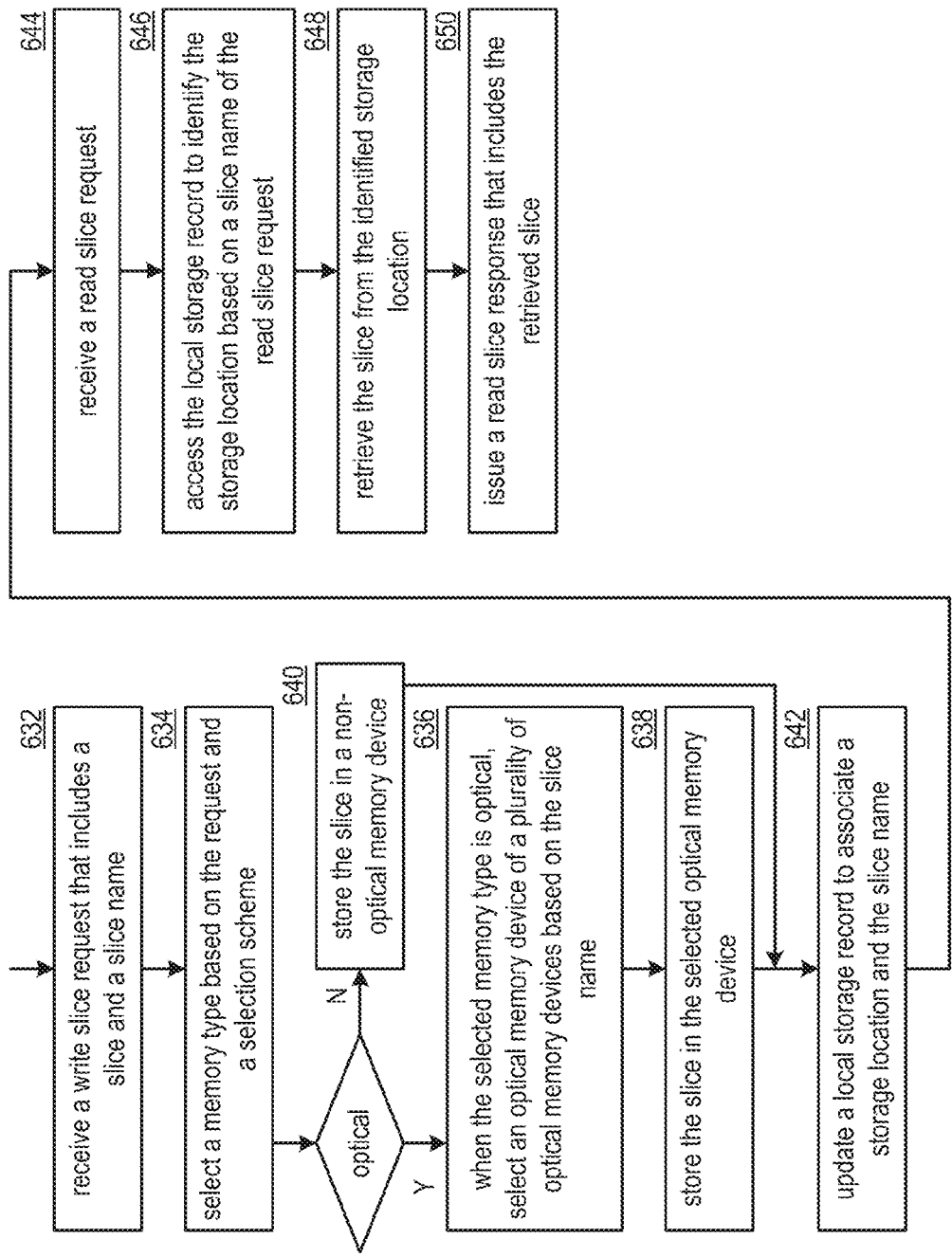
Figure 48A:
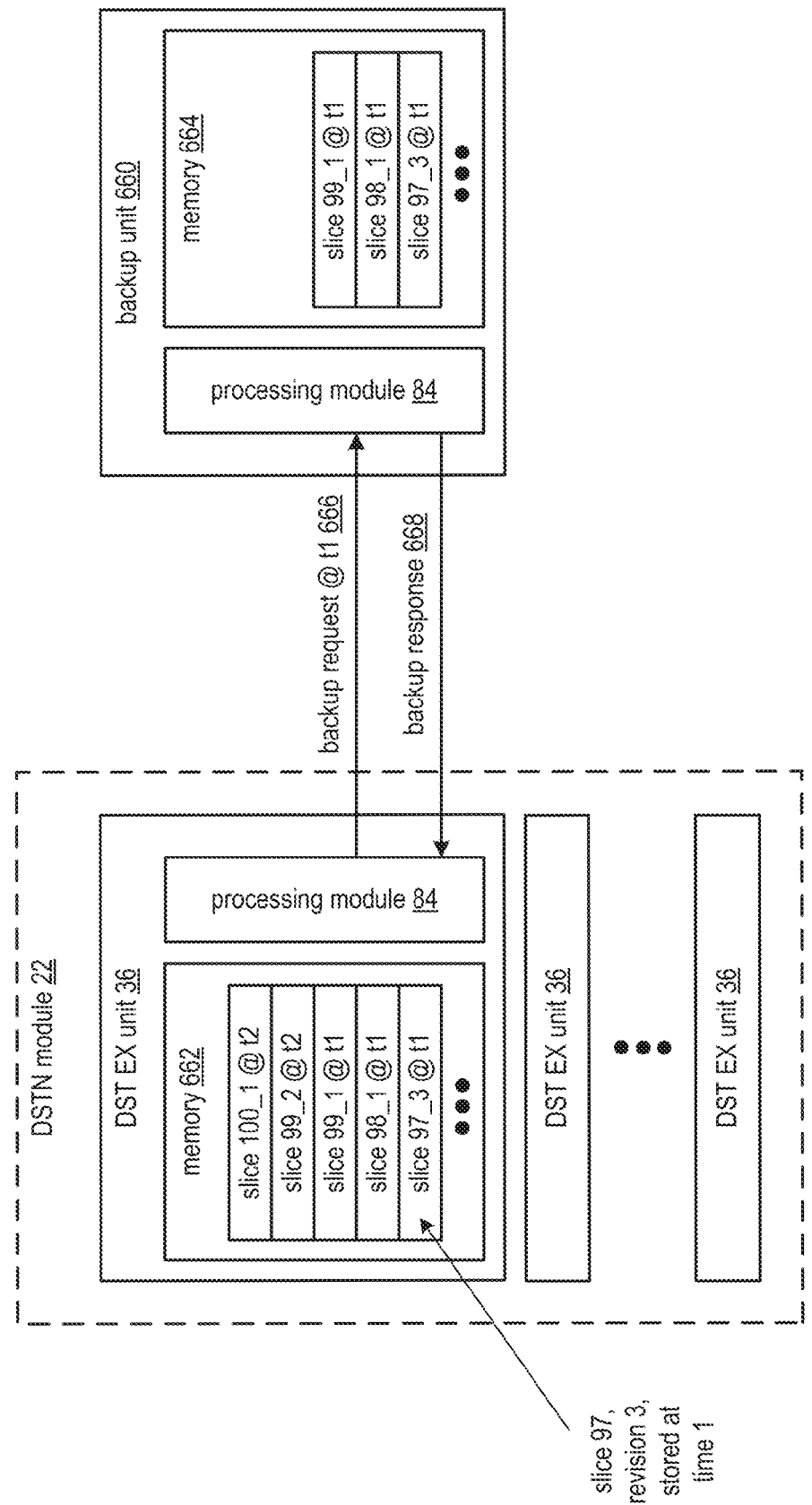
Figure 48B:
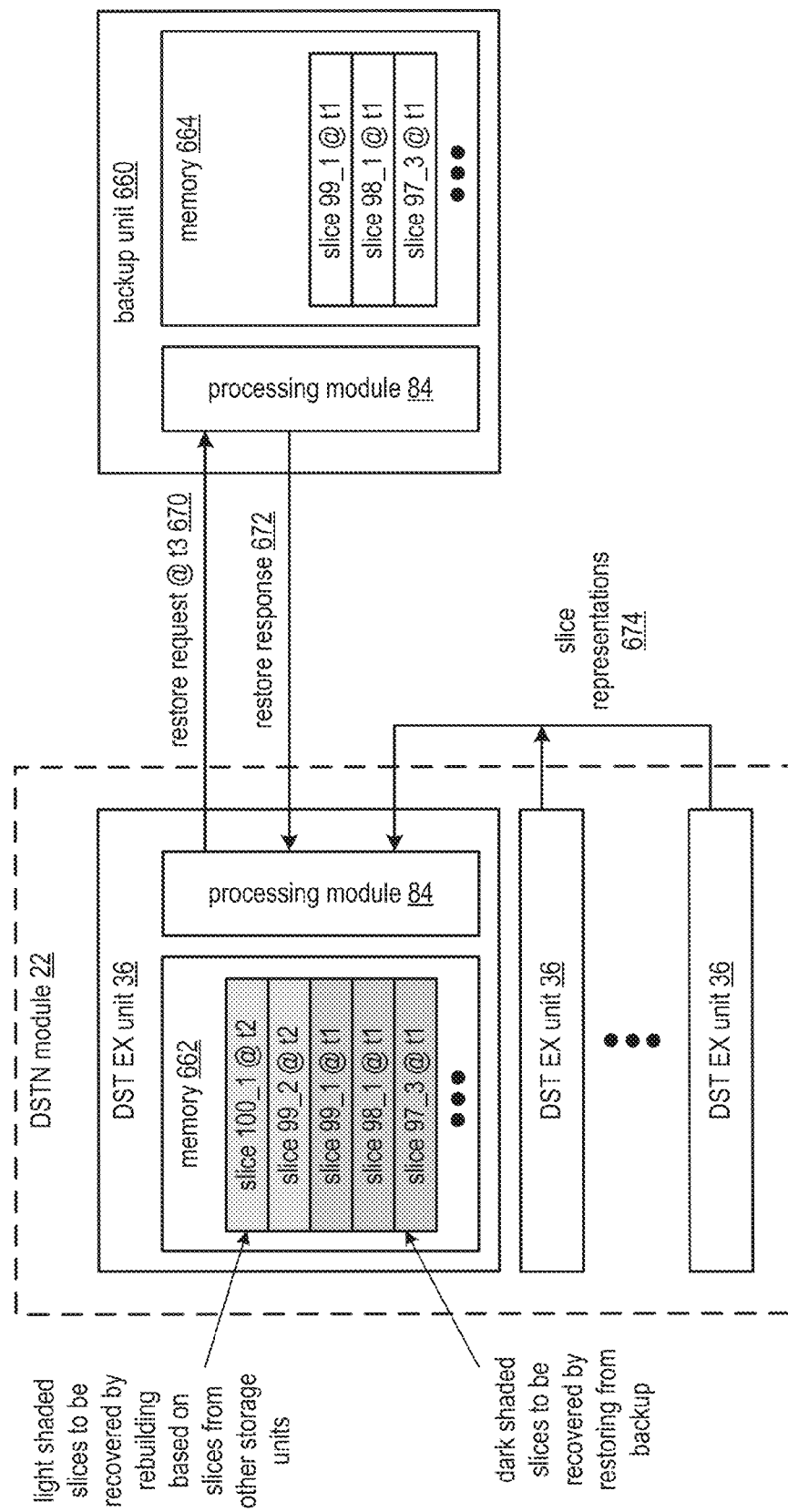
Figure 48C:
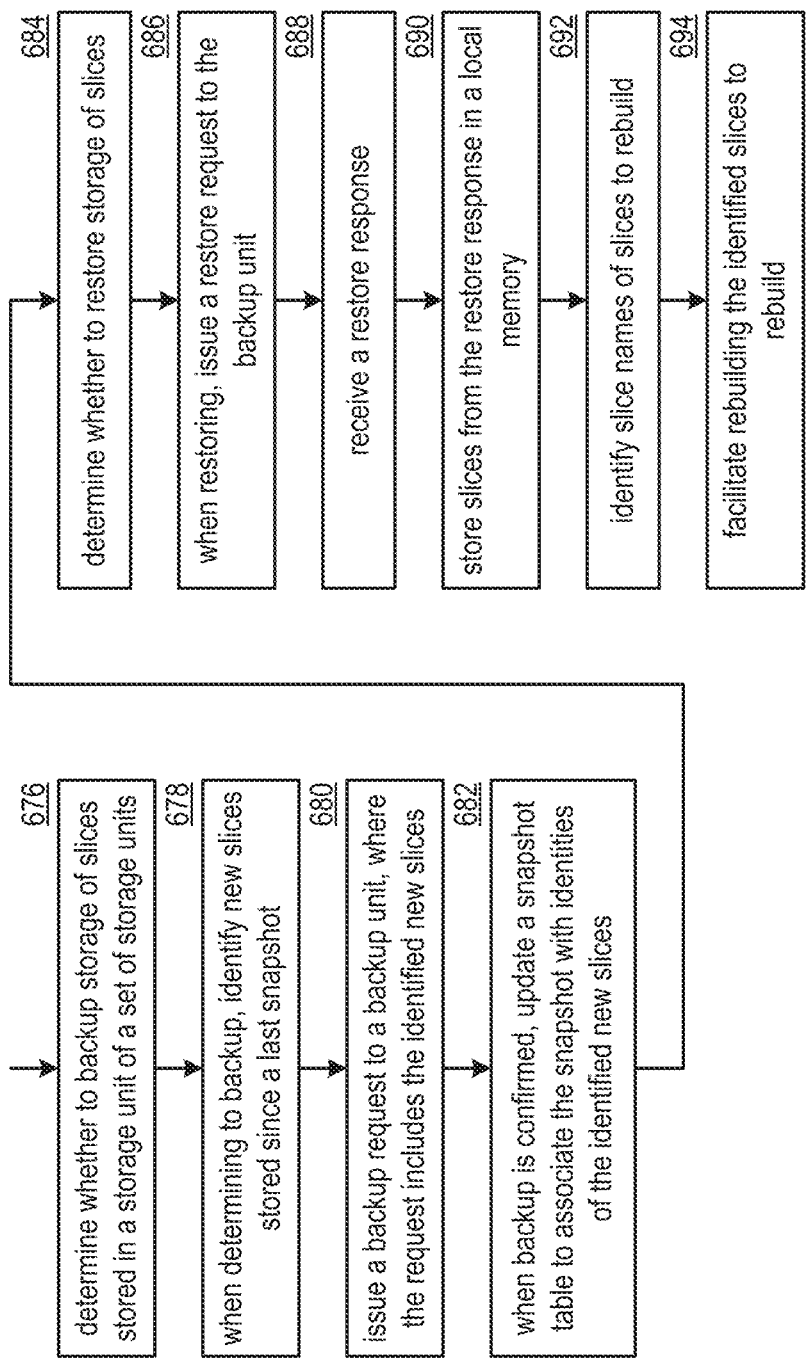

FIGS. 42A-C are schematic block diagrams of another embodiment of a dispersed storage network (DSN) in accordance with the present invention;

FIG. 42D is a flowchart illustrating another example of obtaining registry information in accordance with the present invention;

FIG. 43A is a schematic block diagram of another embodiment of a dispersed storage network (DSN) in accordance with the present invention;

FIG. 43B is a flowchart illustrating an example of prioritizing slice handling in accordance with the present invention;

FIG. 44A is a schematic block diagram of another embodiment of a dispersed storage network (DSN) in accordance with the present invention;

FIG. 44B is a flowchart illustrating an example of selecting a memory type in accordance with the present invention;

FIG. 45 is a flowchart illustrating another example of generating billing information in accordance with the present invention;

FIG. 46A is a schematic block diagram of another embodiment of a dispersed storage network (DSN) in accordance with the present invention;

FIG. 46B is a flowchart illustrating an example of transferring slices in accordance with the present invention;

FIG. 47A is a schematic block diagram of another embodiment of a dispersed storage network (DSN) in accordance with the present invention;

FIG. 47B is a flowchart illustrating an example of selecting a memory device in accordance with the present invention;

FIGS. 48A-48B are schematic block diagrams of other embodiments of a dispersed storage network (DSN) in accordance with the present invention; and FIG. 48C is a flowchart illustrating an example of restoring slices in accordance with the present invention.

DETAILED DESCRIPTION OF THE INVENTION

Figure 1:
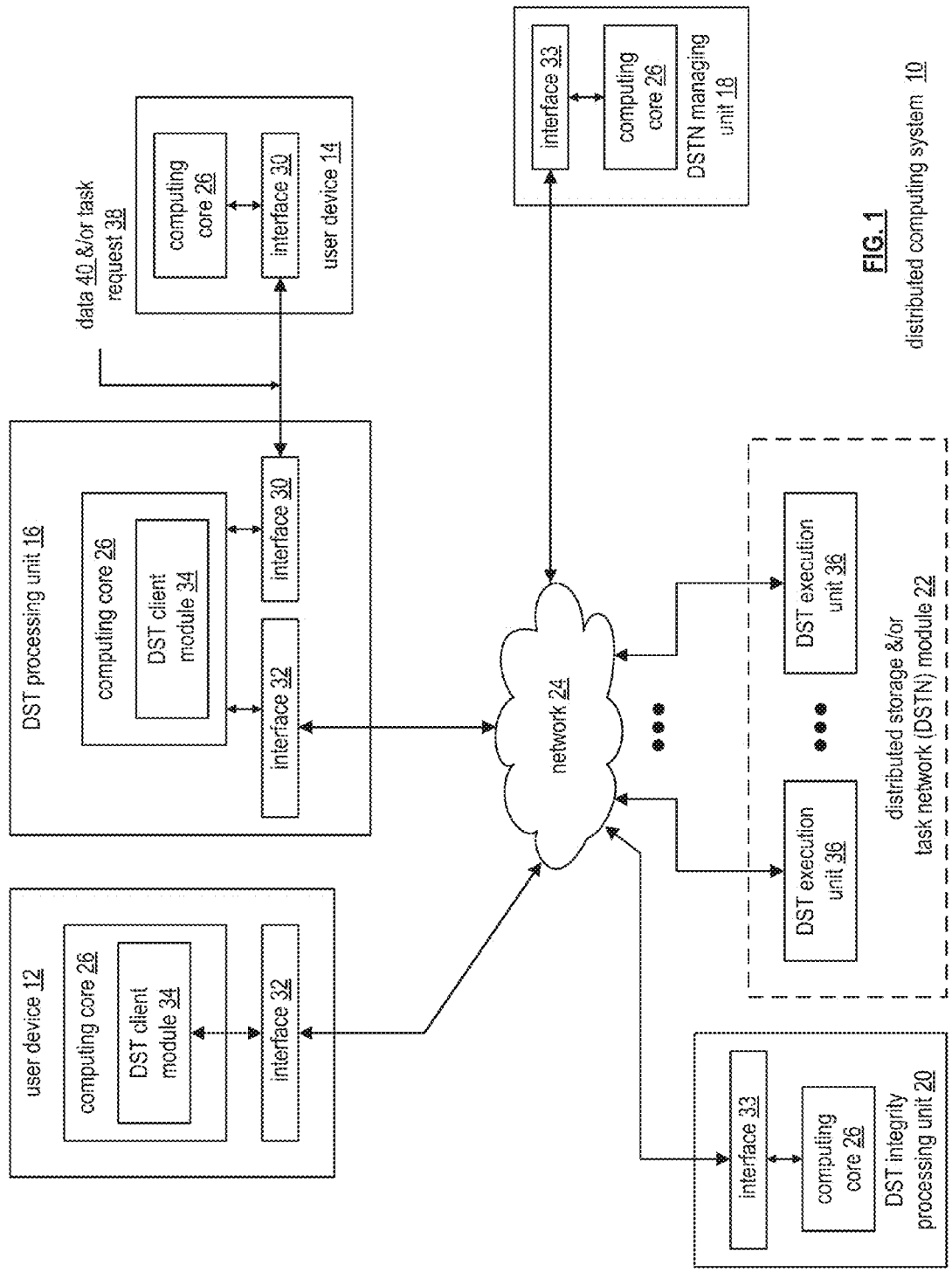
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
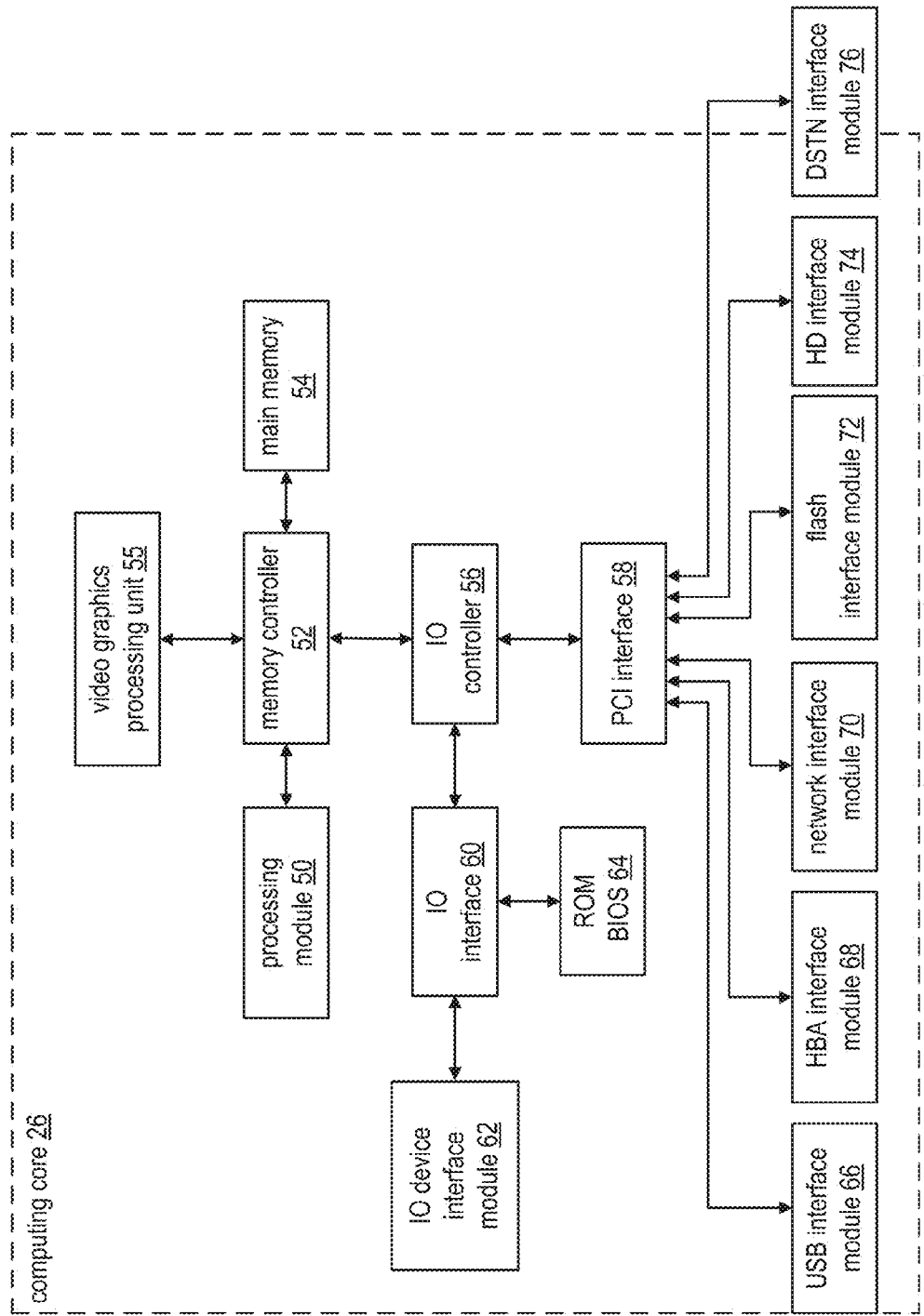
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
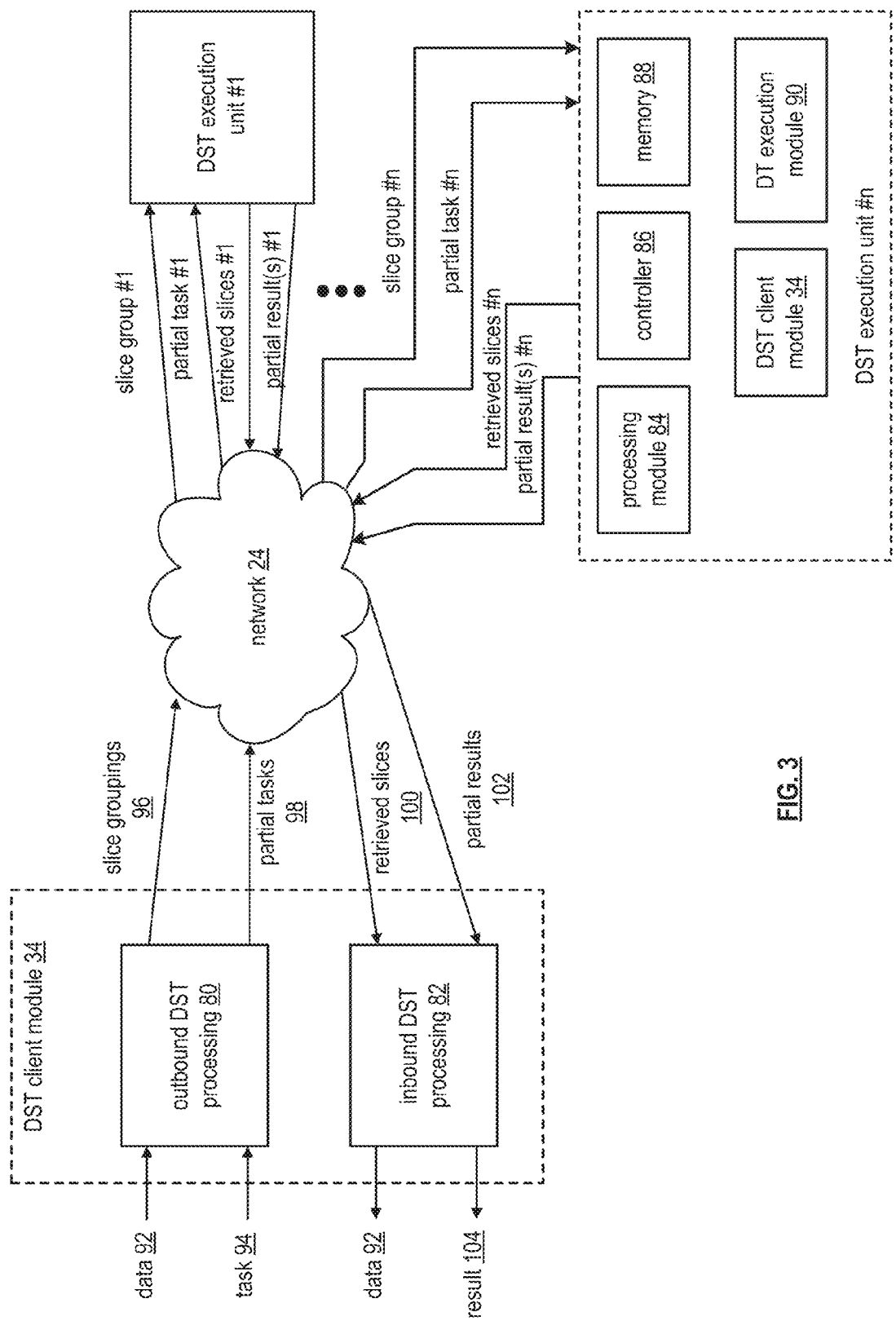
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1.

The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
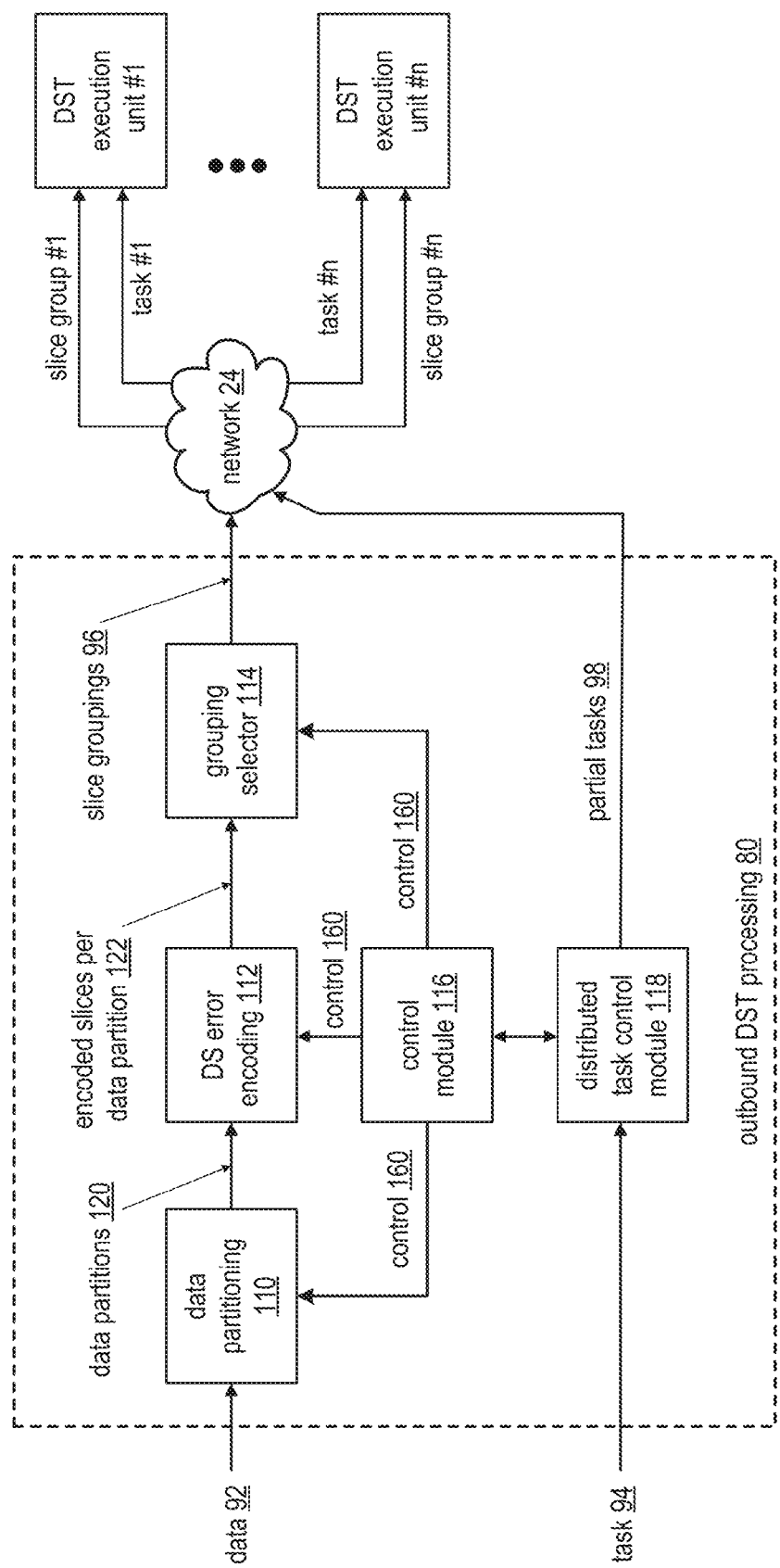
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
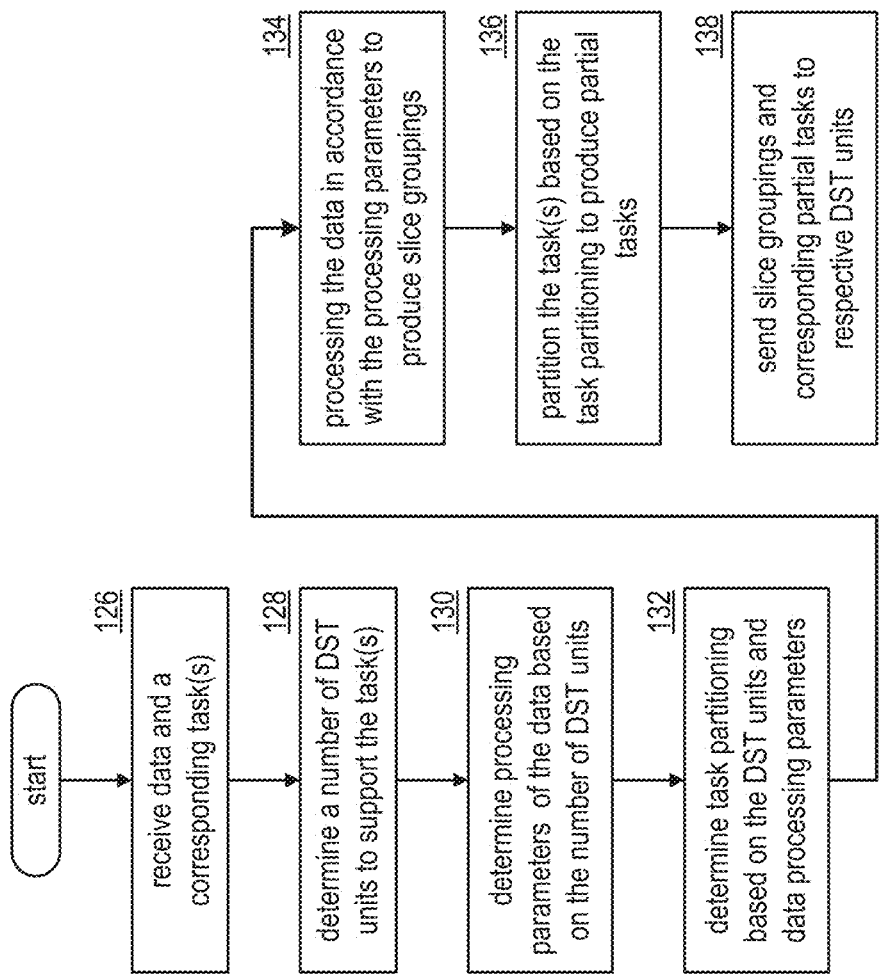
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
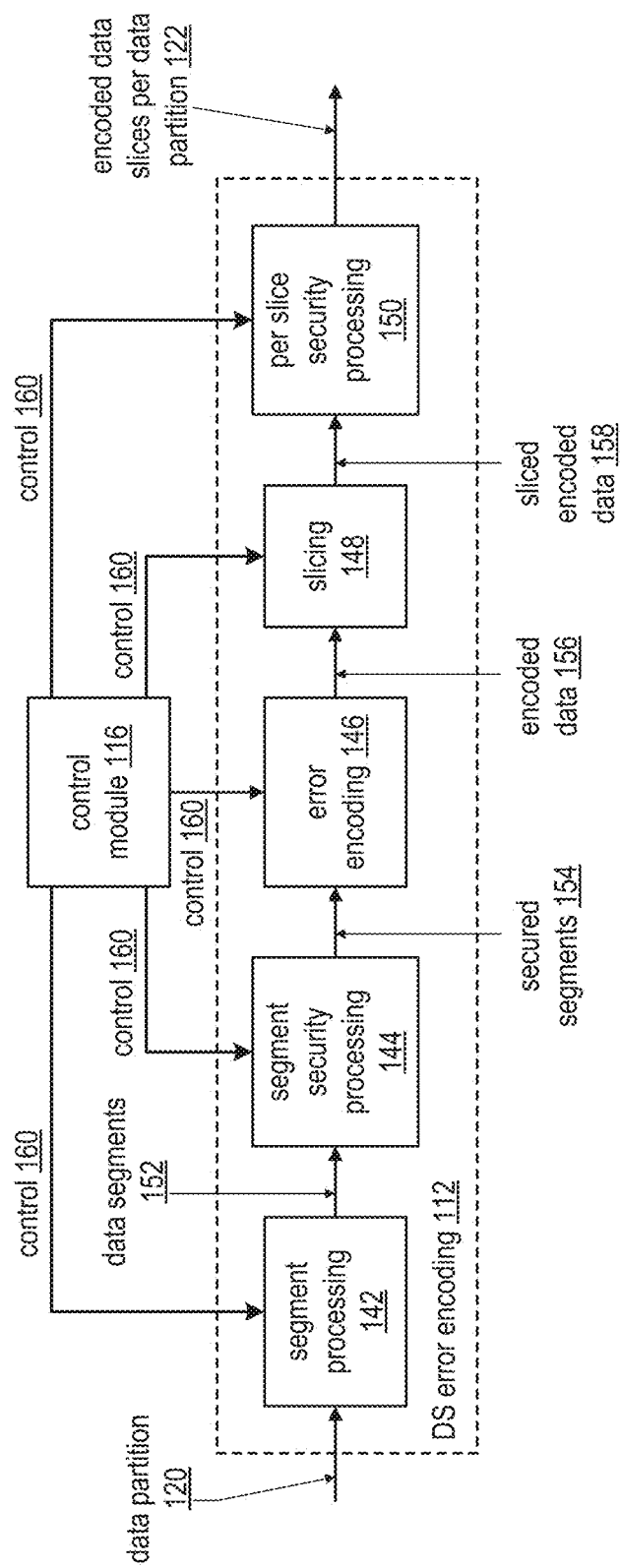
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
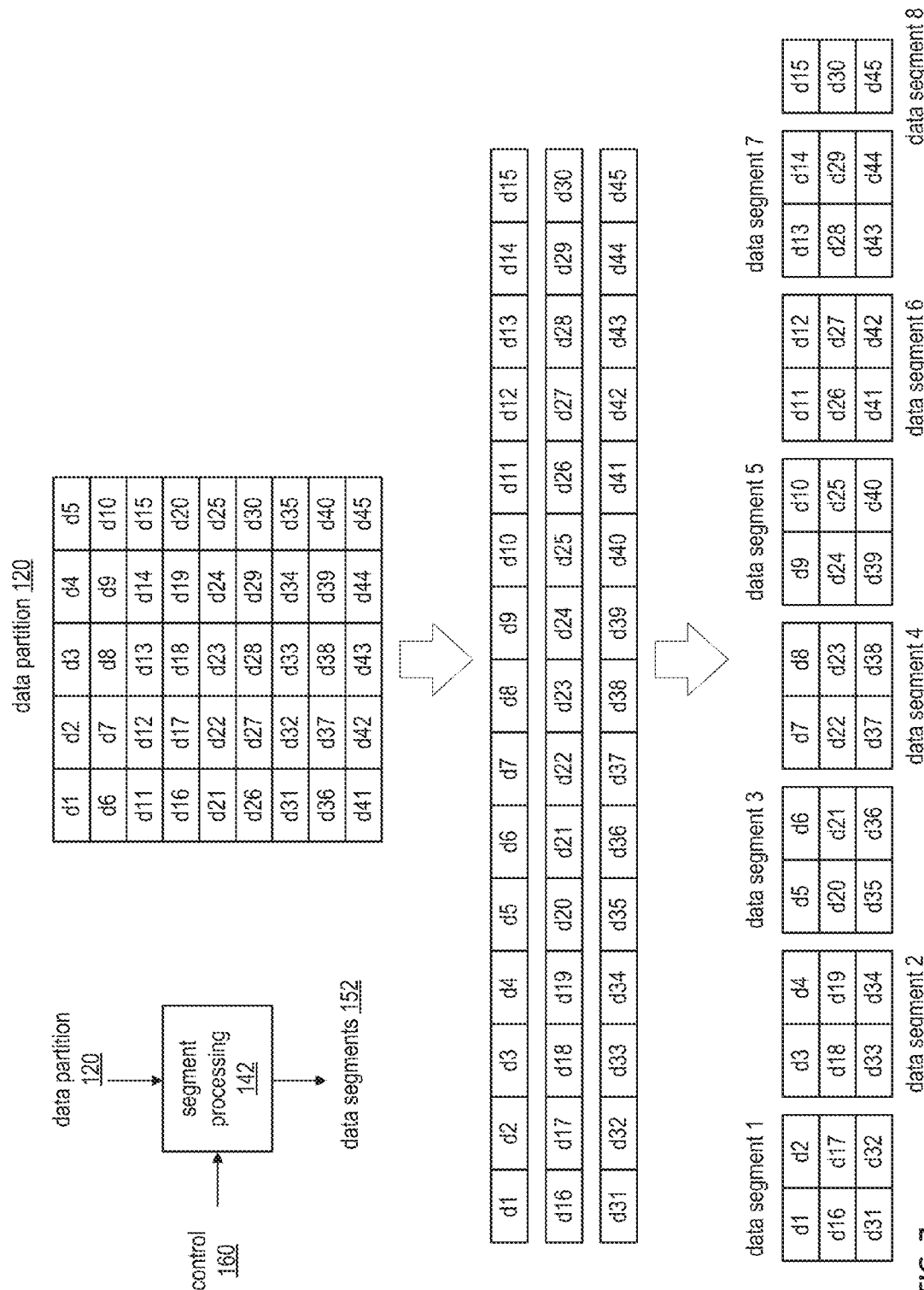
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
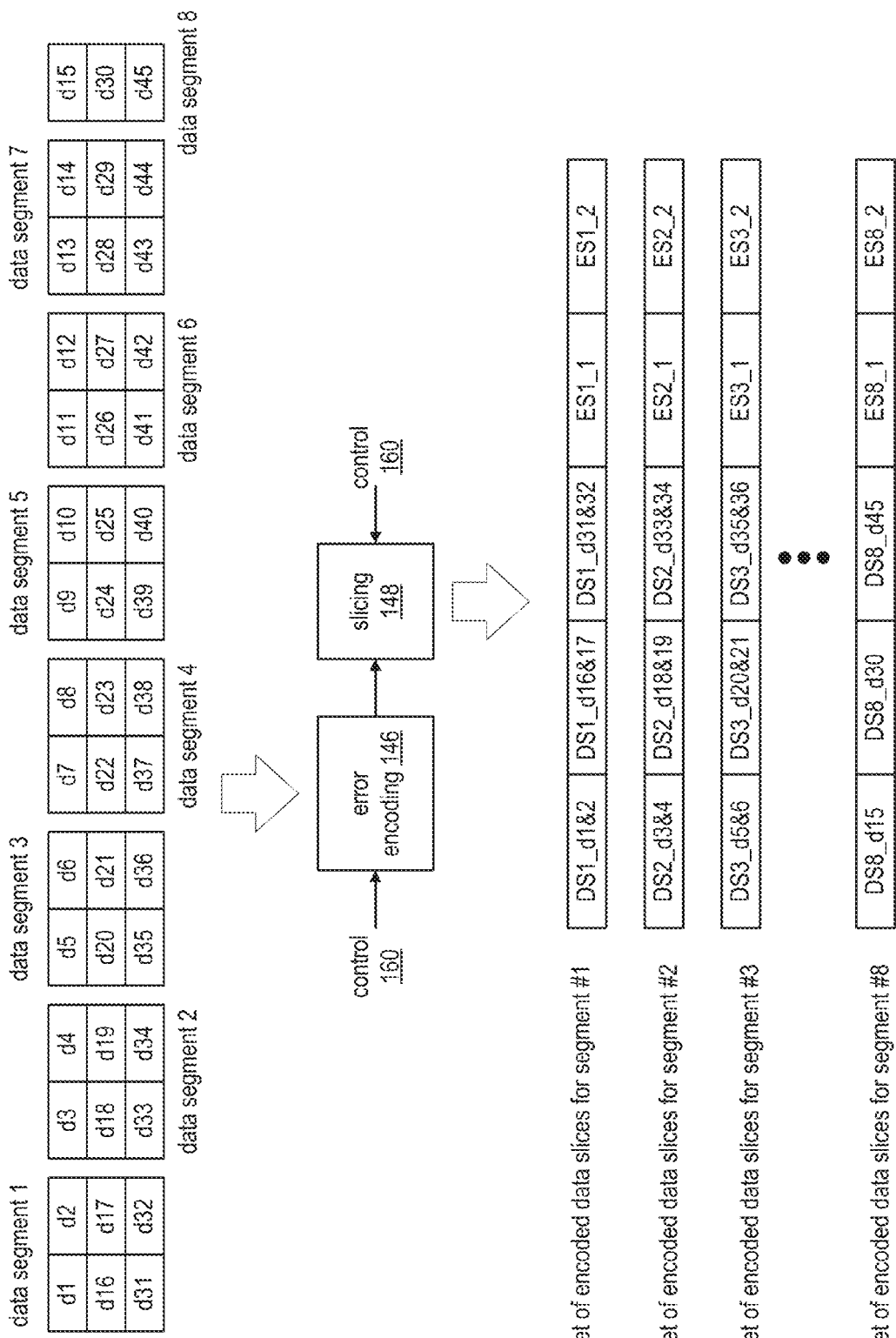
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
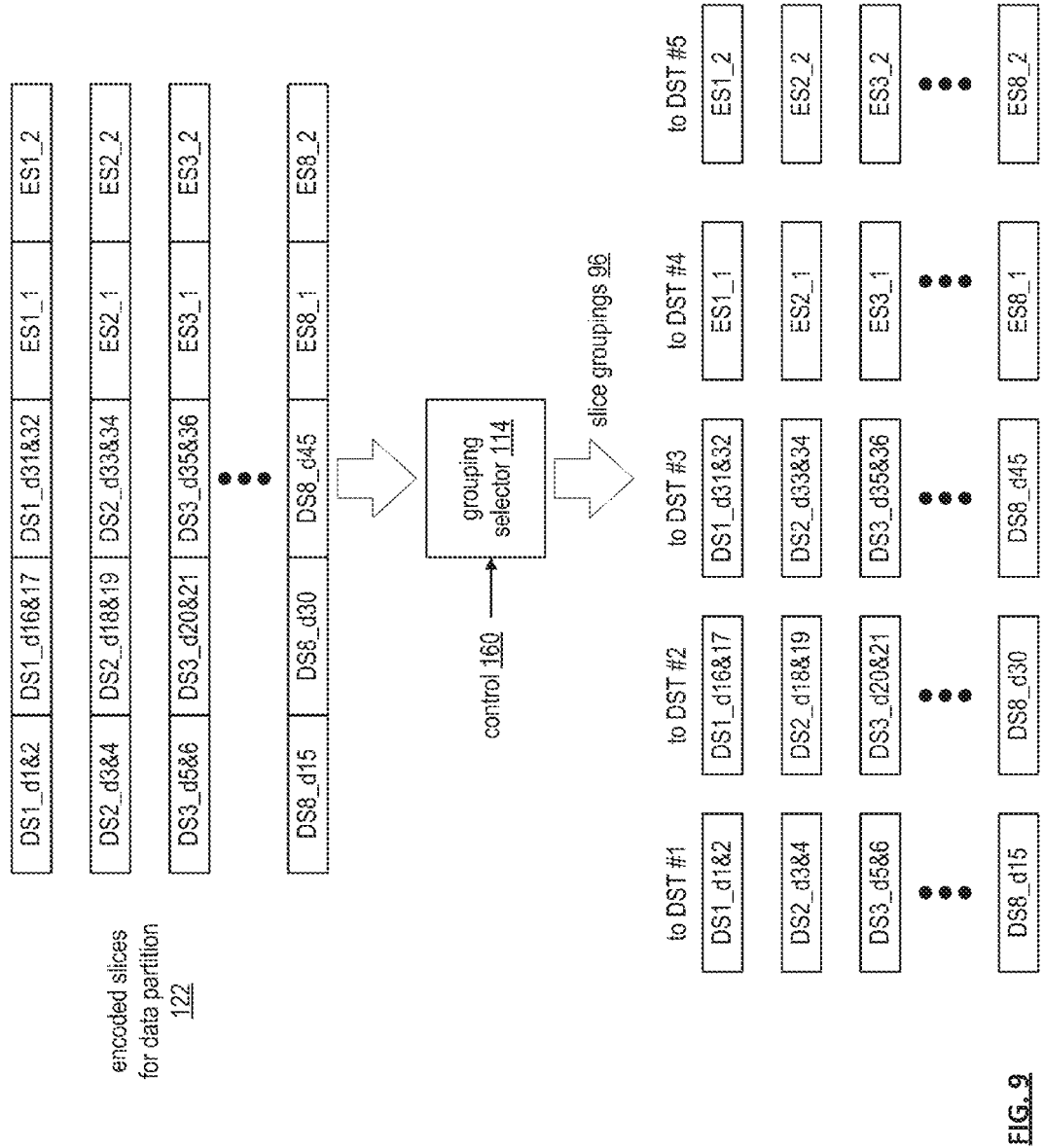
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
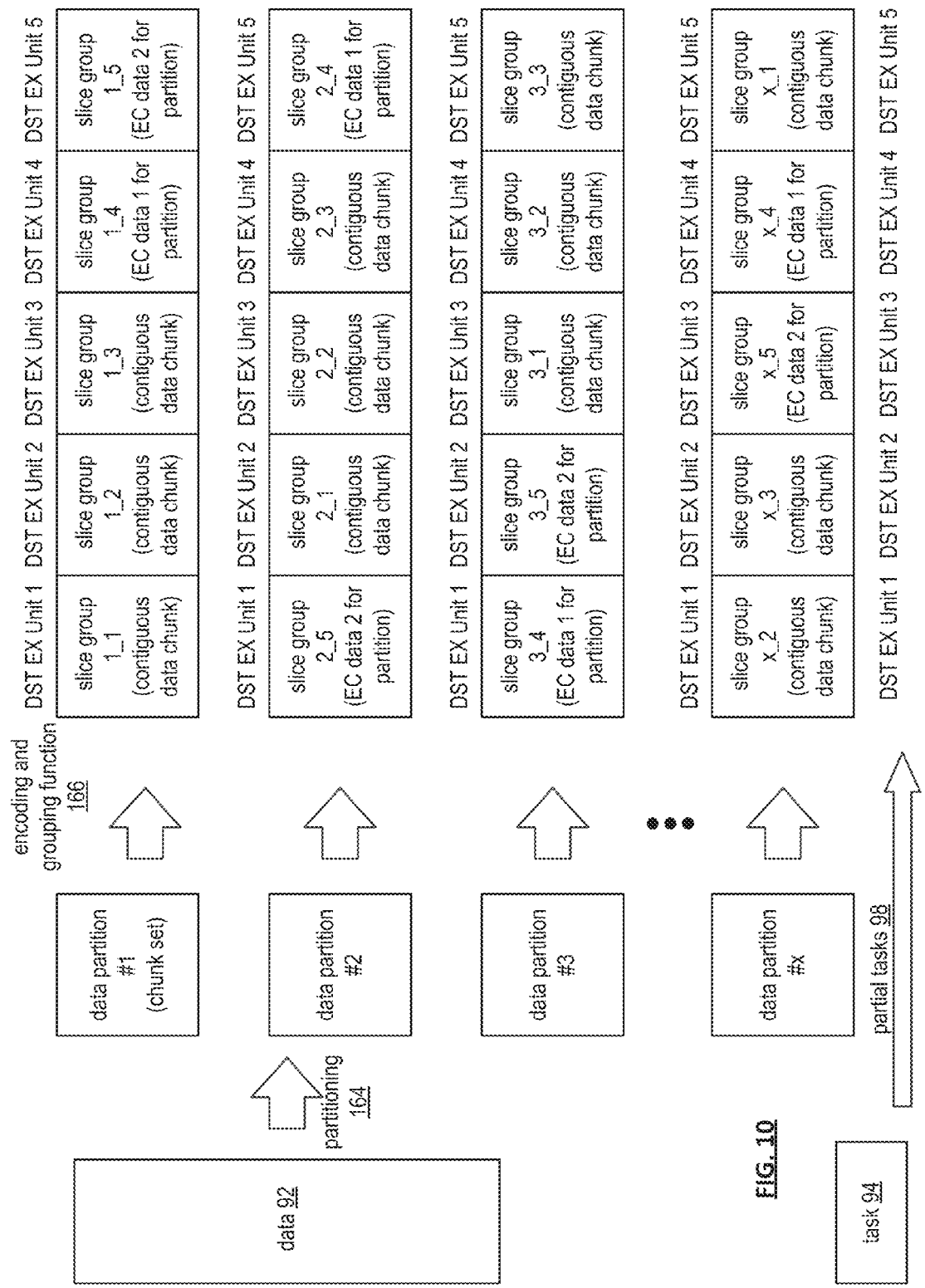
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1–x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
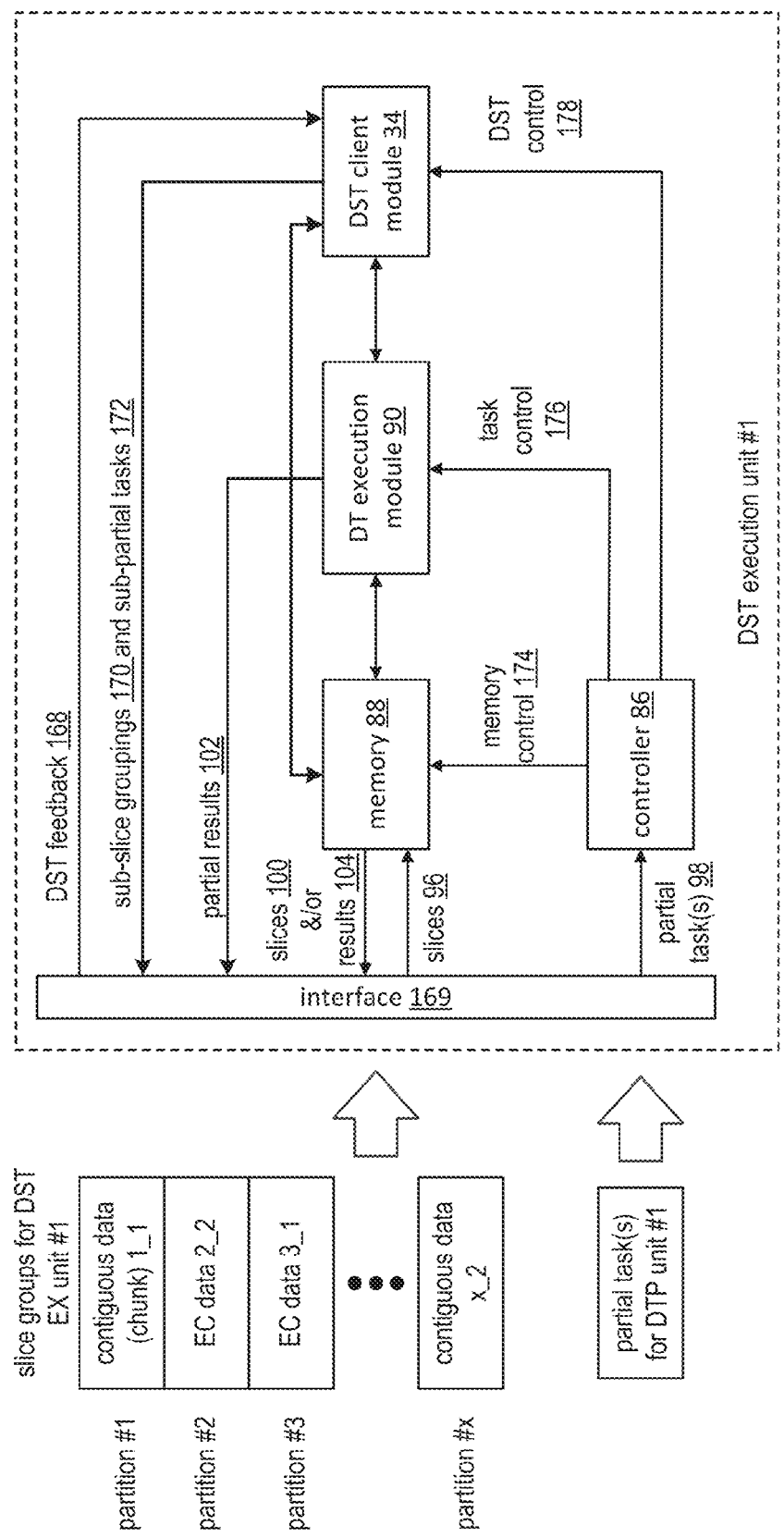
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
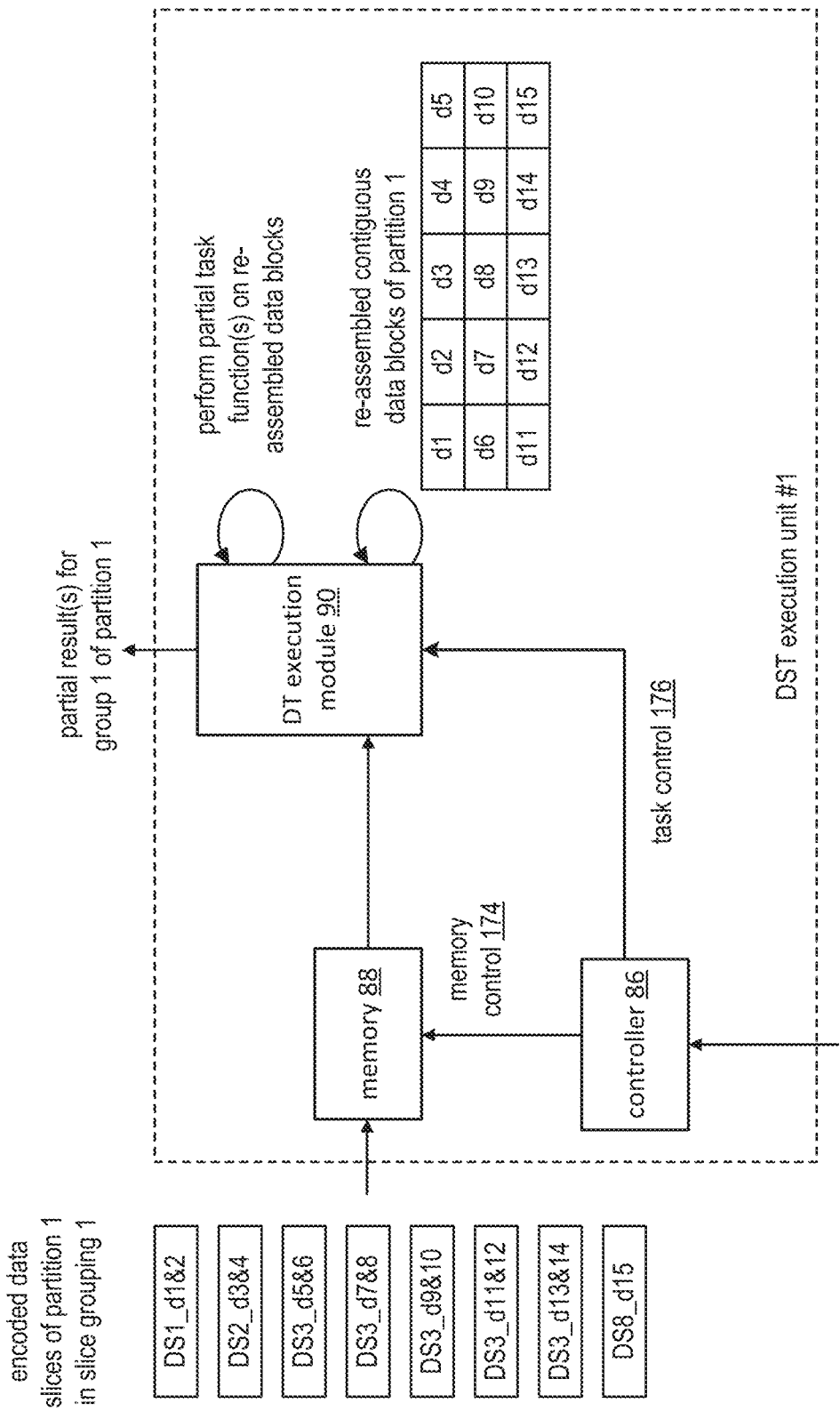
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
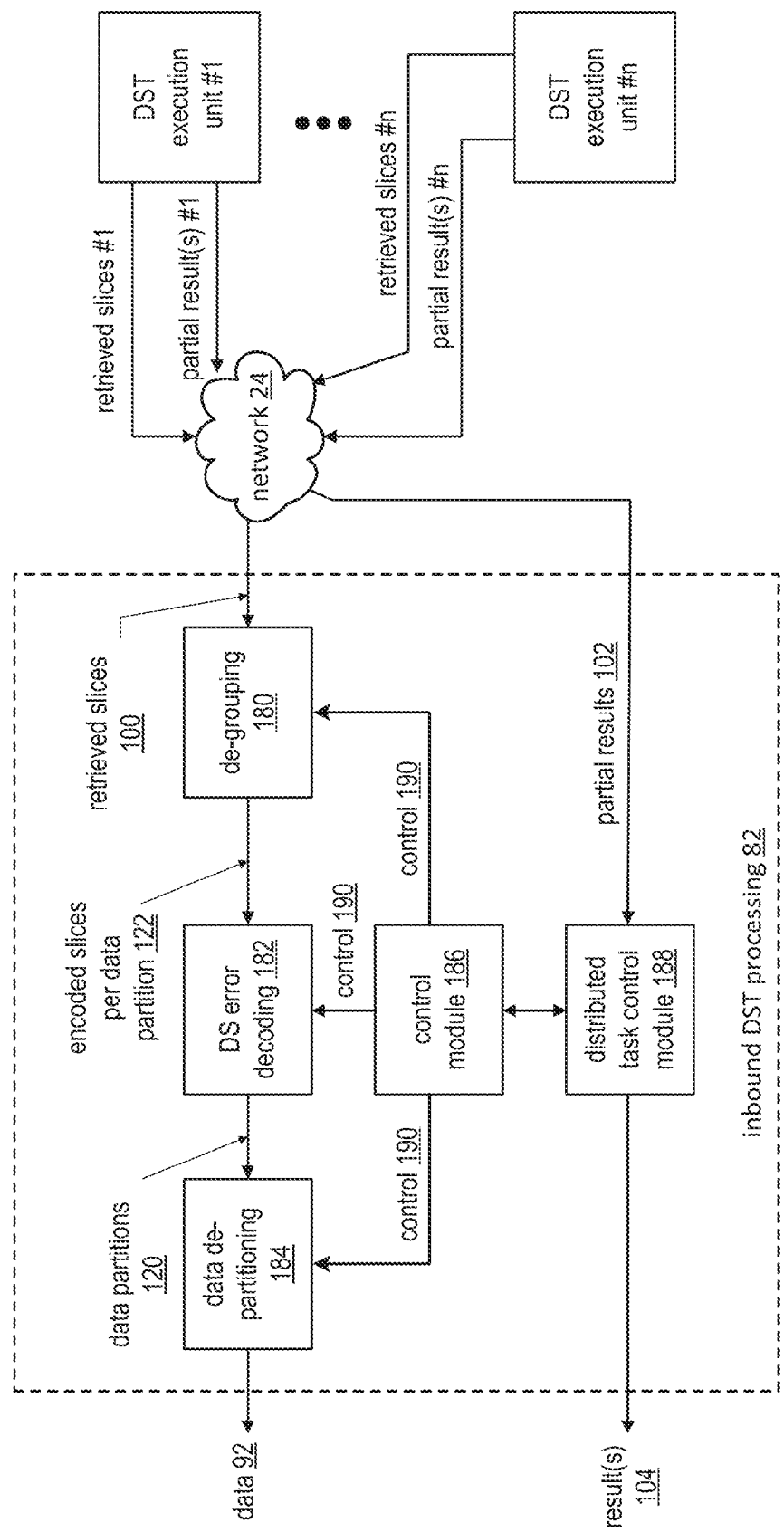
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
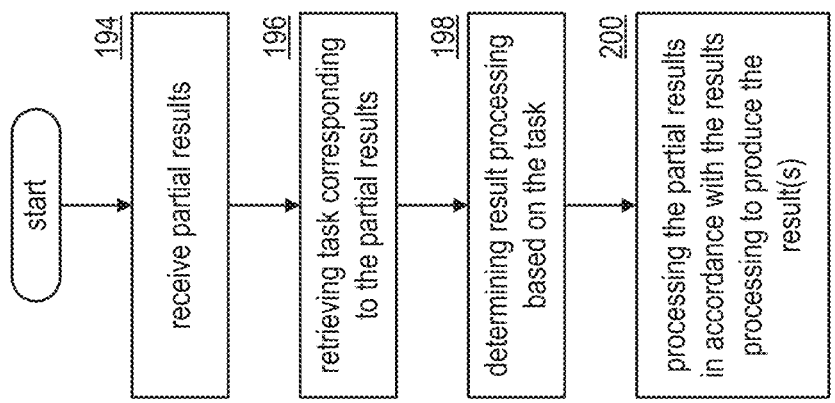
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
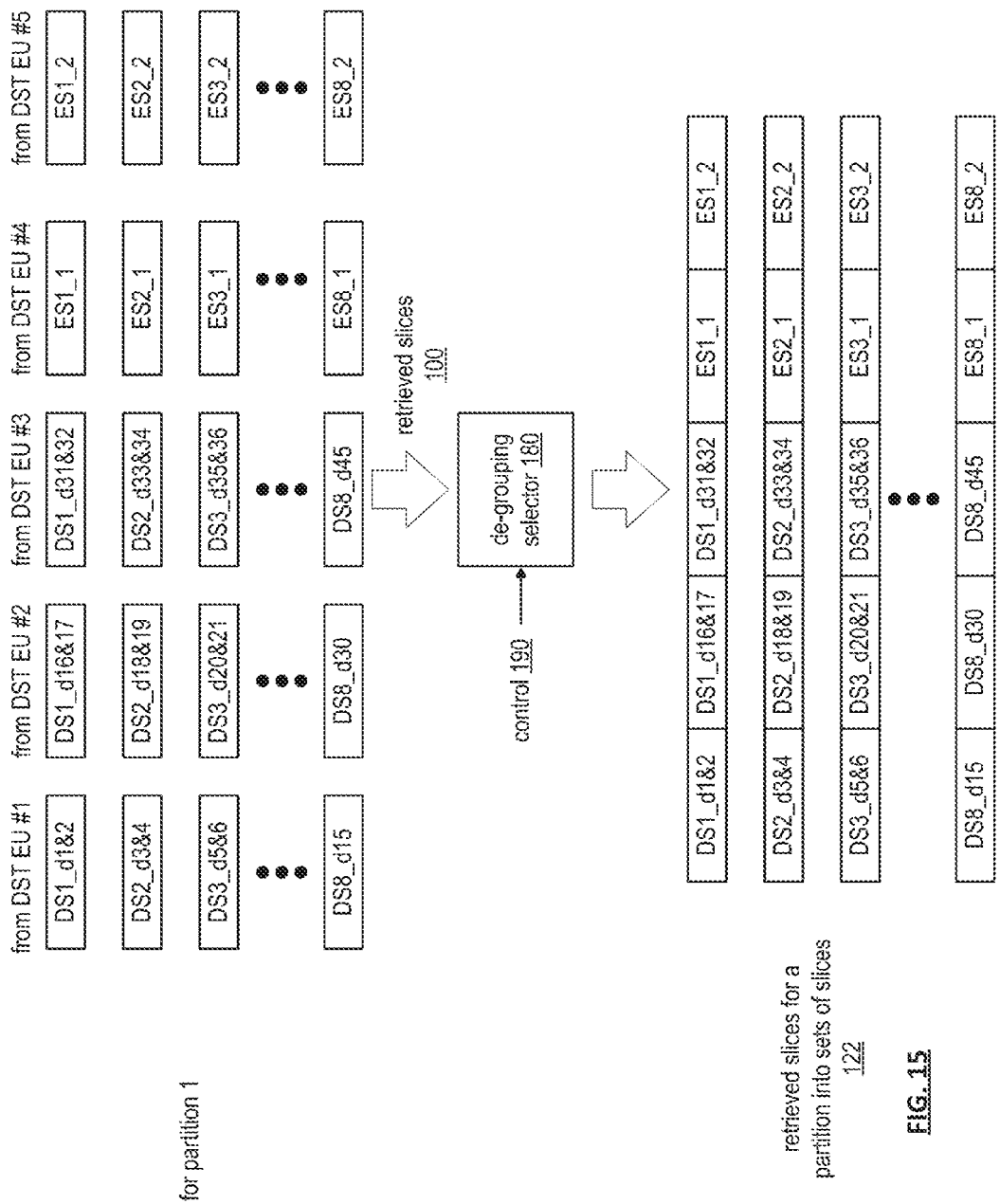
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
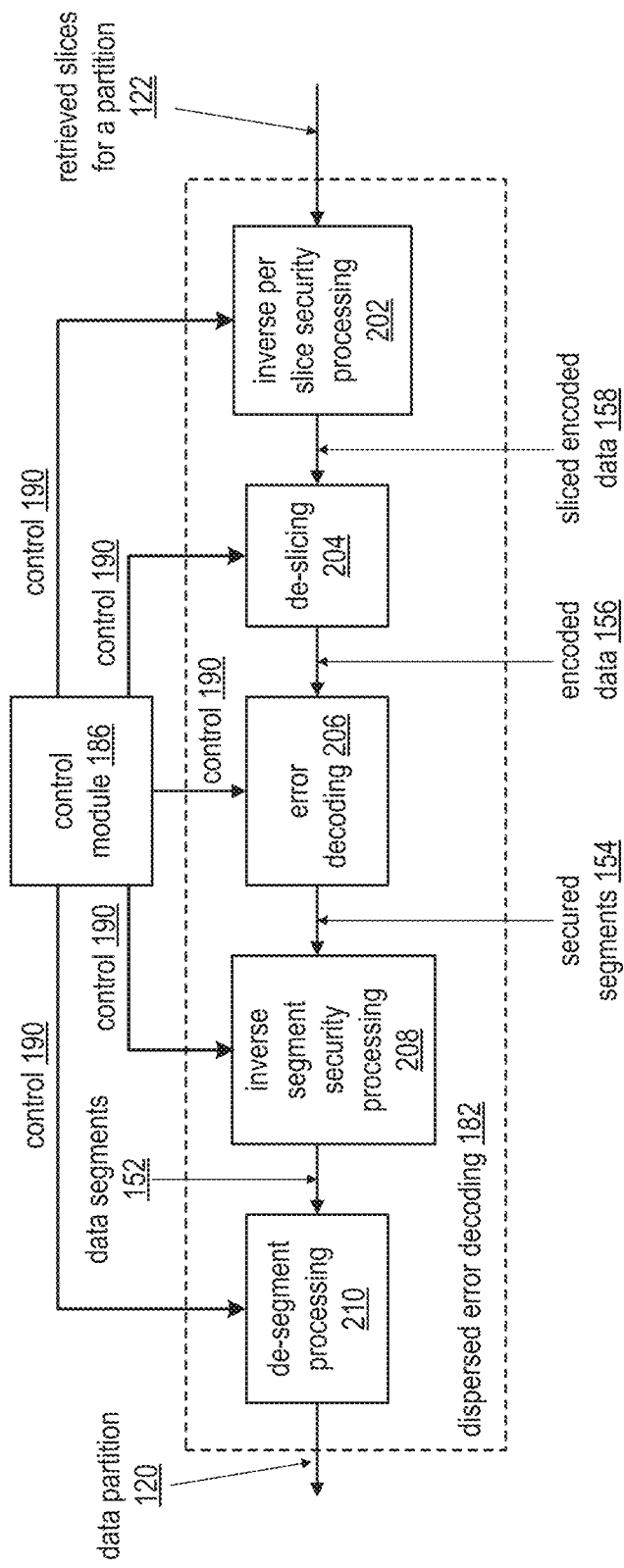
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
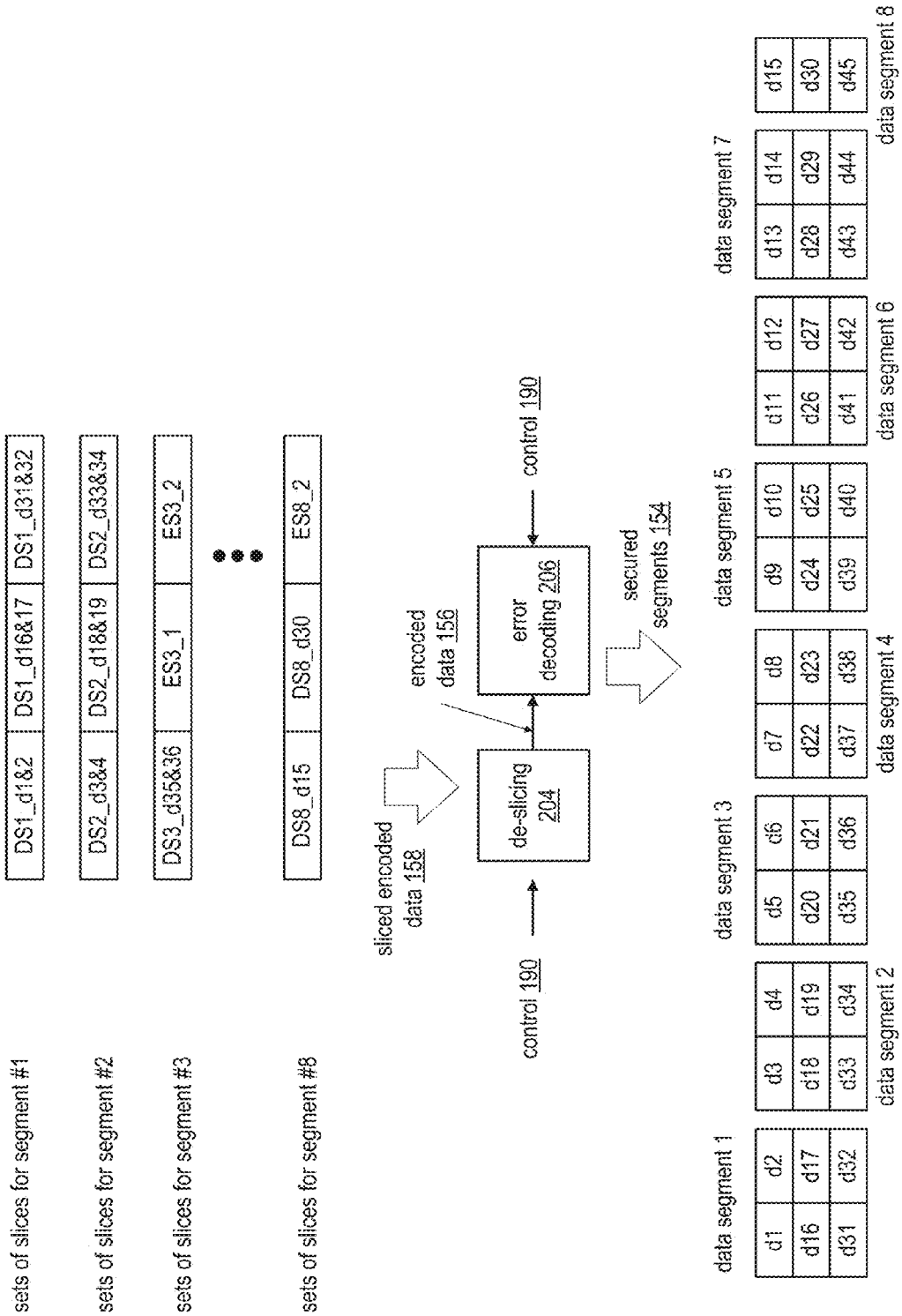
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
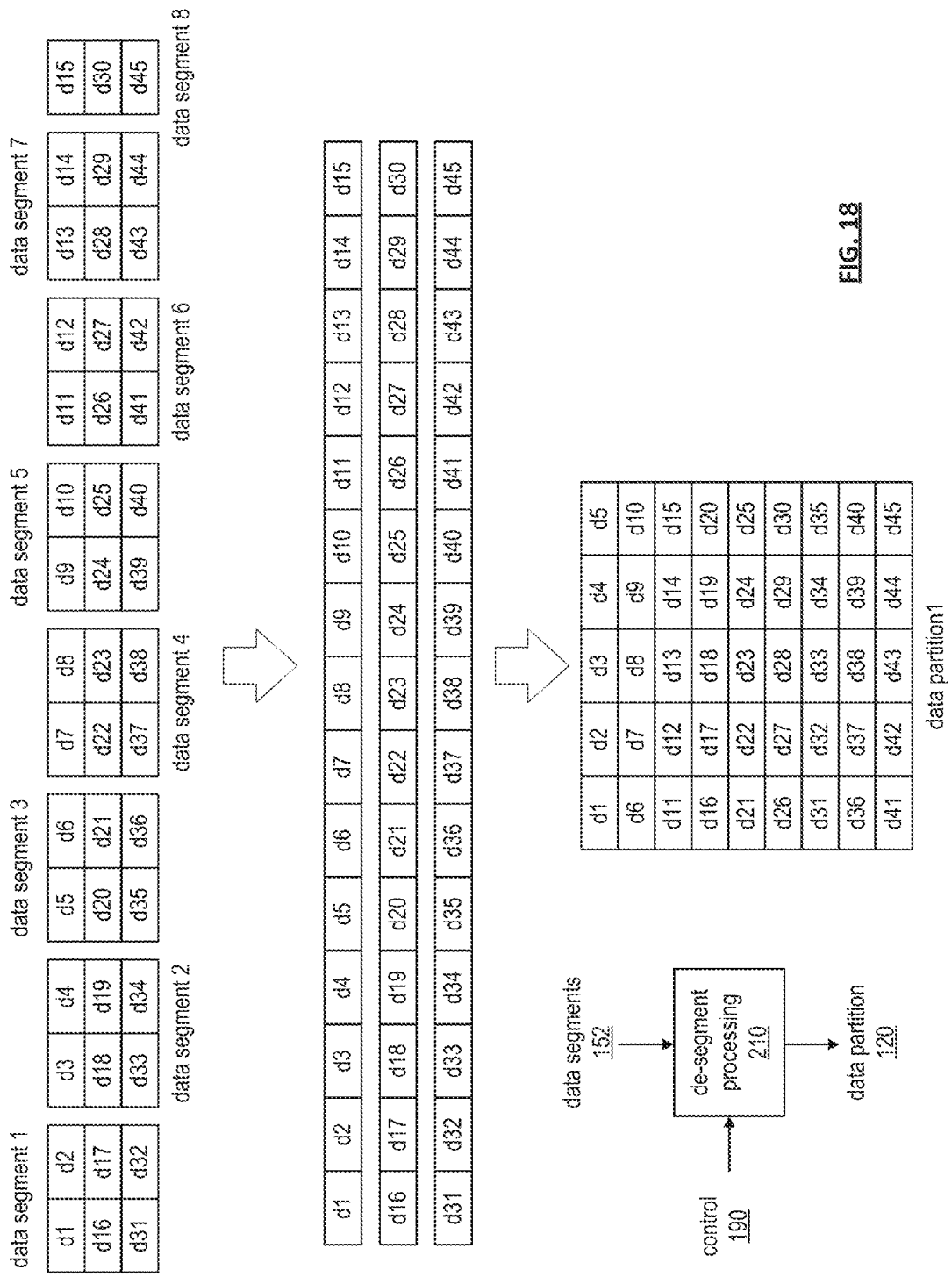
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
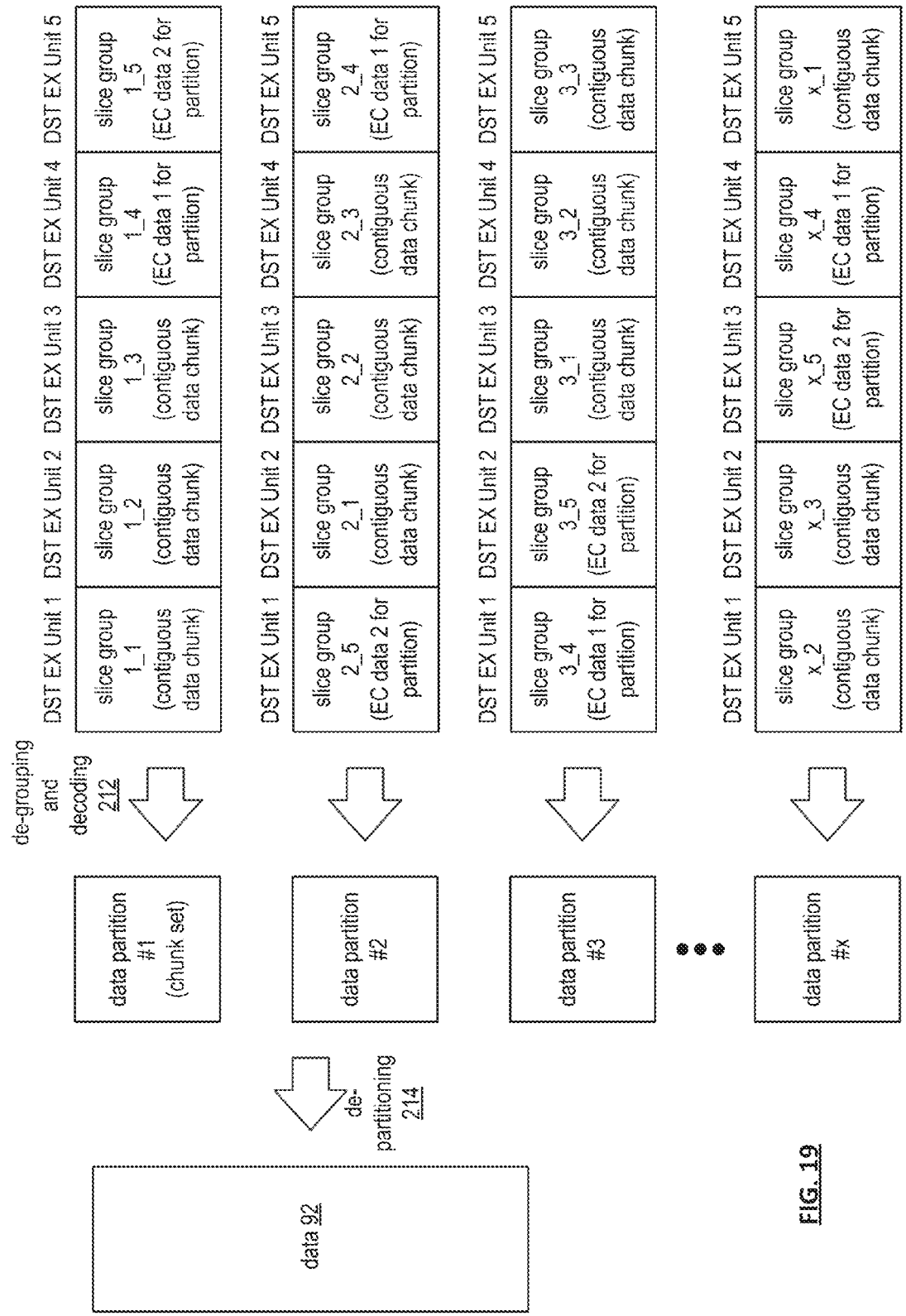
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
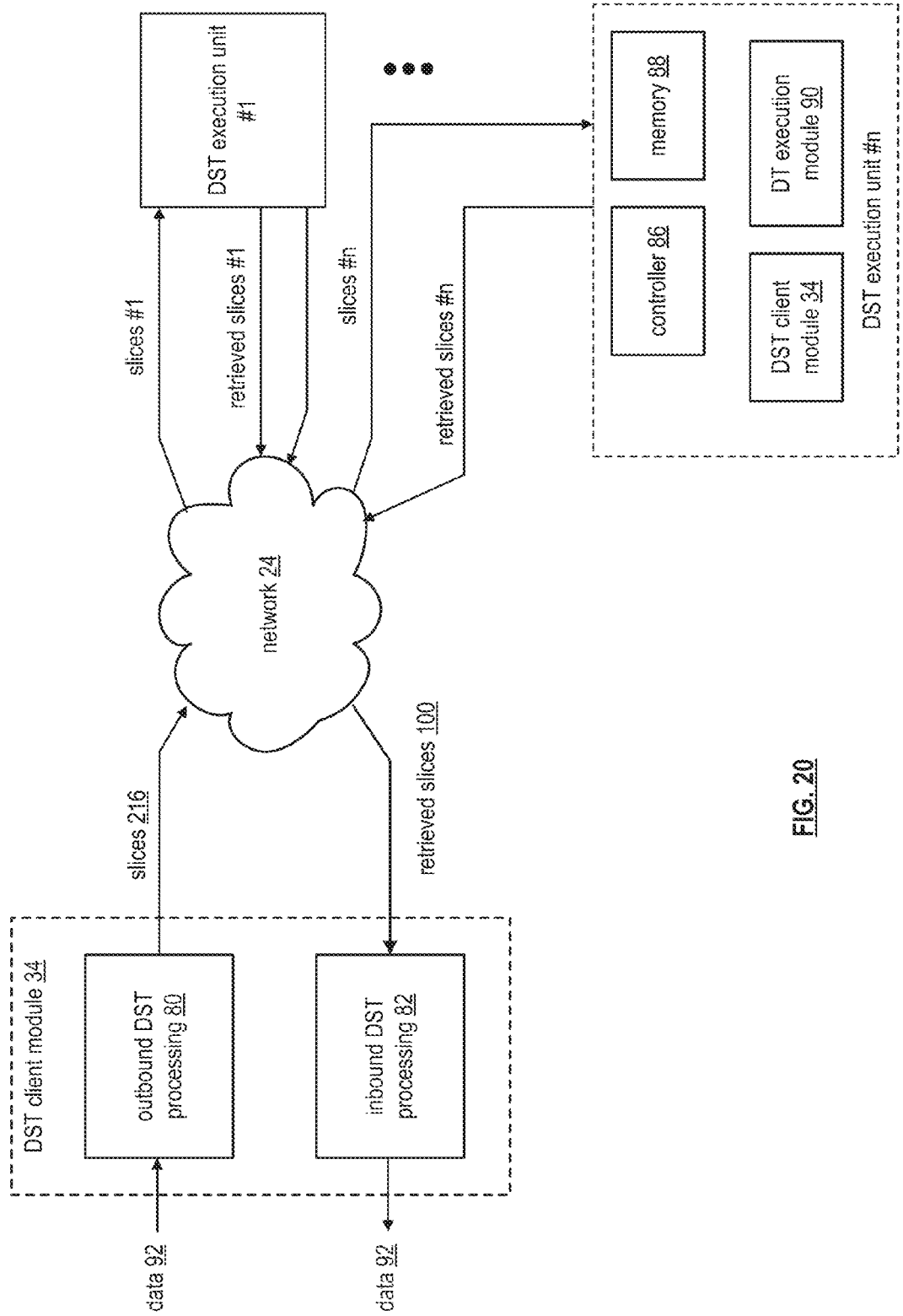
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
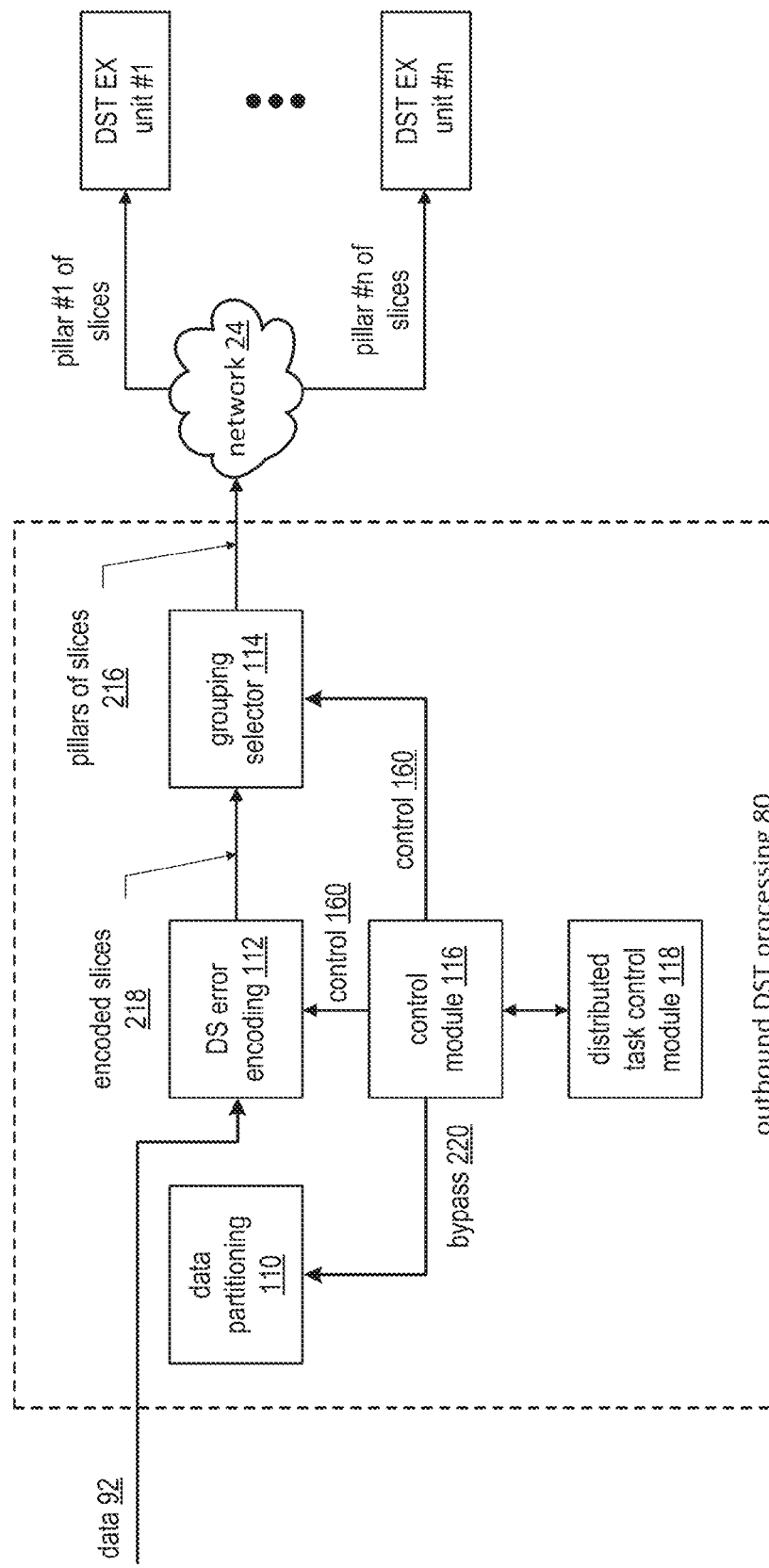
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
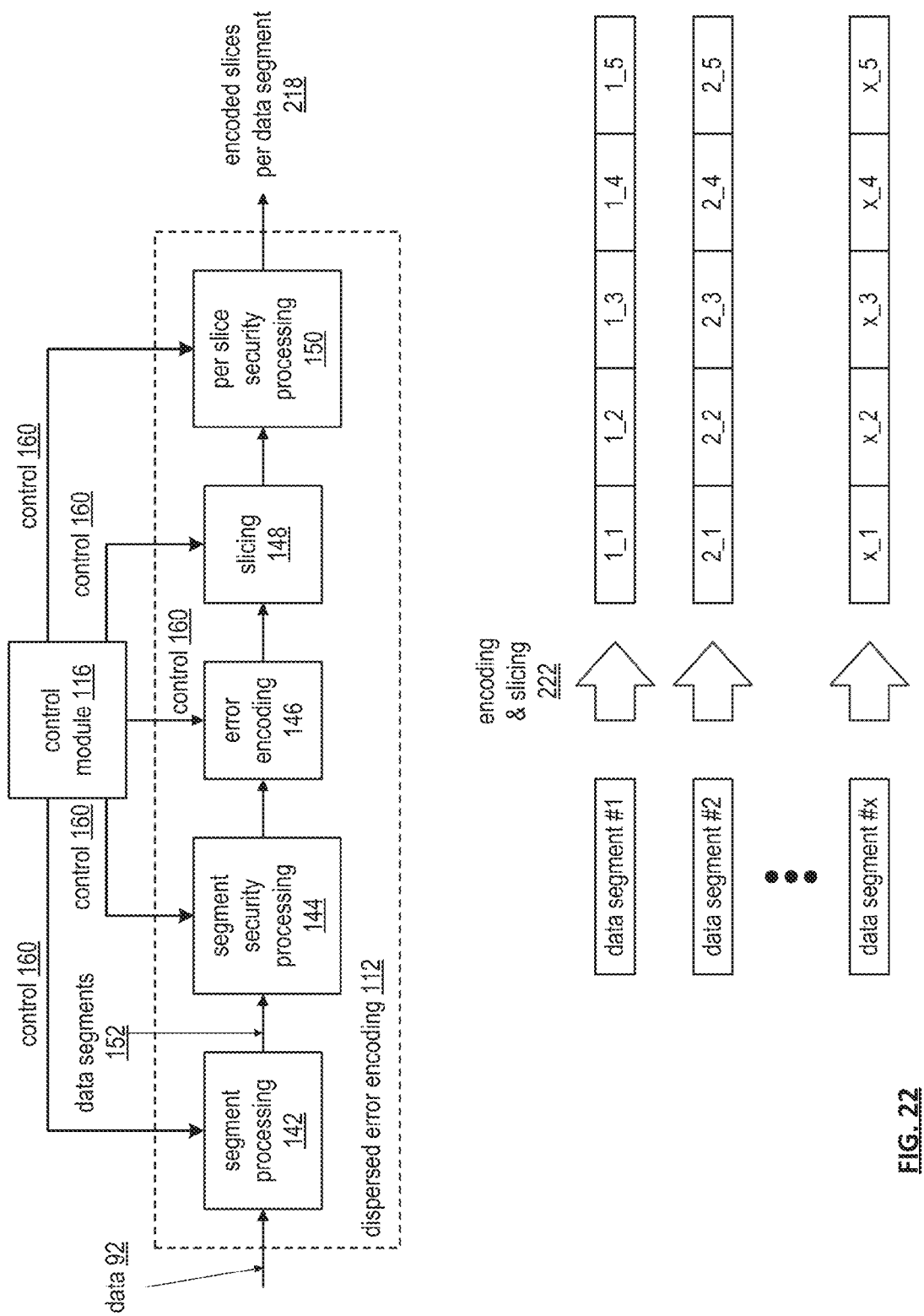
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
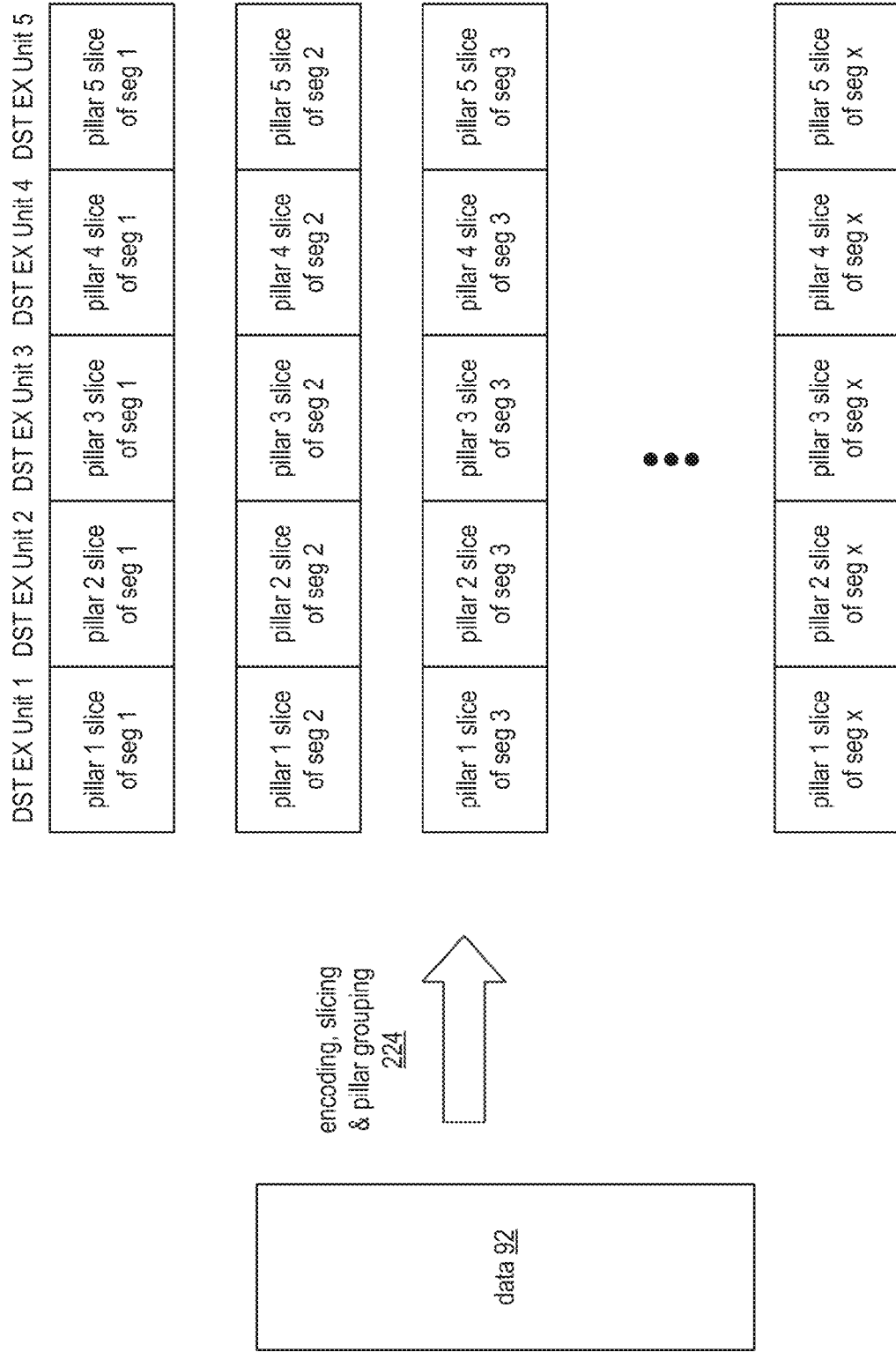
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
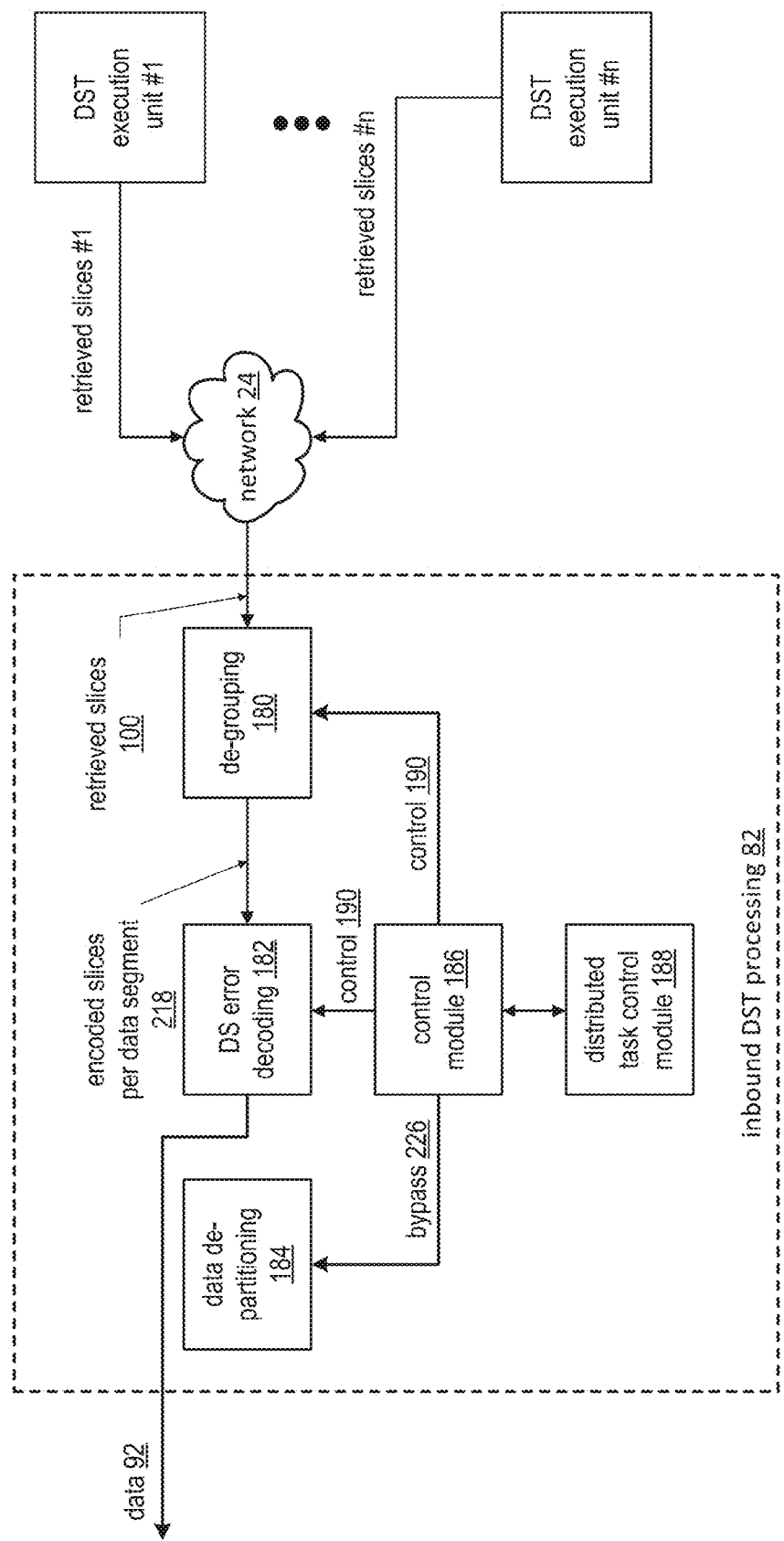
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
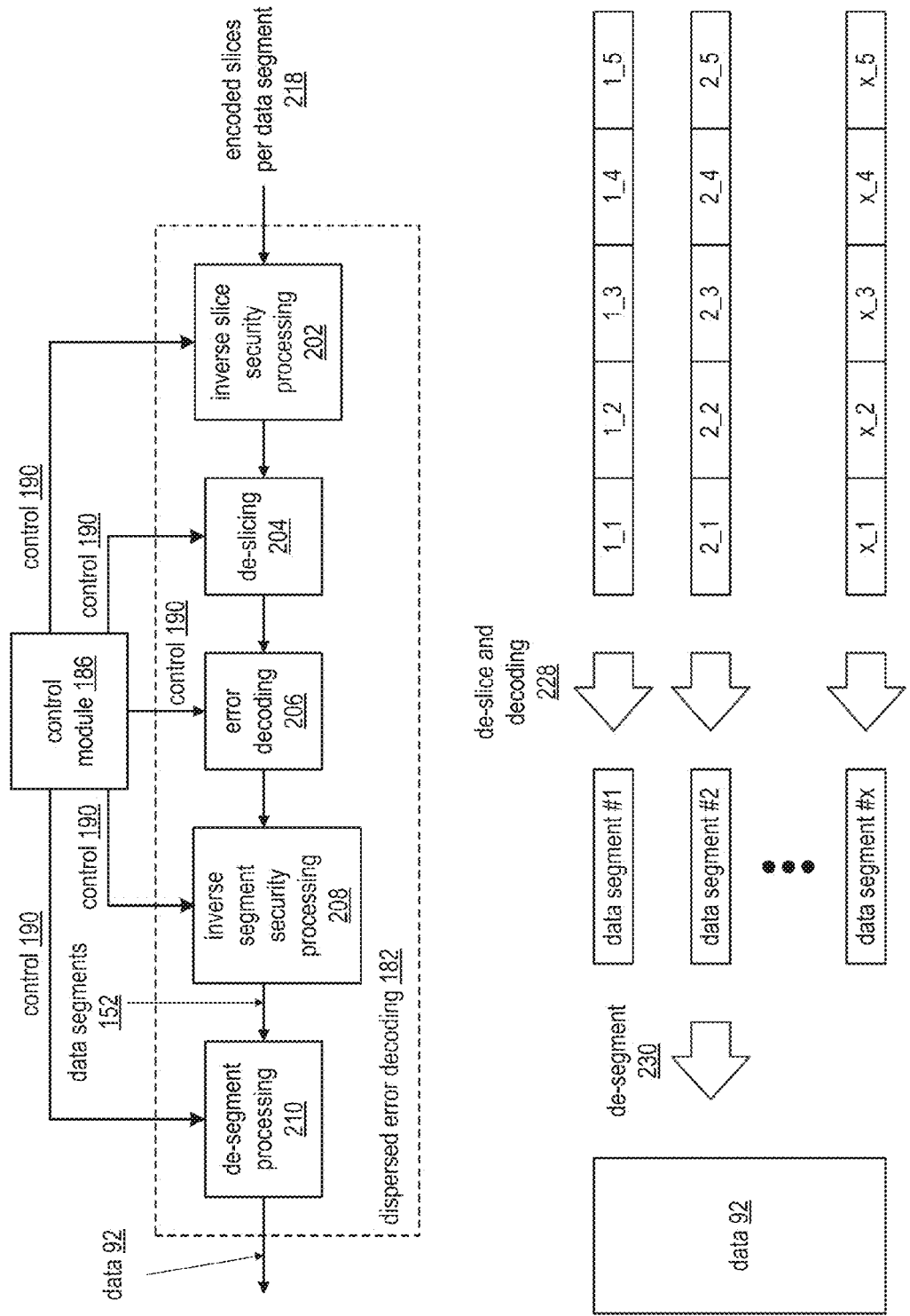
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
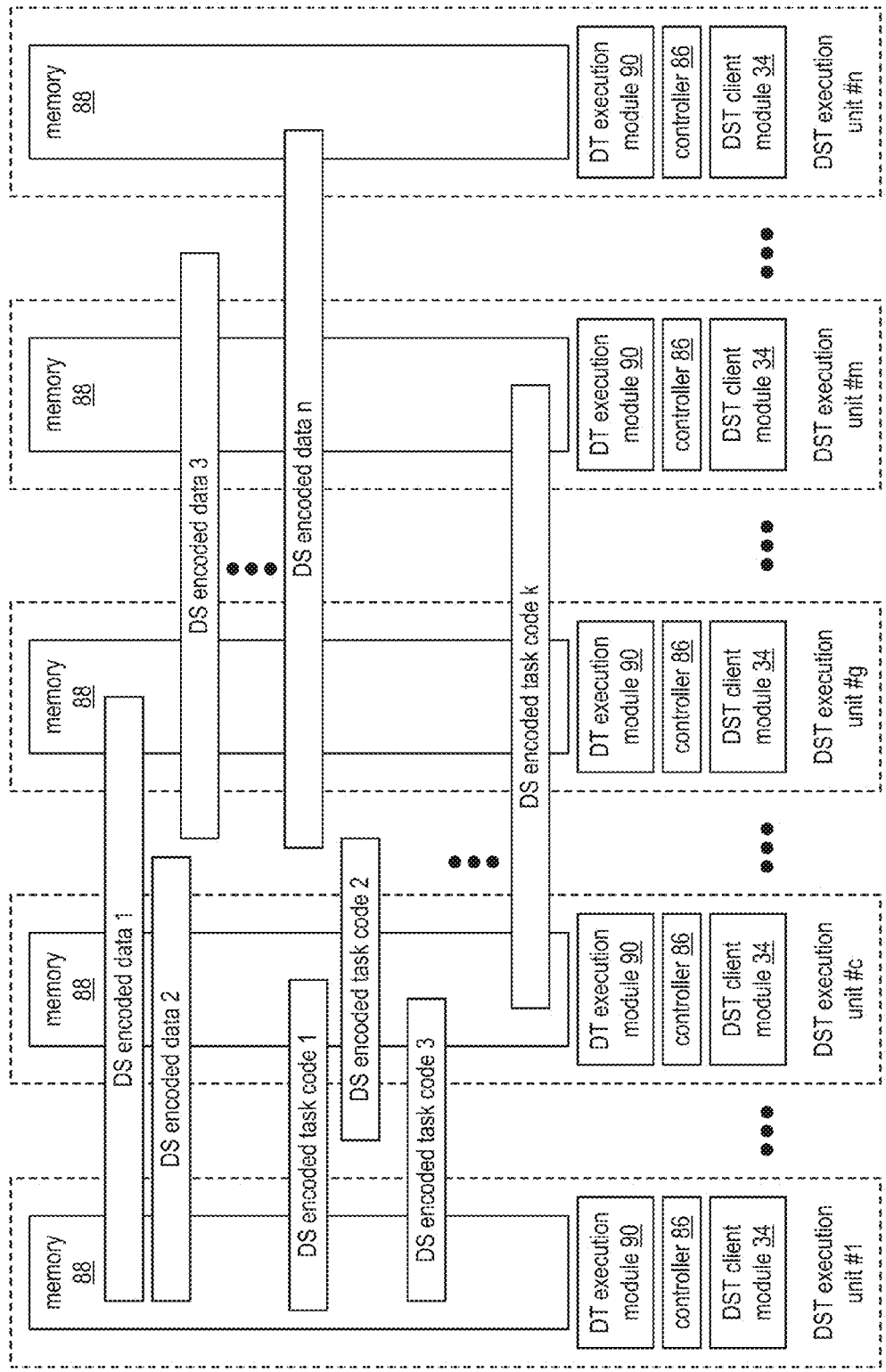
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
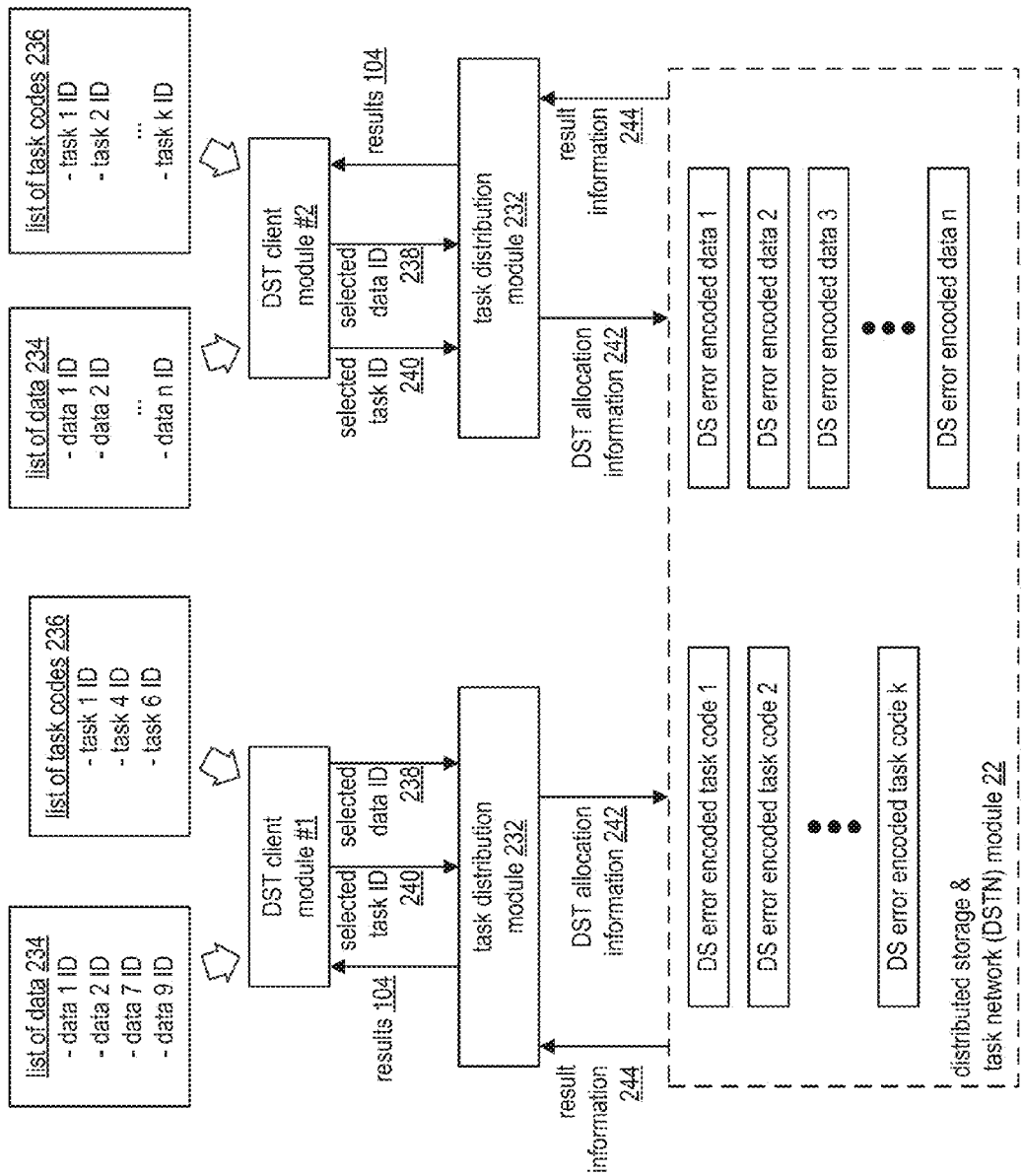
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID)

includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
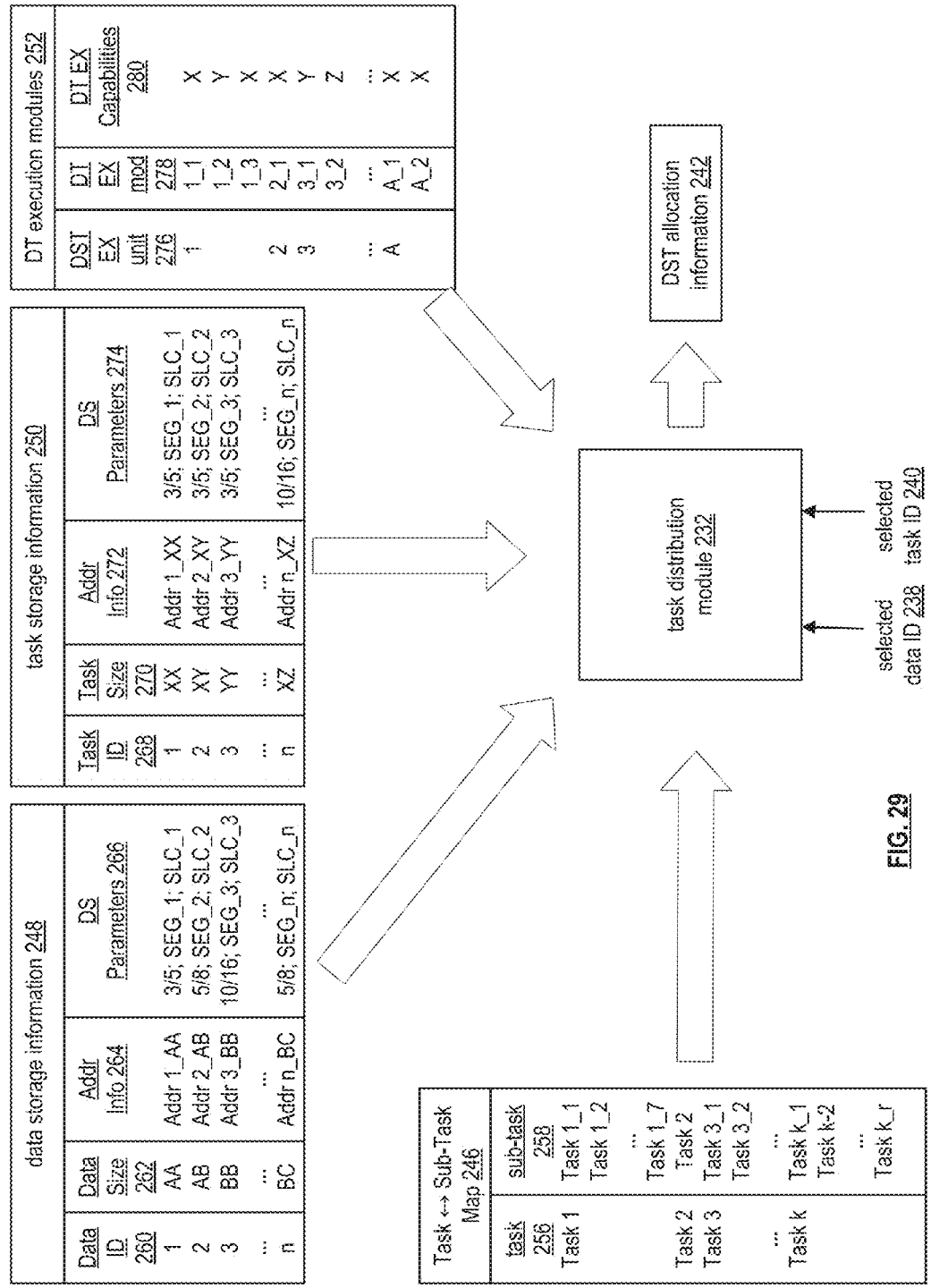
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
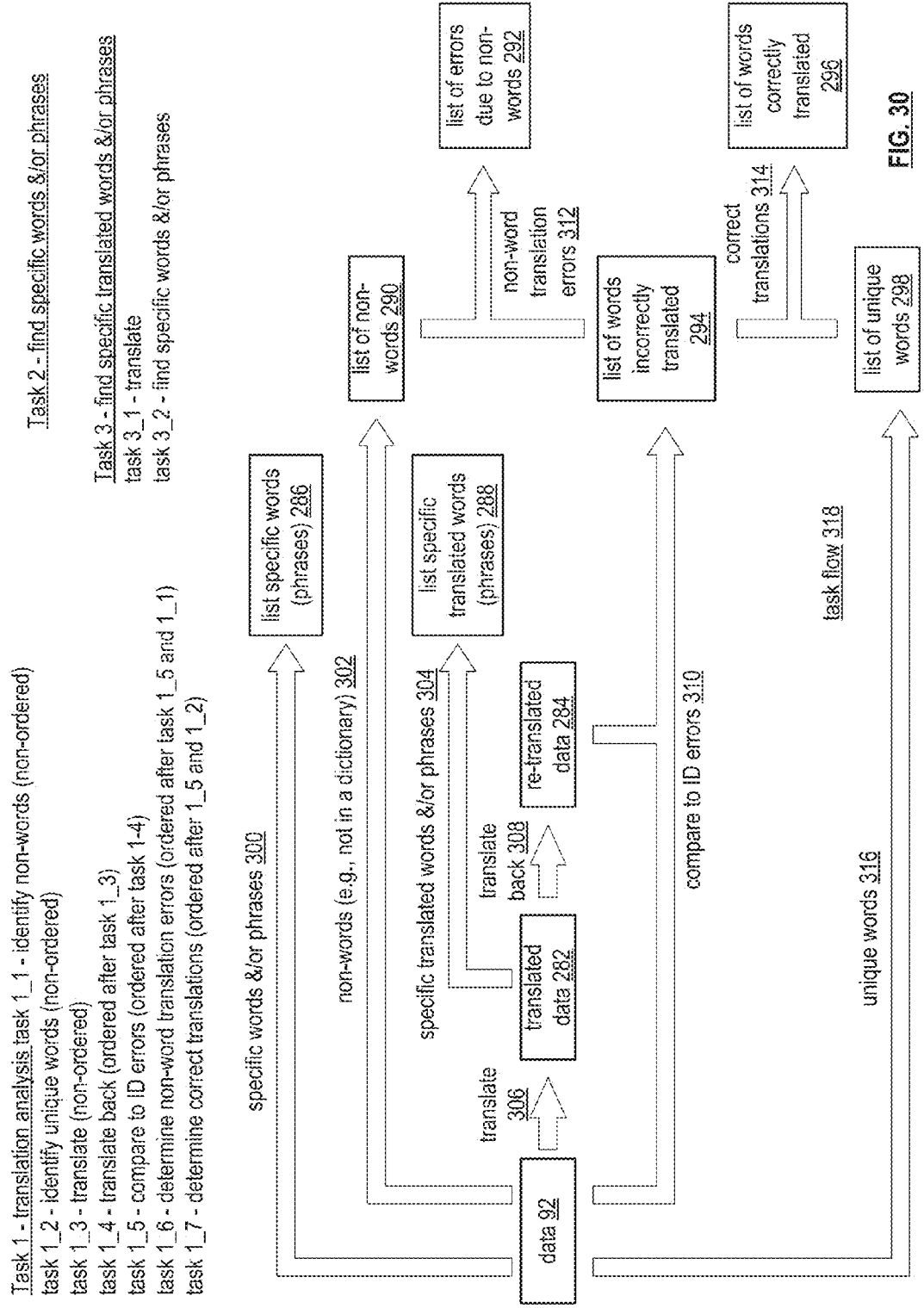
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
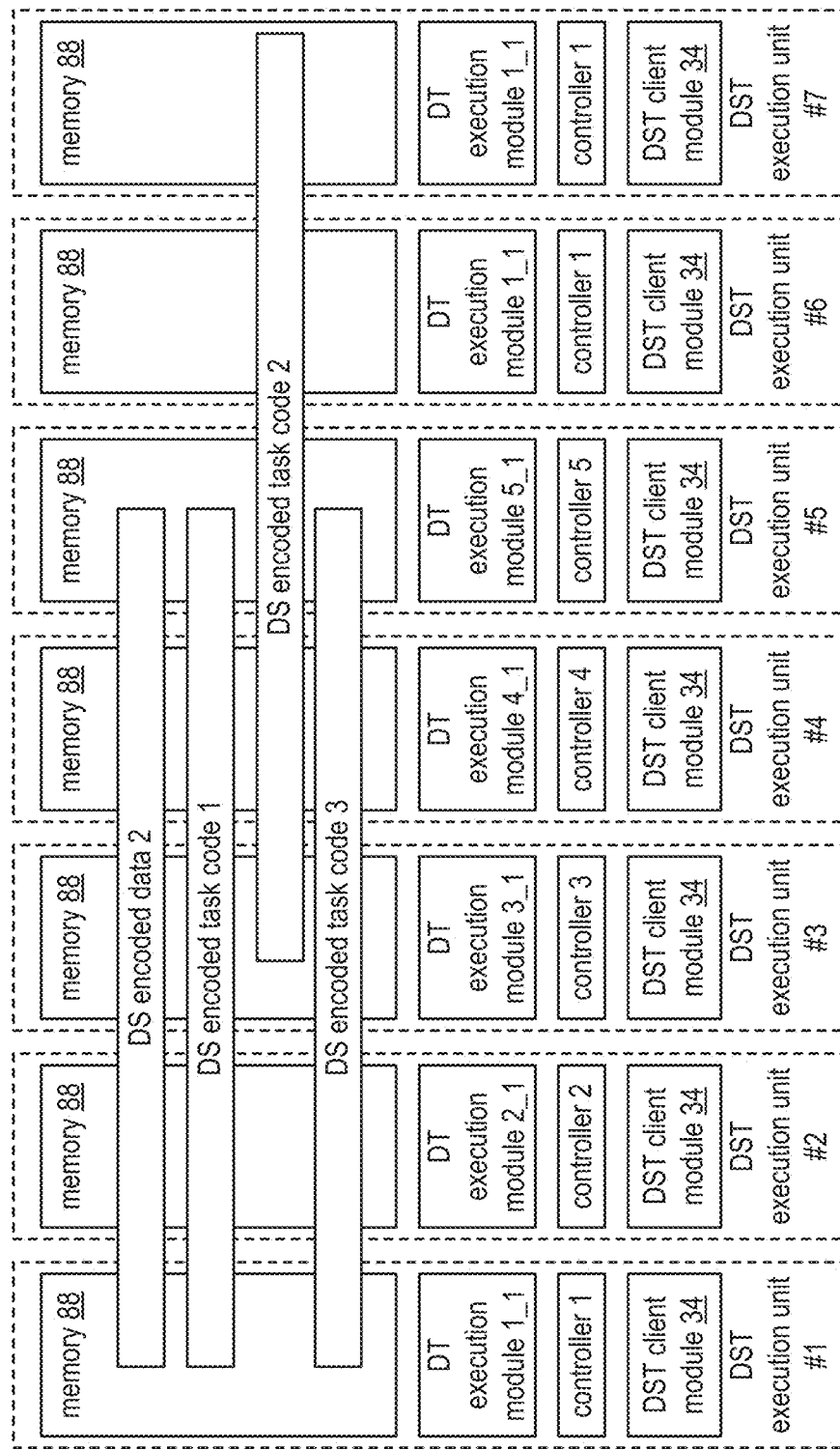
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
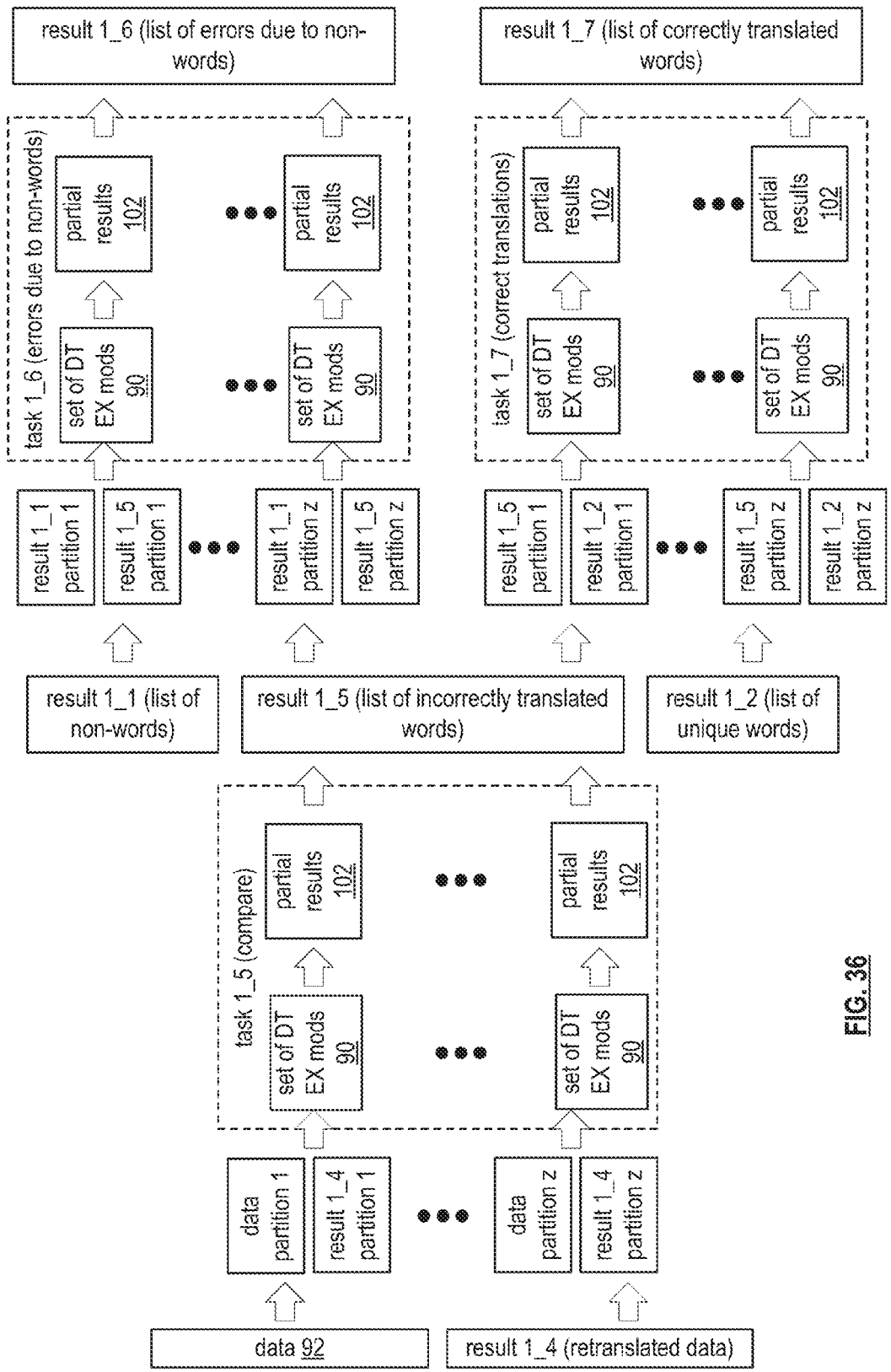

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
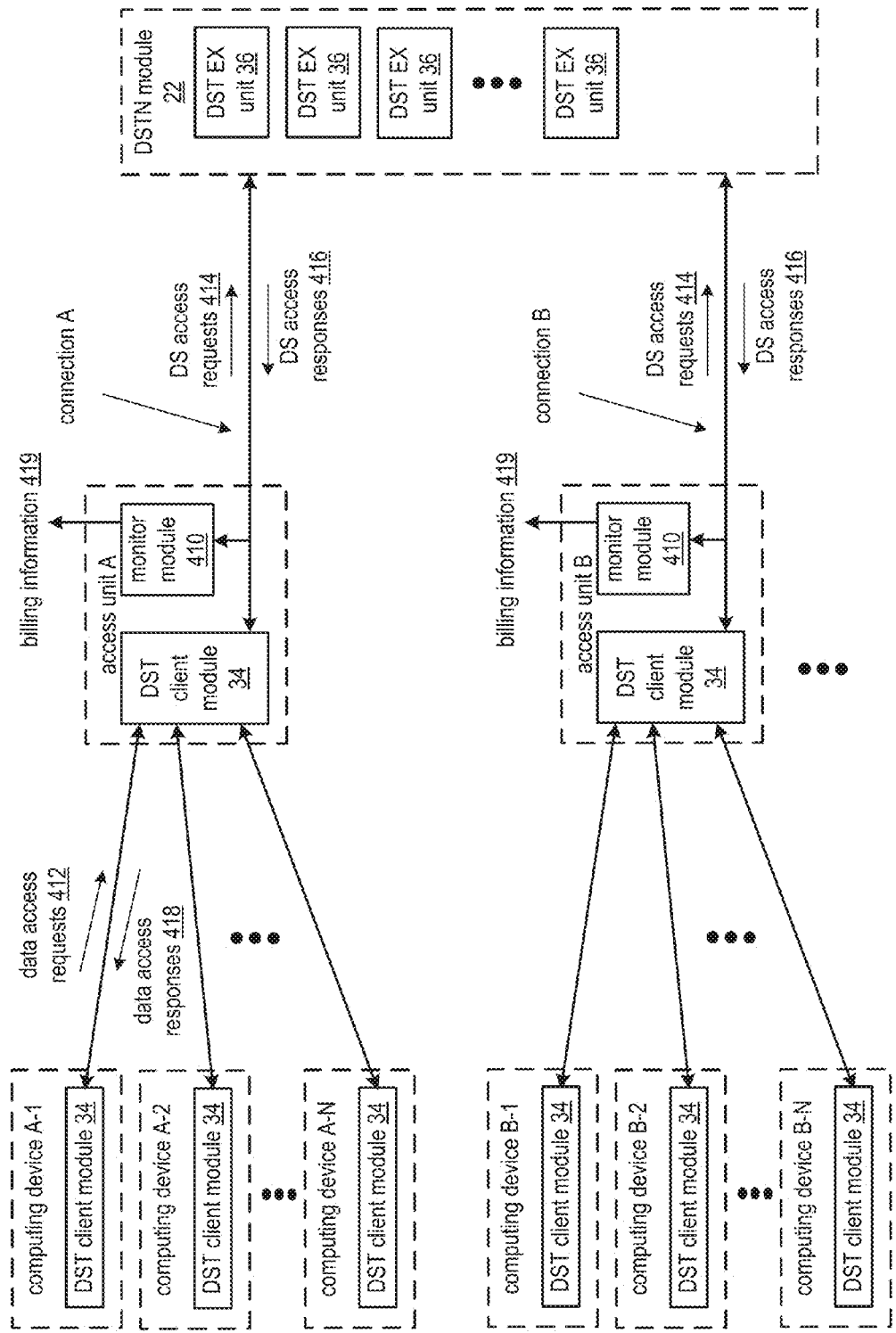
FIG. 40A is a schematic block diagram of an embodiment of a dispersed storage network (DSN) in accordance with the present invention.

FIG. 40A is a schematic block diagram of an embodiment of a dispersed storage network (DSN) that includes the distributed storage and task network (DSTN) module 22 of FIG. 1, two or more access units A-B, and a plurality of computing devices A-1 through A-N and B-1 through B-N. The DSTN module 22 includes a plurality of distributed storage and task (DST) execution units 36 of FIG. 1. Each access unit includes the DST client module 34 of FIG. 1 and a monitor module 410. Each computing device includes the DST client module 34 of FIG. 1.

A subgroup of the plurality of computing devices is affiliated with a corresponding access unit to enable accessing the DSTN module 22. As a specific example, computing devices A-1 through A-N are affiliated with access unit A and computing devices B-1 through B-N are affiliated with access unit B. Each computing device utilizes a corresponding access unit to access the DSTN module 22. As a specific example, computing device A-2 issues data access requests 412 (e.g., write data request, a read data request, list data request, delete data request) to access unit A and receives data access responses 418 (e.g., write data response, read data response, list data response, delete data response) from Access unit A. Alternatively, or in addition to, the data access requests 412 include one or more of write slice requests, read slice requests, list slice requests, and delete slice requests; and the data access responses 418 include one or more of write slice responses, read slice responses, list slice responses, and delete slice responses.

Each access unit maintains a corresponding connection with the DSTN module 22 to enable access to the DSTN module 22. Such a connection may be a physical and/or logical connection to enable, from time to time, transfer of messages. The connection may be bandwidth limited based on one or more of a predetermination, available bandwidth, a service level agreement, and an economic agreement. The connection may utilize a specific encryption to provide additional security between the corresponding access unit and the DSTN module 22. As a specific example, access unit A maintains connection A with the DSTN module 22 and sends dispersed storage (DS) access requests 414 (e.g., write slice requests, read slice requests, list slice requests, delete slice requests) to the DSTN module 22 via the connection A and receives DS access responses 416 (e.g., write slice responses, read slice responses, list slice responses, delete slice responses) from the DSTN module 22 via the connection A.

In an example of operation, the DST client module 34 of the access unit A receives the data access request 412 from the DST client module 34 of computing device A-2. The DST client module 34 of the access unit A processes the data access request 412 to generate a set of DS access requests 414 (e.g., a set of write slice requests when the data access request is a write data request, a set of read slice requests when the data access request is a read data request). The DST client module 34 of the access unit A selects a connection associated with the computing device A-2 for connectivity to the DSTN module 22. For example, the DST client module 34 of the access unit A selects connection A based on a lookup of a table providing affiliation information of computing devices to connections.

Having generated the set of DS access requests 414, the DST client module 34 of the access unit A sends, via the connection A, the set of DS access requests 414 to a corresponding set of DST execution units 36 of the DSTN module 22. The monitor module 410 of the access unit A monitors the sending of the set of DS access requests 414 to produce utilization information associated with connection A (e.g., number of bytes sent, amount of bandwidth utilize, peak transfer speed, average transfer speed, encryption type utilized identity of the computing device A-2, etc.). The DST client module 34 of the access unit A receives, via the connection A, DS access responses 416 (e.g., write slice responses when the data access request is the write data request, read slice responses when the data access request is the read data request) from the DSTN module 22. The monitor module 410 of the access unit A monitors the receiving of the DS access responses 416 to produce updated utilization information associated with connection A.

Having received the DS access response 416, the DST client module 34 of the access unit A issues the data access response 418 to the computing device A-2 based on the DS access responses 416 (e.g., a write data status response when the data request is the write data request, data when data request is the read data request). The monitor module 410 outputs one or more of the updated utilization information and billing information 419 that is generated based on the updated utilization information. The monitor module 410 generates the billing information 419 based on one or more of a level of billing, a billing rate, and the updated utilization information. As a specific example, the monitor module 410 multiplies bandwidth utilization information of the updated utilization information by multiple billing rates to produce the billing information 419 for each individual computing device, a group of computing devices, and all computing devices.

Figure 40B:
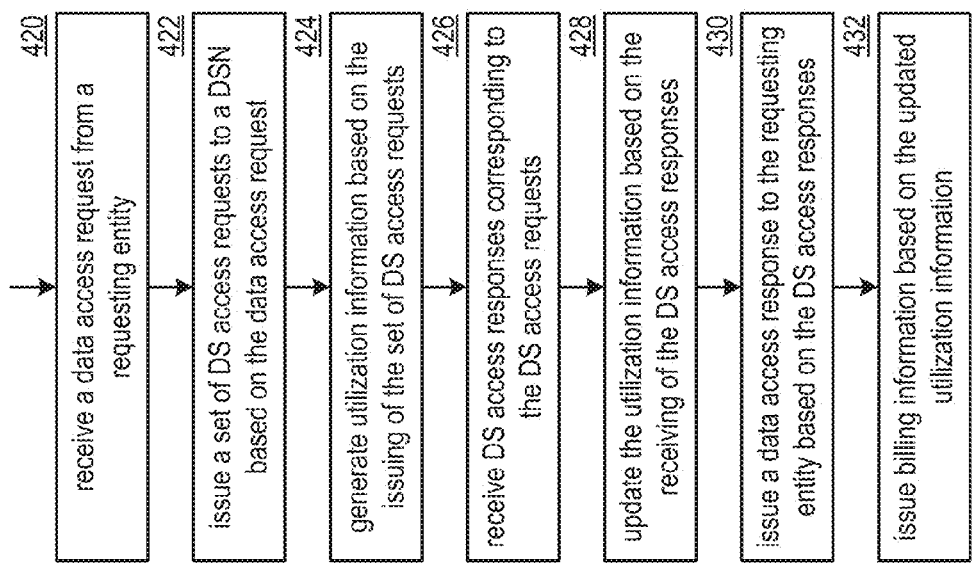
FIG. 40B is a flowchart illustrating an example of generating billing information in accordance with the present invention.

FIG. 40B is a flowchart illustrating an example of generating billing information. The method begins at step 420 where a processing module (e.g., of a distributed storage and task (DST) client module) receives a data access request from a requesting entity. The receiving may include identifying a subscriber group that includes the requesting entity. The method continues at step 422 where the processing module issues a set of dispersed storage (DS) access requests to a dispersed storage network (DSN) based on the received data access request. As a specific example, the processing module generates a set of write slice requests when the data access request is a write data request, identifies a connection to the DSN associated with the requesting entity (e.g., a lookup, issuing a query, extracting from the data access request), and sends the set of write slice requests, via the connection, to the DSN.

The method continues at step 424 where the processing module generates utilization information based on the issuing of the set of DS access requests. As a specific example, the processing module monitors the sending of the set of DS access requests via the connection and generates the utilization information based on the monitoring. The method continues at step 426 where the processing module receives, via the connection, DS access responses corresponding to the DS access requests. As a specific example, the processing module receives write slice responses when the DS access requests include the set of write slice requests. The method continues at step 428 where the processing module updates the utilization information based on the receiving of the DS access responses. As a specific example, the processing module further monitors the receiving of the DS access responses via the connection and generates updated utilization information based on the further monitoring.

The method continues at step 430 where the processing module issues a data access response to the requesting entity based on the DS access responses. As a specific example, the processing module generates a write data status response based on the received write slice responses and sends the write data status response to the requesting entity. The method continues at step 432 where the processing module issues billing information based on the updated utilization information. As a specific example, the processing module generates the billing information based on the updated utilization information, a billing rate, and a level of billing. For instance, the processing module multiplies an average amount of bandwidth by a cost per amount of utilize bandwidth for a particular user group to produce billing information for the user group.

Figure 41A:
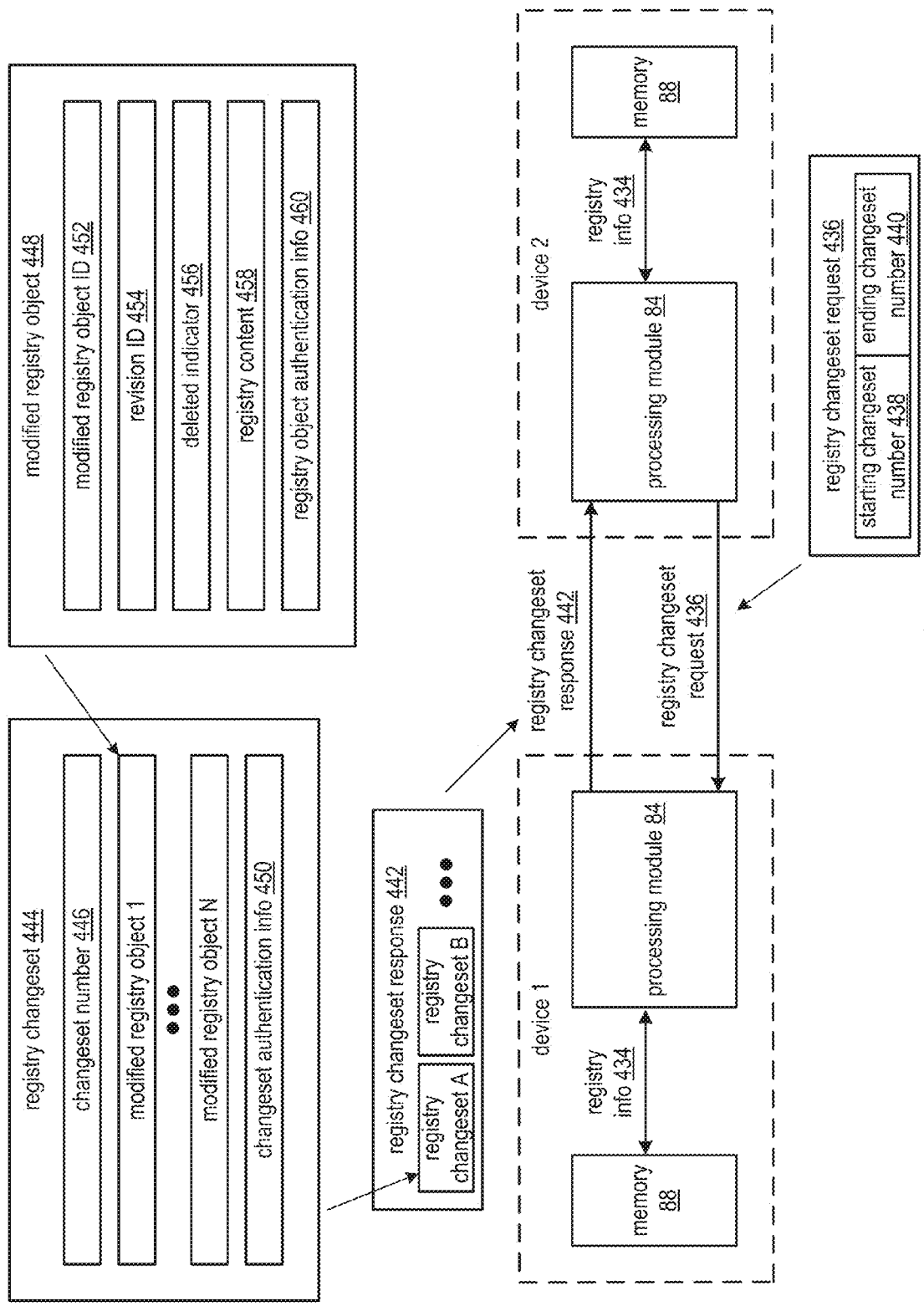
FIG. 41A is a schematic block diagram of another embodiment of a dispersed storage network (DSN) in accordance with the present invention.

FIG. 41A is a schematic block diagram of another embodiment of a dispersed storage network (DSN) that includes a first device and a second device, where each device includes the processing module 84 and the memory 88 of FIG. 3. The devices may be implemented utilizing the distributed storage and task (DST) execution units 36 of FIG. 1. The system is operable to propagate registry information 434 from one device to another device. Such registry information 434 includes a collection of independent registry objects (e.g., documents) that includes configuration information with regards to the DSN. Devices utilize the registry information 434 to operate within the DSN. From time to time, the registry information 434 changes due to one or more of expansion of the DSN, contraction of the DSN, failures of one or more devices within the DSN, an additional user, a deleted user, etc. Such registry information 434 may be lengthy and much of the registry information may not change when a change is introduced. The system is operable to update registry information 434 between the devices by sharing registry changesets, where a registry changeset highlights associated modifications, amendments, additions, or deletions to the documents of the registry information 434.

In an example of operation, the processing module 84 of device 2 determines whether to update locally stored registry information 434 that is stored in memory 88 of device 2. When updating, the processing module 84 of device 2 identifies a responding device that is likely to provide updated registry information. As a specific example, the processing module 84 of device 2 identifies device 1 based on a list. Having identified the responding device, the processing module 84 of device 2 generates a registry changeset request 436 to include a starting changeset number 438 and an ending changeset number 440. Each changeset is associated with a unique changeset number identifying the changeset. The starting changeset number 438 corresponds to a highest known changeset number to the device 2 and the ending changeset number 440 is either left blank when no changesets are known or is set to a lowest known changeset number when a gap in changesets exists in the registry information stored in memory 88 of device 2.

Having generated the changeset request 436, the processing device 84 of device 2 sends the registry changeset request 436 to identified device 1. The responding device (e.g., device 1) generates a registry changeset response 442 that includes one or more registry changesets 444 (e.g., registry changeset A, B, etc.). A registry changeset 444 includes one or more of a changeset number field 446 (e.g., a unique identifier), one or more modified registry objects 1-N, and changeset authentication information 450 (e.g., certificate chain and signature). The registry changeset numbers 446 are greater than the starting changeset number 438 and less than the ending changeset number 440 of the registry changeset request 436.

Each modified registry object 448 includes a modified registry object identifier (ID) field 452 (e.g., a unique identifier), a revision ID field 454 (e.g., a revision number that increases for each revision), a deleted indicator field 456 (e.g., to flag when the registry object has been deleted), a registry content field 458 (e.g., documents of configuration information), and a registry object authentication information field 460 (e.g., certificate chain and signature). The registry changeset response 442 may further include an indicator to indicate whether the list of registry changesets is exhaustive. When not exhaustive, the device 2 (e.g., the requesting device) may issue further registry changeset requests 436 to continue to receive further registry changesets 444. The registry changeset 444 contains no changesets when the requesting device is up-to-date.

Having generated the registry changeset response 442, the processing module 84 of device 1 sends the registry changeset response 442 to device 2. The processing module 84 of device 2 updates the registry information 434 stored in memory 88 based on the registry changeset response 442. As a specific example, the processing module 84 of device 2 authenticates the registry changeset 444 using the changeset authentication information 450, extracts modified registry object 1, authenticates the registry object 1 using the registry object authentication information 460, verifies that the revision ID 454 corresponds to a missing revision ID, extracts the registry content 458, and stores the registry content 458 as registry information 434 in the memory 88 of device 2.

Figure 41B:
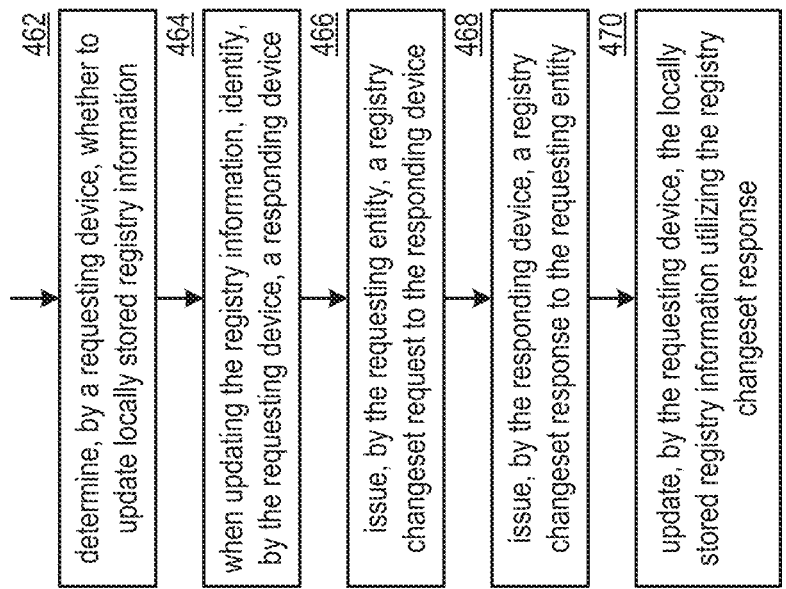
FIG. 41B is a flowchart illustrating an example of obtaining registry information in accordance with the present invention.

FIG. 41B is a flowchart illustrating an example of obtaining registry information. The method begins at step 462 where a processing module (e.g., of a requesting computing device of a dispersed storage network (DSN)) determines whether to update locally stored registry information. The determining may be based on one or more of registry age, receiving an error message, and receiving a request. As a specific example, the processing module determines to update the locally stored registry information when a time interval since a previous update is greater than a time interval threshold level. When updating the registry information, the method continues at step 464 where the processing module of the requesting device identifies a responding device. The identifying may be based on one or more of accessing a list, accessing current registry information, initiating a query, identifying the responding device based on a previous registry information response, and receiving a query response.

The method continues at step 466 where the processing module of the requesting entity issues a registry changeset request to the responding device. As a specific example, the processing module of the requesting device generates a starting changeset number and an ending change set number based on currently stored change set information of the locally stored registry information and sends the registry changeset request, where the registry changeset request includes the starting changeset number and the ending changeset number. For instance, the processing module of the requesting device identifies a highest currently stored changeset number as the starting changeset number.

The method continues at step 468 where a processing module of the responding device issues a registry changeset response to the requesting entity. As a specific example, the processing module of the responding device generates the registry changeset response to include one or more changesets associated with changeset numbers greater than the starting changeset number and less than the ending changeset number when the ending changeset number is not blank. The issuing further includes the processing module of the responding device sending the registry changeset response to the requesting device. The method continues at step 470 where the processing module of the requesting device receives the registry changeset response and updates the locally stored registry information utilizing one or more modified registry objects of the received registry changeset response.

FIGS. 42A-C are schematic block diagrams of another embodiment of a dispersed storage network (DSN) that includes the distribute storage and task (DST) processing unit 16 of FIG. 1, the network 24 of FIG. 1, and a plurality of storage pools 1-P. The DST processing unit 16 includes the DST client module 34 of FIG. 1 and the main memory 54 of FIG. 2. Each storage pool includes a set of DST execution (EX) units 1-n. Each DST execution unit includes the processing module 84 of FIG. 3 and the memory 88 of FIG. 3. Each DST execution unit may be implemented utilizing the DST execution unit 36 of FIG. 1. Hereafter, a DST execution unit may be referred to interchangeably as a storage unit.

The DSN functions to propagate a distributed DSN registry between entities of the DSN, including the DST execution units and the DST processing unit 16. The DSN further functions to utilize one or more portions of the distributed DSN registry to facilitate accessing of DSN resources. Hereafter, the distributed DSN registry may be referred to interchangeably as registry information. For example, the DST processing unit 16 utilizes registry information to gain access to a particular storage pool of the plurality of storage pools.

The distributed DSN registry includes a multitude of registry entries, where a registry fragment includes a plurality of related registry entries of the multitude of registry entries. A registry entry of the multitude of registry entries includes information regarding one or more of virtual address to physical device mapping, virtual address to user mapping, and DSN operational parameters. The virtual address to physical device mapping includes one or more of storage unit identifiers and associated Internet protocol addresses and slice name ranges to storage unit identifiers and storage pool identifiers. The virtual address to user mapping includes one or more of vault identifiers and associated group names and vault identifiers and associated user names. The DSN operational parameters include at least one of access control lists and dispersal parameters. The access control lists include a listing of allowed and disallowed DSN resource access types by at least one of vaults, user groups, and user names. The dispersal parameters include one or more of an information dispersal algorithm (IDA) width, a write threshold number, a read threshold number, and a decode threshold number.

FIG. 42A illustrates steps of an example of operation to propagate the distributed DSN registry between the entities of the DSN where the DST client module 34 obtains an identifier (ID) piece of multiple ID pieces regarding a registry fragment of the distributed DSN registry. The multiple ID pieces comprises two or more of a vault ID, a storage pool ID, a user group ID, a user ID, a data object ID, a folder ID, and a file ID. Hereafter, the identifier piece may be interchangeably referred to as a name. As a specific example, the DST client module 34 obtains a name 1 (e.g., storage pool 1) as the ID piece.

Having obtained the identifier piece, the DST client module 34 performs a function on the ID piece to obtain a registry fragment alias, where performance of the function on the multiple ID pieces would produce multiple registry fragment aliases. Performing the function includes performing a deterministic function on the ID piece to obtain the registry fragment alias. The deterministic function includes one or more of a hashing function, a hash-based message authentication code function, a mask generating function, and a sponge function. As a specific example, the DST client module 34 performs the function on the ID piece to obtain the registry fragment alias. For instance, the DST client module 34 performs the mask generating function on the name 1 to produce a universally unique identifier (UUID) of A465 of an alias object of the registry fragment alias.

Having performed the function on the ID piece, the DST client module 34 sends the registry fragment alias and a local most recent revision level of a local copy of the registry fragment to a storage unit. For example, the DST client module 34 retrieves registry information 480 from the main memory 54 and determines that the local most recent revision level is 3. The sending includes generating a registry object request 482. The DST client module 34 generates the registry object request to include an alias object ID (e.g., A465) of the registry fragment alias and the last revision number (e.g., 3) associated with a last known revision of the desired registry object. Having generated the registry object request, the DST client module 34 sends, via the network 24, the registry object request 482 to DST execution unit 1 of the storage pool 1. The DST client module 34 may send the registry object request 482 to another storage unit of the storage pool 1 when desiring to access the storage pool 1. The DST client module 34 may send the registry object request 482 to yet another storage unit of the storage pool 2 when desiring to access the storage pool 2.

FIG. 42B illustrates further steps of the example of operation to propagate the distributed DSN registry between the entities of the DSN where, having received the registry object request 482, the processing module 84 of the DST execution unit 1 determines DSN addressing information (e.g., slice names) for the registry fragment based on the registry fragment alias, where the DSN addressing information is determinable from any one of the multiple registry fragment aliases. For example, the processing module 84 performs a lookup of alias object ID A465 to determine slice names of the alias object, accesses other storage units of the storage pool 1 to obtain object slices 1-n of alias object, dispersed storage error decodes received object slices to reproduce an alias object A465. Other alias object identifiers of the multitude of alias object identifiers are associated with further alias objects, where each of the alias objects includes the registry object ID of 3B7 for the desired registry fragment (e.g., registry object 3B7).

Having recovered the alias object A465, the processing module 84 extracts a registry object ID (e.g., 3B7) from the alias object. A subset of the plurality of alias objects may also include the registry object ID 3B7 when the subset of alias objects are all associated with the desired registry object. As such, a corresponding set of names may be utilized to access the (same) registry object.

The processing module 84 recovers the registry object using the registry object ID. As a specific example, the processing module 84 retrieves the registry object 3B7 from the memory 88. As another specific example, the processing module 84 retrieves the registry object 3B7 from the DSN memory (e.g., by recovering registry object slices from other storage units of the storage pool 1). The registry object includes one or more of registry content 486 (e.g., documents of configuration information), a registry revision number field (e.g., 4), and related registry object identifiers (e.g., ID A. ID B, etc.). For instance, the registry object is associated with the storage pool 1 and a registry object A is associated with DSN operational parameters of a dispersed storage error coding function. The processing module 84 recovers related registry objects (e.g., from the memory 88, from the DSN memory).

Having recovered the registry object and the related registry objects, the processing module 84 generates a registry object response 484 to include one or more of the registry object and the related registry objects. The registry object response 484 may further include the alias object. The processing module 84 sends, via the network 24, the registry object response 484 to the DST processing unit 16. The DST client module 34 extracts registry content from the one or more of the registry object and the related registry objects and updates registry information stored in the main memory 54 to produce updated registry information 488.

As another example of operation, the DST execution unit 1 determines the DSN addressing information for the registry fragment, identifies a set of encoded data slices of the registry fragment based on the DSN addressing information, determines a global most recent revision level for the set of encoded data slices (e.g., by accessing the slices and the global most recent revision level associated with the slices), and sends, via the network 24, the registry object response 484 to the DST processing unit 16 when the local most recent revision level does not substantially match the global most recent revision level. Alternatively, or in addition to, the processing module 84 sends a global most recent copy of the registry fragment to the DST processing unit 16 and sends a message indicating that the local copy of the registry fragment is out-of-date. Having sent the message indicating that the local copy is out-of-date, the DST client module 34 receives the response regarding the registry fragment when the local copy of the registry fragment is not up-to-date.

Alternatively, or in addition to, the DST client module 34 determines the DSN addressing information for the registry fragment based on the registry fragment alias and sends an inquiry regarding the registry fragment based on the DSN addressing information to the DST execution unit 1. The DST client module 34 receives, from the DST execution unit 1, a response to the inquiry.

As another example of operation, the DST client module 34 obtains a set of ID pieces of the multiple ID pieces regarding the registry fragment of the distributed DSN registry, performs the function, or another function, on the set of ID pieces to obtain a registry sub-fragment alias, where the registry fragment includes a plurality of registry sub-fragments and the registry sub-fragment alias corresponds to one of the plurality of registry sub-fragments, determines DSN addressing information for the registry sub-fragment based on the registry sub-fragment alias, and receives a response regarding the registry sub-fragment when a local copy of the registry sub-fragment is not up-to-date.

FIG. 42C illustrates steps of an example of operation to utilize the one or more portions of the distributed DSN registry to facilitate accessing of the DSN resources where the DST client module 34, having received the updated registry information 488, utilizes the updated registry information 488 to access at least a portion of the DSN. As a specific example, the DST client module 34 utilizes the updated registry information 488 to generate slice access requests 1-n, sends the slice access requests 1-n, via the network 24, to storage units of the storage pool 1, and receives a slice access responses 1-n from at least some of the storage units of the storage pool 1.

FIG. 42D is a flowchart illustrating another example of obtaining registry information. In particular, a method is presented for use in conjunction with one or more functions and features described in conjunction with FIGS. 1-39, 42A-C, and also FIG. 42D. The method begins at step 490 where a processing module of a computing device of a dispersed storage network (DSN) obtains an identifier (ID) piece of multiple ID pieces regarding a registry fragment of a distributed DSN registry, where the distributed DSN registry includes a multitude of registry entries. The registry fragment includes a plurality of related registry entries of the multitude of registry entries. A registry entry of the multitude of registry entries includes information regarding one or more of virtual address to physical device mapping, virtual address to user mapping, and DSN operational parameters.

The method continues at step 492 where the processing module performs a function on the ID piece to obtain a registry fragment alias, where performance of the function on the multiple ID pieces would produce multiple registry fragment aliases. The performing the function on the ID piece includes performing a deterministic function on the ID piece to obtain the registry fragment alias. The performing may further include sending the registry fragment alias and a local most recent revision level of a local copy of the registry fragment to a storage unit of the DSN.

The method continues at step 494 where the processing module determines DSN addressing information for the registry fragment based on the registry fragment alias, where the DSN addressing information is determinable from any one of the multiple registry fragment aliases. For example, the storage unit determines the DSN addressing information for the registry fragment. As another example, the processing module determines the DSN addressing information for the registry fragment, sends an inquiry regarding the registry fragment based on the DSN addressing information, and receives, from the storage unit, a response to the inquiry.

The method continues at step 496 where the storage unit identifies a set of encoded data slices of the registry fragment based on the DSN addressing information. The method continues at step 498 where the storage unit determines a global most recent revision level for the set of encoded data slices. The method continues at step 500 where the storage unit sends a response to the processing module when the local most recent revision level does not substantially match the global most recent revision level. Alternatively, or in addition to, the storage unit sends a global most recent copy of the registry fragment to the processing module. Further alternatively, or in addition to, the storage unit may send a message to the processing module indicating that the local copy of the registry fragment is out-of-date.

The method continues at step 502 where the processing module receives a response regarding the registry fragment when a local copy of the registry fragment is not up-to-date. Alternatively, or in addition to, the processing module obtains a set of ID pieces of the multiple ID pieces regarding the registry fragment of the distributed DSN registry, performs the function, or another function, on the set of ID pieces to obtain a registry sub-fragment alias, where the registry fragment includes a plurality of registry sub-fragments and the registry sub-fragment alias corresponds to one of the plurality of registry sub-fragments, determines the DSN addressing information for the registry sub-fragment based on the registry sub-fragment alias, and receives a response regarding the registry sub-fragment when a local copy of the registry sub-fragment is not up-to-date.

The method described above in conjunction with the processing module and the storage unit can alternatively be performed by other modules of the dispersed storage network or by other devices. In addition, at least one memory section that stores operational instructions can, when executed by one or more processing modules of one or more computing devices of the dispersed storage network (DSN), cause the one or more computing devices to perform any or all of the method steps described above.

FIG. 43A is a schematic block diagram of another embodiment of a dispersed storage network (DSN) that includes the user device 14 of FIG. 1, the distributed storage and task (DST) processing unit 16 of FIG. 1, and the distributed storage and task network (DSTN) module 22 of FIG. 1. The DSTN module 22 includes a plurality of DST execution units 36 of FIG. 1. The DST processing unit 16 includes the DST client module 34 of FIG. 1 and a memory 512. The memory may be implemented utilizing the main memory 54 of FIG. 2. The system is operable to process data access requests 524 from the user device 14 with regards to prioritizing the processing of DSN access requests 526 sent to the DSTN module 22, prioritizing the receiving of DSN access responses 528 from the DSTN module 22, and issuing data access responses 530 to the user device 14 based on the DSN access responses 528.

In an example of operation, the DST processing unit 16 receives name range information 516 and a priority level 522 (e.g., 10) for handling data objects associated with the name ranges of the name range information. The name ranges 516 indicate a span of names of data objects stored in the DSTN module 22 in accordance with a directory and/or index scheme 510. When the index scheme includes a file system directory, wildcards may be utilized for a portion of pathnames to produce a name range. For example, filenames that includes a path of:
/user/home/jdoe/pictures/2010/birthdayparties/january.jpg
and:
/user/home/jdoe/pictures/2014/india-vacation/hotel.jpg
share a common pathname of /user/home/jdoe/pictures and a name range of a path of /user/home/jdoe/pictures/* (e.g., where* denotes a wildcard).

Having received the name range 516 information, the DST processing unit 16 accesses a directory and/or an index 510 to identify object names 518 within the name range of the range information. As a specific example, the DST processing unit 16 identifies filenames january.jpg and hotel.jpg as object names within the name range. For each object name, the DST processing unit 16 identifies a slice name range 520 based on another directory and/or index lookup 510. The DST processing unit 16 updates a slice handling priority table 514 maintained within the memory 512 to include an association of the received priority level 522 and each of the slice name ranges 520. As a specific example, the DST processing unit 16 updates the slice handling priority table 514 to associate the slice name range 3 (e.g., corresponding to generate.jpg) and slice name range 4 (e.g., corresponding to hotel.jpg) with priority level 10.

The DST client module 34 receives the data access request 524 from the user device 14 and generates a set of DSN access requests 526 that includes a set of corresponding slice names. The DST client module 34 accesses the slice handling priority table 514 within the memory 512 to identify a priority level associated with the slice names by identifying a slice name range that corresponds to a slice name of the set of DSN access requests. The DST client module 34 processes handling of the set of DSN access requests 526 in accordance with one or more of the identified priority level and other priority levels associated with other active requests. As a specific example, the DST client module 34 sends the set of DSN access requests 526 to the DSTN module 22 when the priority level of the set of DSN access requests 526 indicates a higher priority than all other pending access requests. The DST client module 34 may further prioritize handling of slices based on the priority level to grant processing of higher priority slices more resources as compared to resources granted to lower processing of lower priority slices. Such resources includes assigned memory, assigned processing threads, allowed link connectivity bandwidth, assigned scratchpad memory, number of concurrent processors, and ordering within one or more processing wait queues.

The DST client module 34 receives the DSN access responses 528 from the DSTN module 22 in response to the set of DSN access requests 526. The DST client module 34 processes the DSN access responses 528 in accordance with the priority level of the slice names associated with the DSN access responses to produce the data access responses 530.

FIG. 43B is a flowchart illustrating an example of prioritizing slice handling. The method begins at step 532 where a processing module (e.g., of a distributed storage and task (DST) client module of a device of a dispersed storage network (DSN)) receives a name range and a priority level for data objects associated with the name range. The method continues at step 534 where the processing module identifies object names of the data objects associated with the name range (e.g., performing a directory and/or index lookup using the name range to extract object names corresponding to sets of encoded data slices stored within the DSN). For each data object, the method continues at step 536 where the processing module identifies a slice name range. As a specific example, the processing module accesses the directory and/or index using an object name of the data object to identify one or more ranges of slice names.

Having identified the slice name range, the method continues at step 538 where the processing module updates a slice handling priority table to associate the slice name range with the priority level. As a specific example, the processing module retrieves the slice handling priority table from the DSN, generates a new entry that includes the slice name range and a priority level, updates the slice handling priority table to include the new entry to produce an updated slice handling priority table, and stores the updated slice handling priority table in one or more of a local memory associated with the processing module and the DSN.

The method continues at step 540 where the processing module receives a request associated with the slice name range. The request may include one or more of a data access request (e.g., write, read, list, delete) and an encoded data slice request (e.g., write, read, list, delete). The receiving may include identifying a slice name associated with the request that falls within the slice name range. The method continues at step 542 where the processing module accesses the slice handling priority table to identify the priority level associated with the slice name range. As a specific example, the processing module retrieves the slice handling priority table from the DSN and extracts the entry that includes the slice name range and the priority level based on the slice name range. The method continues at step 544 where the processing module processes the request in accordance with the priority level. The processing includes allocating resources to support the request. As a specific example, the processing module allocates more resources sooner to requests associated with higher priority levels.

FIG. 44A is a schematic block diagram of another embodiment of a dispersed storage network (DSN) that includes the user device 14 of FIG. 1, the distributed storage and task (DST) processing unit 16 of FIG. 1, the distributed storage and task network (DSTN) module 22 of FIG. 1, and the DSTN managing unit 18 of FIG. 1. The DST processing unit 16 includes the DST client module 34 of FIG. 1. The DSTN module 22 includes a set of DST execution units 1-n. The DST execution units may be implemented with the DST execution units 36 of FIG. 1. Each DST execution unit includes the processing module 84 and the memory 88 of FIG. 3, and a hardened memory 550. Alternatively, the DST execution unit includes only the hardened memory 550 and not the memory 88. The hardened memory 550 includes one or more memory devices constructed to be substantially resistant to external threats. For example, the hardened memory continues to operate while the associated DST execution unit is in proximity to external threats including one or more of electromagnetic interference (EMI), an electromagnetic pulse (EMP), solar flares, gamma rays, proton beams, laser light, wireless microwaves, radiation, particle beams, extreme heat, extreme cold, extreme mechanical vibration, and power surges. Such hardened memories are known to include techniques including one or more of additional shielding, improved mechanical architectures, use of optical interfaces, use of isolation materials, and use of wireless interfaces.

In an example of operation, the user device 14 issues a data access request 552 to the DST processing unit 16, where the data access request 552 includes a request to store data. The DST client module 34 issues a set of DSN access requests 554 to the set of DST execution units 1-n based on the data access request 552, where the set of DSN access requests includes a set of write slice requests. A first DST execution unit receives a first write slice request of the set of write slice requests. The processing module 84 of the first DST execution unit determines whether to utilize the hardened memory 550 of the first DST execution unit for storage of an encoded data slice of the first write slice request. The determining may be based on one or more of interpreting a priority level associated with the encoded data slice, interpreting a memory flag within the right slice request, interpreting an environmental state, determining available hardened memory capacity, comparing a slice name of the write slice request to a list of slice names in a table that indicates which slices are to be stored in hard memory, and interpreting a default predetermination for all slices. As a specific example, the processing module 84 determines to utilize the hardened memory 550 when sufficient hardened memory capacity exists and the slice name associated with the encoded data slice for storage compares favorably to a list of slices that are to be stored in hardened memory 550. As another specific example, the processing module 84 determines to utilize the hardened memory 550 when the interpretation of the environmental state indicates that an above average level of EMI has been present. When utilizing the hardened memory 550, the processing module 84 stores the encoded data slice in the hardened memory 550. Alternatively, or in addition to, the processing module 84 stores encoded data slice in the memory 88.

Having stored a set of encoded data slices of a set of write slice requests, the set of DST execution units share storage status 560 with each other. The storage status 560 includes one or more of an indication of a level of available hardened memory storage capacity, a level of utilized hardened memory storage, and slice names of encoded data slices stored in the hardened memory. The DSTN module 22 issues DSN access responses 556 to the DST processing unit 16. The DST client module 34 issues data access responses 558 to the user device 14 based on the received DSN access responses 556.

The set of DST execution units determines whether to transfer one or more encoded data slices of the set of encoded data slices from one or more of the hardened memories to one or more of the memories 88 based on the storage status 560. As a specific example, the set of DST execution units determines to transfer a second encoded data slice from hardened memory 550 of the second DST execution unit to the memory 88 of the second DST execution unit when more than a write threshold number of encoded data slices of the set of encoded data slices are stored in the hardened memories. As another specific example, the set of DST execution units determines to transfer a pillar width minus a write threshold number of encoded data slices stored in selected hardened memories of selected DST execution units associated with a least amount of available hardened memory storage capacity to a same number of memories 88. For instance, the set of DST execution units determines to transfer two slices from two hardened memories to two memories 88 when the pillar width is 16 and the write threshold is 14. When determining to transfer the one or more slices, the set of DST execution units initiates migration of the one or more encoded data slices from the selected hardened memories to memories 88 of the selected storage units. The method to select memory types and migrate slices between memory types is discussed in greater detail with reference to FIG. 44B.

In another example of operation, the DSTN managing unit 18 selects a vault to generate billing information 562. As a specific example, the DSTN managing unit 18 selects a next vault of a list of vaults to generate the billing information 562. The DSTN managing unit 18 identifies slice names of encoded data slices associated with the selected vault that are stored in the DSTN module 22. As a specific example, the DSTN managing unit 18 accesses a system registry to identify a slice name range associated with the vault, issues list slice requests to the set of DST execution units, and receives list slice responses from the set of DST execution units identifying the slice names.

Having identified the slice names, the DSTN managing unit 18 identifies storage resource utilization for storage of the encoded data slices associated with the vault. As a specific example, the DSTN managing unit 18 initiates a storage status request and receive storage status 560 that includes storage resource utilization including which of the hardened memory and the memory 88 is utilized for storage of the encoded data slices. The DSTN managing unit 18 generates the billing information 562 based on the storage resource utilization. As a specific example, the DSTN managing unit 18 multiplies a billing rate by an amount of memory storage capacity utilized for each storage type. The method to generate the billing information is discussed in greater detail with reference to FIG. 45.

FIG. 44B is a flowchart illustrating an example of selecting a memory type. The method begins at step 564 where a processing module (e.g., of a distributed storage and task (DST) execution unit) receives a dispersed storage network (DSN) access request to store an encoded data slice of a set of encoded data slices. The DSN access request includes one or more of the encoded data slice, a slice name of the encoded data slice, and a storage priority indicator.

The method continues at step 566 where the processing module determines whether to utilize hardened memory for storage of the encoded data slice. The determining includes one or more of interpreting the priority indicator, interpreting the storage priority indicator, interpreting a priority level of the slice name from a local table, identifying an environmental state, identifying available hardened memory capacity, and a predetermination. The method branches to step 570 when the processing module determines to store the encoded data slice in the hardened memory. The method continues to step 568 when the processing module determines not to store the encoded data slice in the hardened memory. The method continues at step 568 where the processing module stores the encoded data slice in un-hardened memory.

The method continues at step 570 where the processing module stores encoded data slice in hardened memory when the processing module determines to utilize the hardened memory for storage of encoded data slice. The method continues at step 572 where the processing module shares storage status with other DST execution units of a set of DST execution units that includes the DST execution unit. As a specific example, the processing module generates storage status for the DST execution unit and sends the storage status to each of the other DST execution units. As another specific example, the processing module receives other storage status for the other DST execution units.

The method continues at step 574 where the set of DST execution units determines whether to transfer one or more encoded data slices of the set of encoded data slices from hardened memory of one or more of the set of storage units to un-hardened memory of the one or more of the set of storage units. As a specific example, the processing module determines whether greater than a write threshold number of encoded data slices are stored in hardened memories of the set of DST execution units. When the greater than the write threshold number of encoded data slices are stored in the hardened memories of the set of DST execution units, the processing module identifies at most a pillar width minus a write threshold number of encoded data slices for transferring from DST execution units associated with a least amount of available hardened memory storage capacity. When transferring, the method continues at step 576 where the set of DST execution units initiates migration of the utmost the pillar width minus the write threshold number of encoded data slices from hardened memories of the selected DST execution units to un-hardened memories of the selected DST execution units.

FIG. 45 is a flowchart illustrating another example of generating billing information. The method begins at step 580 where a processing module (e.g., of a distributed storage and task (DST) managing unit) selects a vault for generation of billing information. As a specific example, the processing module interprets a billing generation scheduled to identify the vault. The method continues at step 582 where the processing module identifies candidate slice names of slices associated with the vault. As a specific example, the processing module accesses a system registry to identify a starting and an ending slice name associated with the vault. The method continues at step 584 where the processing module identifies stored slices based on the identified candidates slice names. As a specific example, the processing module issues list slice requests to a set of storage units and receives list slice responses that includes identities of the stored slices. The list slice requests include the starting and ending slice names.

The method continues at step 586 where the processing module determines storage resource utilization levels for storage of the stored slices. As a specific example, the processing module obtains storage status for storage of the identified storage slices (e.g., receives the storage status that indicates storage resource utilization levels for each type of storage). The method continues at step 588 where the processing module generates the billing information based on the storage resource utilization levels. As a specific example, for each type of storage, the processing module multiplies an amount of storage utilized by a corresponding billing rate to generate a billing sub-amount, aggregates billing sub-amounts, and outputs the aggregated billing sub-amounts as the billing information.

FIG. 46A is a schematic block diagram of another embodiment of a dispersed storage network (DSN) that includes the network 24 of FIG. 1 and the distribute storage and task network (DSTN) module 22 of FIG. 1. The DSTN module 22 includes a plurality of DST execution units. The DST execution units may be implemented with the DST execution units 36 of FIG. 1. Each DST execution unit includes a processing module 84 and the memory 88 of FIG. 3. The DST execution units may be deployed at two or more geospatial regions (e.g., different city blocks, different cities, different states, different countries, different continents, etc.). As a specific example, DST execution units 1 through x are be deployed within a first region, DST execution units x+1 through y are deployed within a second region, DST execution units y+1 through z are deployed in a third region, etc.

The system functions to select and reselect sets of DST execution units for storage of sets of encoded data slices 602, where data is encoded using a dispersed storage error coding function to produce the sets of encoded data slices 602. As a specific example, the plurality of DST execution units initially selects the set of DST execution units based on an arbitrary selection process (e.g., random selection). The sets of encoded data slices 602 are stored in the selected set of DST execution units, where the processing module 84 of a selected DST execution unit stores a corresponding encoded data slice in the memory 88.

Having stored the sets of encoded data slices 602, for each stored slice within DST execution unit 1, the processing module 84 of DST execution unit 1 identifies the set of DST execution units that stores a particular set of slices that includes the slice, where the set of DST execution units includes DST execution unit 1. As a specific example, the processing module 84 accesses a slice name to the storage location table of a system registry to identify the set of DST execution units. As another specific example, the processing module 84 issues a storage information request to DST execution units where the storage information request includes a query with regards to the set of DST execution units associated with the particular set of slices and the processing module 84 receives the storage information 600 from the DST execution units indicating an association of the set of DST execution units with the particular set of slices.

Having identified the set of DST execution units, the processing module 84 identifies one or more threat regions. A threat region includes a geospatial space where a common threat is posed to DST execution units within that space. Such threats includes one or more of power interruptions, severe weather, solar flare radiation, other space radiation, extreme heat, extreme cold, volcanic activity, earthquake activity, etc. A threat to a particular DST execution unit may impact operation of the DST execution unit including one or more of slowed operations, disconnection from the network 24, partial failure, and complete failure. As an example of identifying, the processing module 84 initiates a query to one or more other DST execution units. As another specific example, the processing module 84 receives threat information identifying the one or more threat regions.

Having identified the one or more threat regions, the processing module 84 identifies associations of the set of DST execution units with the one or more threat regions. As a specific example, the processing module 84 initiates another storage information request to the set of DST execution units with regards to location information, receives storage information 600 from the set of DST execution units indicating location of the DST execution units, and comparing the location of the DST execution units to the identified one or more threat regions.

Having identified the associations, the processing module 84 determines whether to transfer the stored slice of the DST execution unit 1 based on the associations. As a specific example, the processing module 84 determines to transfer the slice to another DST execution unit in a different threat region when a decode threshold number of DST execution units are associated with a first threat region, where the decode threshold number of DST execution units includes the DST execution unit 1. When transferring, the processing module 84 selects the other DST execution unit associated with the different threat region such that less than a decode threshold number of DST execution units are associated with a common threat region. Having selected the other DST execution unit, the processing module 84 initiates migrating the stored slice to the selected other DST execution unit.

FIG. 46B is a flowchart illustrating an example of transferring slices. The method begins at step 604 where a processing module (e.g., of a storage unit) identifies, for a slice storage within the storage unit, a set of storage units that stores a set of slices that includes the slice. As a specific example, the processing module identifies a slice name associated with the slice and accesses a slice name to storage location table to identify the set of storage units. The method continues at step 606 where the processing module identifies one or more threat regions. The identifying includes at least one of receiving threat region information, initiating a query, receiving a query response, performing a threat determination test, receiving an error message, performing a lookup, accessing a threat schedule, and accessing a slice rotation schedule.

The method continues at step 608 where the processing module identifies associations of the threat regions and the set of storage units. As a specific example, the processing module obtains geographic coordinates of a threat region, obtains geographic coordinates of the set of storage units, and identifies inclusion of the geographic ordinance of a storage unit within geographic coordinates set of a threat region. The method continues at step 610 where the processing module determines whether to transfer the slice. The processing module determines to transfer the slice when a decode threshold number of slices of the set of slices are associated with storage in a common threat region.

When transferring, the method continues at step 612 where the processing module selects another storage unit for storage of the slice. As a specific example, the processing module selects the other storage units such that less than any decode threshold number of slices of the set of slices are stored in any common threat region. The method continues at step 614 where the processing module initiates migrating the slice from the storage unit to the selected other storage unit. As a specific example, the processing module issues a write slice request to the selected other storage unit, where the write slice request includes the slice, and the processing module updates the slice name to storage location table to disassociate the slice name of the slice with the storage unit and associate the slice name with the selected other storage unit.

FIG. 47A is a schematic block diagram of another embodiment of a dispersed storage network (DSN) that includes the user device 14 of FIG. 1, the distributed storage and task (DST) processing unit 16 of FIG. 1, and the distributed storage and task network (DSTN) module 22 of FIG. 1. The DST processing unit 16 includes the DST client module 34 of FIG. 1. The DSTN module 22 includes a set of DST execution units 36 of FIG. 1. Each DST execution unit 36 includes the processing module 84 of FIG. 3, a solid-state memory 620, a magnetic disk memory 622, and a set of optical disk memories 1-N.

In an example of operation, the user device 14 issues a data access request 624 to the DST processing unit 16 to store data in the DSTN module 22. The DST client module 34 of the DST processing unit 16 encodes the data to produce one or more sets of encoded data slices, issues one or more sets of DSN access requests 626 (e.g., write slice requests) to the set of DST execution units 36 to store the one or more sets of encoded data slices. The DSN access requests 626 may include one or more of an encoded data slice, a slice name of the encoded data slice, and metadata of the data. The metadata includes one or more of a data type, a data size, an estimated access frequency, a probability of modification, etc.

Each DST execution unit 36 receives a corresponding DSN access request 626. For example, the processing module 84 of a first DST execution unit 36 of the set of DST execution units 36 receives a first write slice request of a corresponding set of write slice requests. The processing module 84 selects a memory type (e.g., solid-state, magnetic, optical) based on the write slice request and a selection scheme. As a specific example, the processing module 84 selects solid-state when the estimated access frequency is greater than an access frequency threshold level. As another specific example, the processing module selects magnetic when the data size is greater than a data size threshold level. As yet another specific example, the processing module selects optical when the probability of modification is less than a low modification threshold level.

When the selected memory type is solid-state or magnetic, the processing module 84 stores a corresponding encoded data slice of the write slice request in the corresponding memory (e.g., solid-state memory, magnetic disk memory). When the selected memory type is optical, the processing module 84 selects an optical memory device of the set of optical memory devices 1-N based on the slice name. As a specific example, the processing module identifies the optical memory device based on a formula of device number=slice name mod N, where N is a number of available optical memory devices. For instance, the processing module selects optical memory device 6 when N is 10 and the slice name is 346. Having selected the optical memory device, the processing module 84 stores the encoded data slice in the selected optical memory device. Having stored the encoded data slice, the processing module 84 updates a local storage record to associate a storage location within the selected optical memory device and the slice name to facilitate subsequent recovery. The processing module 84 issues a DSN access response 628 to the DST processing unit 16 indicating that the encoded data slice was successfully stored. The client module 34 issues a data access response 630 to the user device 14 indicating that the data was successfully stored when receiving DSN access responses indicating that at least a write threshold number of encoded data slices per set of encoded data slices were successfully stored.

When recovering the encoded data slice, the processing module 84 receives another DSN access request 626 to retrieve the encoded data slice (e.g., a read slice request that includes the slice name). The processing module 84 identifies the selected optical memory device based on performing a lookup in the local storage record to identify the association of the slice name to the storage location. The processing module 84 accesses the selected optical memory device utilizing the storage location to retrieve the encoded data slice. The processing module 84 issues another DSN access response 628 that includes the encoded data slice to the DST processing unit 16. The DST client module 34 receives at least a decode threshold number of encoded data slices for each set of encoded data slices, decodes each at least a decode threshold number of encoded data slices reproduce the data, issues another data access response 630 to the user device 14, where the data access response 630 includes the reproduced data.

FIG. 47B is a flowchart illustrating an example of selecting a memory device. The method begins at step 632 where a processing module (e.g., of a storage unit) receives a write slice request that includes one or more of a slice, a slice name, and metadata. The method continues at step 634 where the processing module selects a memory type (e.g., solid-state type, magnetic type, optical type) based on the write slice request and a selection scheme (e.g., select solid-state for frequent access of smaller data, select magnetic for average access of large data, select optical for write once read in frequently). The method branches to step 636 when the processing module determines to select the optical type. The method continues to step 640 when the processing module does not select the optical type. The method continues at step 640 where the processing module stores the slice in a non-optical memory device (e.g., in a solid state memory device, in a magnetic memory device). The method branches to step 642.

When the selected memory type is optical, the method continues at step 636 where the processing module selects an optical memory device of a plurality of optical memory devices based on the slice name. As a specific example, the processing module identifies the optical memory device based on a formula of: selected optical memory device=slice name mod N, where N is a number of available optical memory devices. As another specific example, the processing module identifies the optical memory device based on a random selection scheme. The method continues at step 638 where the processing module stores the slice in the selected optical memory device.

The method continues at step 642 where the processing module updates a local storage record to associate a storage location and the slice name. As a specific example, the processing module creates a new entry in the storage location record to include a slice name, an identifier of the selected optical memory device, and a sector offset location within the optical disk for each slice.

The method continues at step 644 where the processing module receives a read slice request. The read slice request includes one or more of a slice name of the slice and a revision number. The method continues at step 646 where the processing module accesses the local storage record to identify the storage location based on the slice name of the read slice request. As a specific example, the processing module identifies the local storage record based on the slice name, retrieves the local storage record, and extracts the storage location (e.g., memory device number, sector and/or offset). The method continues at step 648 where the processing module retrieves the slice from the identified storage location. The method continues at step 650 where the processing module issues a read slice response that includes the retrieve slice. As a specific example, the processing module generates the read slice response to include one or more of the retrieve slice, the slice name, and a current revision number.

FIGS. 48A-48B are schematic block diagrams of another embodiment of a dispersed storage network (DSN) that includes the distributed storage and task network (DSTN) module 22 of FIG. 1 and a backup unit 660. The DSTN module 22 includes a plurality of DST execution units 36 of FIG. 1. Each DST execution unit 36 includes the processing module 84 of FIG. 3 and a memory 662. The backup unit 660 includes the processing module 84 of FIG. 3 and memory 664. The backup unit 660 may be implemented utilizing one or more of another DST execution unit 36, a local server, a remote server, a set of storage units, a user device, and a memory device. Each DST execution unit 36 stores a plurality of slices in the corresponding memory. FIGS. 48A and B illustrate steps of backing up the storage of the plurality of slices and recovery of the plurality of slices.

In particular, FIG. 48A illustrates steps associated with the backing up of the plurality of slices. In an example of operation, slices 97_3, 98_3, and 99_1 have been stored in the memory prior to time 1. The processing module 84 of the first DST execution unit 36 determines whether to backup a snapshot of slices stored in the memory 662 of the first DST execution unit 36. As a specific example, the processing module 84 determines to backup the snapshot when a backup schedule indicates that sufficient time has passed since a last backup. As another specific example, the processing module 84 determines to backup the snapshot when a number of slices stored since the last backup is greater than a high slices threshold level. As yet another specific example, the processing module 84 determines to backup the snapshot when receiving a maintenance message indicating that the first DST execution unit 36 is to undergo maintenance (e.g., a software update, a hardware change, a test, etc.).

When performing the backup, the processing module 84 of the DST execution unit 36 identifies new slices and new revisions of previous slices stored since the last snapshot. As a specific example, the processing module 84 accesses a snapshot table indicating which slices and slice revisions have been previously stored. As another specific example, the processing module 84 issues a query to the backup unit 660 to identify the new slices and the new revisions of the previous slices stored.

Having identified the new slices and the new revisions of the previous slices stored since the last snapshot, the processing module 84 issues a backup request 666 to the backup unit 660, where the request includes the new slices and the new revisions of the previous slices stored since the last backup. The backup request 666 may further include a timestamp of the snapshot and all slices stored in the memory 662 of the DST execution unit 36. The processing module 84 of the backup unit 660 stores the slices of the backup request 666 in the memory 664 of the backup unit (e.g., slice 99_1, 98_1, 97_3 etc.). The processing module 84 of the backup unit issues a backup response 668 indicating one or more of status of the backup (e.g., succeeded, failed), slice names and revision numbers of the snapshot, all slice names, and all revision number stored. The processing module 84 of the DST execution unit 36 updates the snapshot table indicating that the snapshot stored is now the last snapshot.

Having stored the snapshot, the DST execution unit 36 may receive additional slices for storage in the memory 662 of the DST execution unit 36, where the additional slices includes the slices and/or new revisions of previously stored slices. As a specific example, the processing module 84 stores slices 99_2 and 100_1 in the memory of the DST execution unit 36 at time 2.

The example of operation continues with FIG. 48B where, prior to storing a backup of the slices stored at time 2, the processing module 84 of the DST execution unit 36 determines to restore storage of all slices that were previously stored in the memory 662 of the DST execution unit 36. As a specific example, the processing module 84 of the DST execution unit 36 detects a memory failure resulting in a total loss of all stored slices. As another specific example, the processing module 84 detects a new memory installation to replace a previously removed memory. As yet another specific example, the processing module 84 detects initial deployment of the DST execution unit 36.

Having determined to perform the restoral of storage of the slices, the processing module 84 of the DST execution unit 36 issues a restore request 670 at time 3 to the backup unit 660, where the restore request 670 includes one or more of identity of the DST execution unit 36, slice names associated with the DST execution unit, and specific slice names that are missing. As a specific example, the processing module 84 identifies a slice name range from a system registry that is associated with the DST execution unit 36. The backup unit 660 issues a restore response 672 to the DST execution unit 36, where the restore response 672 includes one or more of slices, slice names of the slices, and slice revision identifiers. For example, the restore response 672 includes slices 99_1, 98_1, 97_3, etc. but does not include slices 100_1 and 99_2 since slices 100_1 and 99_2 were stored subsequent to backup of the snapshot associated with time 1.

The processing module 84 of the DST execution unit 36 stores the slices of the restore response in the memory 662 of the DST execution unit 36. The processing module 84 of the DST execution unit 36 identifies slice names of slices requiring rebuilding, where the slices requiring rebuilding are not available from the backup unit 660. As a specific example, the processing module 84 issues list slice requests to the set of DST execution units 36, receives list slice responses that includes slice representations 674, and identifies the slice names of the slices requiring rebuilding. The processing module 84 facilitates rebuilding of the identified slices requiring rebuilding. As a specific example, the processing module 84 receives the slice representations 674 (e.g., slices) from other DST execution units 36 of the set of DST execution units 36, dispersed storage error decodes at least a decode threshold number of slices per set of slices to reproduce a data segment, dispersed storage error encodes the reproduced data segment to reproduce a slice requiring rebuilding, and stores the reproduced slice in the memory 662 of the DST execution unit 36. As another specific example, the processing module 84 receives the slice representations 674 (e.g., partially encoded slices) from the other DST execution units 36 and performs an exclusive OR (XOR) function to reproduce the slice requiring rebuilding. Each of the other DST execution units 36 generates a corresponding partially encoded slice by matrix multiplying a decoding matrix by a locally stored slice of the set of slices to produce a vector and matrix multiplying the vector by an encoding matrix that includes a row associated with the slice requiring rebuilding.

FIG. 48C is a flowchart illustrating an example of restoring slices. The method begins at step 676 where a processing module (e.g., of a storage unit) determines whether to backup storage of slices stored in the storage unit, where sets of slices are stored in sets of storage units that includes the storage unit. As a specific example, the processing module determines to backup the storage of the slices when detecting a storage unit activity level that is less than a low activity threshold level. When determining to backup, the method continues at step 678 where the processing module identifies new slices stored since a last snapshot. As a specific example, the processing module compares a current slice list to a slice list associated with the last snapshot to identify the new slices.

The method continues at step 680 where the processing module issues a backup request to a backup unit, where the backup request includes the identified new slices. When the backup is confirmed, the method continues at step 682 where the processing module updates a snapshot table to associate the snapshot with identities of the identified new slices. As a specific example, the processing module receives a favorable restore response and modifies the snapshot table to include the identities of the new identified slices.

The method continues at step 684 where the processing module determines whether to restore storage of slices. When restoring, the method continues at step 686 where the processing module issues a restore request to the backup unit. The method continues at step 688 where the processing module receives a restore response that includes slices. The method continues at step 690 where the processing module stores the slices from the restore response in a local memory. The method continues at step 692 where the processing module identifies slice names of slices to rebuild. As a specific example, the processing module identifies missing slices by issuing list slice requests to other storage units and receiving list slice responses. The method continues at step 694 where the processing module facilitates rebuilding of the identified slices to rebuild. As a specific example, the processing module issues a rebuild request that includes the identities of the slices to rebuild. As another specific example, the processing module receives at least a decode threshold number of slice representations for each set of slices associated with a slice to be rebuilt, generates the slice to be rebuilt from the decode threshold number of slice representations, and stores the rebuilt slice in the local memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices to access a distributed dispersed storage network (DSN) registry of a DSN, the method comprises:
   obtaining an identifier (ID) piece of multiple ID pieces regarding a registry fragment of the distributed DSN registry, wherein the distributed DSN registry includes a multitude of registry entries, wherein the registry fragment includes a plurality of related registry entries of the multitude of registry entries, wherein a registry entry of the multitude of registry entries includes information regarding one or more of virtual address to physical device mapping, virtual address to user mapping, and DSN operational parameters;
   performing a function on the ID piece to obtain a registry fragment alias, wherein performance of the function on the multiple ID pieces would produce multiple registry fragment aliases;
   determining DSN addressing information for the registry fragment based on the registry fragment alias, wherein the DSN addressing information is determinable from any one of the multiple registry fragment aliases; and
   receiving a response regarding the registry fragment when a local copy of the registry fragment is not up-to-date.

2. The method of claim 1, wherein the multiple ID pieces comprises two or more of:
   a vault ID;
   a storage pool ID;
   a user group ID;
   a user ID;
   a data object ID;
   a folder ID; and
   a file ID.

3. The method of claim 1, wherein the performing the function on the ID piece comprises:
   performing a deterministic function on the ID piece to obtain the registry fragment alias.

4. The method of claim 1 further comprises:
   obtaining, by a requesting device, the ID piece, wherein the requesting device is a first computing device of the one or more computing devices;
   performing, by the requesting device, the function on the ID piece to obtain the registry fragment alias;
   sending, by the requesting device, the registry fragment alias and a local most recent revision level of a local copy of the registry fragment to a storage unit, wherein the storage unit is a second computing device of the one or more computing devices;
   determining, by the storage unit, the DSN addressing information for the registry fragment;
   identifying, by the storage unit, a set of encoded data slices of the registry fragment based on the DSN addressing information;
   determining, by the storage unit, a global most recent revision level for the set of encoded data slices; and
   sending, by the storage unit, the response to the requesting device when the local most recent revision level does not substantially match the global most recent revision level.

5. The method of claim 4 further comprises one of:
   sending, by the storage unit, a global most recent copy of the registry fragment to the requesting device; and
   sending, by the storage unit, a message indicating that the local copy of the registry fragment is out-of-date.

6. The method of claim 1 further comprises:
   determining, by a requesting device, the DSN addressing information for the registry fragment based on the registry fragment alias, wherein the requesting device is a first computing device of the one or more computing devices;
   sending, by the requesting device, an inquiry regarding the registry fragment based on the DSN addressing information; and
   receiving, from a storage unit, a response to the inquiry, wherein the storage unit is a second computing device of the one or more computing devices.

7. The method of claim 1 further comprises:
   obtaining a set of ID pieces of the multiple ID pieces regarding the registry fragment of the distributed DSN registry;
   performing the function, or another function, on the set of ID pieces to obtain a registry sub-fragment alias, wherein the registry fragment includes a plurality of registry sub-fragments and the registry sub-fragment alias corresponds to one of the plurality of registry sub-fragments;
   determining DSN addressing information for the registry sub-fragment based on the registry sub-fragment alias; and
   receiving a response regarding the registry sub-fragment when a local copy of the registry sub-fragment is not up-to-date.

8. A non-transitory computer readable storage medium comprises:
   at least one memory section that stores operational instructions that, when executed by one or more processing modules of one or more computing devices of a dispersed storage network (DSN), causes the one or more computing devices to:
   obtain an identifier (ID) piece of multiple ID pieces regarding a registry fragment of a distributed DSN registry, wherein the distributed DSN registry includes a multitude of registry entries, wherein the registry fragment includes a plurality of related registry entries of the multitude of registry entries, wherein a registry entry of the multitude of registry entries includes information regarding one or more of virtual address to physical device mapping, virtual address to user mapping, and DSN operational parameters;
   perform a function on the ID piece to obtain a registry fragment alias, wherein performance of the function on the multiple ID pieces would produce multiple registry fragment aliases;
   determine DSN addressing information for the registry fragment based on the registry fragment alias, wherein the DSN addressing information is determinable from any one of the multiple registry fragment aliases; and
   receive a response regarding the registry fragment when a local copy of the registry fragment is not up-to-date.

9. The non-transitory computer readable storage medium of claim 8, wherein the multiple ID pieces comprises two or more of:
   a vault ID;
   a storage pool ID;
   a user group ID;
   a user ID;
   a data object ID;
   a folder ID; and
   a file ID.

10. The non-transitory computer readable storage medium of claim 8, wherein the one or more processing modules functions to execute the operational instructions stored by the at least one memory section to cause the one or more computing devices of the DSN to perform the function on the ID piece by:

performing a deterministic function on the ID piece to obtain the registry fragment alias.

11. The non-transitory computer readable storage medium of claim 8 further comprises:

the at least one memory section stores further operational instructions that, when executed by the one or more processing modules, causes the one or more computing devices of the DSN to:

obtain, by a requesting device, the ID piece, wherein the requesting device is a first computing device of the one or more computing devices;

perform, by the requesting device, the function on the ID piece to obtain the registry fragment alias;

send, by the requesting device, the registry fragment alias and a local most recent revision level of a local copy of the registry fragment to a storage unit, wherein the storage unit is a second computing device of the one or more computing devices;

determine, by the storage unit, the DSN addressing information for the registry fragment;

identify, by the storage unit, a set of encoded data slices of the registry fragment based on the DSN addressing information;

determine, by the storage unit, a global most recent revision level for the set of encoded data slices; and send, by the storage unit, the response to the requesting device when the local most recent revision level does not substantially match the global most recent revision level.

12. The non-transitory computer readable storage medium of claim 11 further comprises:

the at least one memory section stores further operational instructions that, when executed by the one or more processing modules, causes the one or more computing devices of the DSN to:

send, by the storage unit, a global most recent copy of the registry fragment to the requesting device; and send, by the storage unit, a message indicating that the local copy of the registry fragment is out-of-date.

13. The non-transitory computer readable storage medium of claim 8 further comprises:

the at least one memory section stores further operational instructions that, when executed by the one or more processing modules, causes the one or more computing devices of the DSN to:

determine, by a requesting device, the DSN addressing information for the registry fragment based on the registry fragment alias, wherein the requesting device is a first computing device of the one or more computing devices;

send, by the requesting device, an inquiry regarding the registry fragment based on the DSN addressing information; and receive, from a storage unit, a response to the inquiry, wherein the storage unit is a second computing device of the one or more computing devices.

14. The non-transitory computer readable storage medium of claim 8 further comprises:

the at least one memory section stores further operational instructions that, when executed by the one or more processing modules, causes the one or more computing devices of the DSN to:

obtain a set of ID pieces of the multiple ID pieces regarding the registry fragment of the distributed DSN registry;

perform the function, or another function, on the set of ID pieces to obtain a registry sub-fragment alias, wherein the registry fragment includes a plurality of registry sub-fragments and the registry sub-fragment alias corresponds to one of the plurality of registry sub-fragments;

determine DSN addressing information for the registry sub-fragment based on the registry sub-fragment alias; and receive a response regarding the registry sub-fragment when a local copy of the registry sub-fragment is not up-to-date.

15. A computing device one or more computing devices of a dispersed storage network (DSN) comprises:

an interface;

a memory; and a processing module operably coupled to the interface and the memory, wherein the processing module functions to:

obtain an identifier (ID) piece of multiple ID pieces regarding a registry fragment of a distributed DSN registry, wherein the distributed DSN registry includes a multitude of registry entries, wherein the registry fragment includes a plurality of related registry entries of the multitude of registry entries, wherein a registry entry of the multitude of registry entries includes information regarding one or more of virtual address to physical device mapping, virtual address to user mapping, and DSN operational parameters;

perform a function on the ID piece to obtain a registry fragment alias, wherein performance of the function on the multiple ID pieces would produce multiple registry fragment aliases;

determine DSN addressing information for the registry fragment based on the registry fragment alias, wherein the DSN addressing information is determinable from any one of the multiple registry fragment aliases; and receive a response regarding the registry fragment when a local copy of the registry fragment is not up-to-date.

16. The computing device of claim 15, wherein the multiple ID pieces comprises two or more of:

a vault ID;

a storage pool ID;

a user group ID;

a user ID;

a data object ID;

a folder ID; and a file ID.

17. The computing device of claim 15, wherein the processing module functions to perform the function on the ID piece by:

performing a deterministic function on the ID piece to obtain the registry fragment alias.

18. The computing device of claim 15, wherein the processing module further functions to:

obtain the ID piece;

perform the function on the ID piece to obtain the registry fragment alias;

send the registry fragment alias and a local most recent revision level of a local copy of the registry fragment to a storage unit, wherein the storage unit is another computing device of the one or more computing devices;
determine, by the storage unit, the DSN addressing information for the registry fragment;
identify, by the storage unit, a set of encoded data slices of the registry fragment based on the DSN addressing information;
determine, by the storage unit, a global most recent revision level for the set of encoded data slices; and
send, by the storage unit, the response to the computing device when the local most recent revision level does not substantially match the global most recent revision level.

19. The computing device of claim 18, wherein the processing module further functions to:
send, by the storage unit, a global most recent copy of the registry fragment to the requesting device; and
send, by the storage unit, a message indicating that the local copy of the registry fragment is out-of-date.

20. The computing device of claim 15, wherein the processing module further functions to:
determine the DSN addressing information for the registry fragment based on the registry fragment alias;
send an inquiry regarding the registry fragment based on the DSN addressing information; and
receive, from a storage unit, a response to the inquiry, wherein the storage unit is another computing device of the one or more computing devices.

21. The computing device of claim 15, wherein the processing module further functions to:
obtain a set of ID pieces of the multiple ID pieces regarding the registry fragment of the distributed DSN registry;
perform the function, or another function, on the set of ID pieces to obtain a registry sub-fragment alias, wherein the registry fragment includes a plurality of registry sub-fragments and the registry sub-fragment alias corresponds to one of the plurality of registry sub-fragments;
determine DSN addressing information for the registry sub-fragment based on the registry sub-fragment alias; and
receive a response regarding the registry sub-fragment when a local copy of the registry sub-fragment is not up-to-date.

* * * * *